US012544598B2

(12) United States Patent
Tyler

(10) Patent No.: US 12,544,598 B2
(45) Date of Patent: Feb. 10, 2026

(54) ULTRASOUND MODULATION OF BRAIN ACTIVITY

(71) Applicant: Arizona Board of Regents on Behalf of Arizona State University, Scottsdale, AZ (US)

(72) Inventor: William James Tyler, Cave Creek, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/496,330

(22) Filed: Oct. 27, 2023

(65) Prior Publication Data

US 2024/0316366 A1    Sep. 26, 2024

Related U.S. Application Data

(63) Continuation of application No. 17/468,583, filed on Sep. 7, 2021, now abandoned, which is a continuation
(Continued)

(51) Int. Cl.
*A61N 7/00*  (2006.01)
*A61B 5/245*  (2021.01)
(Continued)

(52) U.S. Cl.
CPC ............... *A61N 7/00* (2013.01); *A61B 5/245* (2021.01); *A61B 5/372* (2021.01); *A61B 8/0816* (2013.01);
(Continued)

(58) Field of Classification Search
CPC .............. A61N 7/00; A61N 2007/0026; A61N 2007/0078; A61N 2007/0091; A61B 5/245; A61B 5/372; A61B 8/0816
See application file for complete search history.

(56) References Cited

U.S. PATENT DOCUMENTS 3,762,396 A    10/1973  Ballentine et al.
4,002,221 A    1/1977   Buchalter
(Continued)

FOREIGN PATENT DOCUMENTS

CN    1096703 A    12/1994
CN    1507333 A    6/2004
(Continued)

OTHER PUBLICATIONS

Additional figures for cog enhancement NPA. Jan. 1, 2013.
(Continued)

*Primary Examiner* — Hien N Nguyen
(74) *Attorney, Agent, or Firm* — Shay Glenn LLP

(57) ABSTRACT

An ultrasound device for modulating brain activity may include a body and components for activating the brain. Such components include ultrasound transducers. The devices are used to provide ultrasound waves to brain structures in a subject wearing a device for methods to treat traumatic brain injury, affect postural control, affect wakefulness, attention, and alertness, to provide memory control, to alter cerebrovascular hemodynamics, to minimize stress, and to reinforce behavioral actions.

15 Claims, 30 Drawing Sheets

Related U.S. Application Data of application No. 16/211,143, filed on Dec. 5, 2018, now abandoned, which is a continuation of application No. 15/014,805, filed on Feb. 3, 2016, now abandoned, which is a continuation of application No. 13/453,179, filed on Apr. 23, 2012, now abandoned, which is a continuation of application No. PCT/US2010/055527, filed on Nov. 4, 2010.

(60) Provisional application No. 61/257,915, filed on Nov. 4, 2009.

(51) Int. Cl.
*A61B 5/372* (2021.01)
*A61B 8/08* (2006.01)

(52) U.S. Cl.
CPC ............. *A61N 2007/0026* (2013.01); *A61N 2007/0078* (2013.01); *A61N 2007/0091* (2013.01)

(56) References Cited

U.S. PATENT DOCUMENTS

| | | |
|---|---|---|
| 4,059,098 A | 11/1977 | Murdock |
| 4,309,575 A | 1/1982 | Zweig et al. |
| 4,556,066 A | 12/1985 | Semrow |
| 4,646,744 A | 3/1987 | Capel |
| 4,723,552 A | 2/1988 | Kenyon et al. |
| 4,886,068 A | 12/1989 | Kaneko et al. |
| 5,103,129 A | 4/1992 | Slayton et al. |
| 5,127,410 A | 7/1992 | King et al. |
| 5,342,410 A | 8/1994 | Braverman |
| 5,394,877 A | 3/1995 | Orr et al. |
| 5,413,550 A | 5/1995 | Castel |
| 5,476,438 A | 12/1995 | Edrich et al. |
| 5,494,038 A | 2/1996 | Wang et al. |
| 5,505,205 A | 4/1996 | Solomon et al. |
| 5,520,612 A | 5/1996 | Winder et al. |
| 5,522,878 A | 6/1996 | Montecalvo et al. |
| 5,540,736 A | 7/1996 | Haimovich et al. |
| 5,558,092 A | 9/1996 | Unger et al. |
| 5,752,924 A | 5/1998 | Kaufman et al. |
| 5,782,767 A | 7/1998 | Pretlow |
| 5,951,476 A | 9/1999 | Beach |
| 6,039,694 A | 3/2000 | Larson et al. |
| 6,078,838 A | 6/2000 | Rubinstein |
| 6,182,341 B1 | 2/2001 | Talbot et al. |
| 6,328,694 B1 | 12/2001 | Michaeli |
| 6,394,969 B1 | 5/2002 | Lenhardt |
| 6,432,069 B1 | 8/2002 | Godo et al. |
| 6,478,754 B1 | 11/2002 | Babaev |
| 6,526,318 B1 | 2/2003 | Ansarinia |
| 6,536,440 B1 | 3/2003 | Dawson |
| 6,575,922 B1 | 6/2003 | Fearnside et al. |
| 6,584,357 B1 | 6/2003 | Dawson |
| 6,733,450 B1 | 5/2004 | Alexandrov et al. |
| 6,735,475 B1 | 5/2004 | Whitehurst et al. |
| 6,770,031 B2 | 8/2004 | Hynynen et al. |
| 6,846,290 B2 | 1/2005 | Lizzi et al. |
| 6,964,684 B2 | 11/2005 | Ortiz et al. |
| 6,978,179 B1 | 12/2005 | Flagg et al. |
| 7,104,947 B2 | 9/2006 | Riehl |
| 7,108,663 B2 | 9/2006 | Talish et al. |
| 7,190,998 B2 | 3/2007 | Shalev et al. |
| 7,283,861 B2 | 10/2007 | Bystritsky |
| 7,350,522 B2 | 4/2008 | Dawson |
| 7,363,076 B2 | 4/2008 | Yun et al. |
| 7,410,469 B1 | 8/2008 | Talish et al. |
| 7,429,248 B1 | 9/2008 | Winder et al. |
| 7,431,704 B2 | 10/2008 | Babaev |
| 7,510,536 B2 | 3/2009 | Foley et al. |
| 7,532,935 B2 | 5/2009 | Maschino et al. |
| 7,699,768 B2 | 4/2010 | Kishawi et al. |
| 7,699,778 B2 | 4/2010 | Adam |
| 7,713,218 B2 | 5/2010 | Babaev et al. |
| 7,914,470 B2 | 3/2011 | Babaev |
| 7,938,780 B2 | 5/2011 | Ragauskas et al. |
| 7,974,845 B2 | 7/2011 | Spiridigliozzi et al. |
| 8,123,707 B2 | 2/2012 | Huckle et al. |
| 8,150,537 B2 | 4/2012 | Tanaka et al. |
| 8,190,248 B2 | 5/2012 | Besio et al. |
| 8,235,919 B2 | 8/2012 | Babaev |
| 8,239,030 B1 | 8/2012 | Hagedorn et al. |
| 8,591,419 B2 | 11/2013 | Tyler et al. |
| 8,858,440 B2 | 10/2014 | Tyler et al. |
| 9,403,038 B2 | 8/2016 | Tyler |
| 10,556,132 B2 | 2/2020 | Tyler |
| 11,707,636 B2 | 7/2023 | Tyler |
| 2001/0040214 A1 | 11/2001 | Friedman et al. |
| 2002/0042574 A1 | 4/2002 | Manor et al. |
| 2002/0198577 A1 | 12/2002 | Jaillet |
| 2003/0009153 A1 | 1/2003 | Brisken et al. |
| 2003/0032900 A1 | 2/2003 | Ella |
| 2003/0060711 A1 | 3/2003 | Michaeli |
| 2003/0199944 A1 | 10/2003 | Chapin et al. |
| 2004/0049134 A1 | 3/2004 | Tosaya et al. |
| 2004/0059241 A1 | 3/2004 | Suffin |
| 2004/0082857 A1 | 4/2004 | Schonenberger et al. |
| 2004/0143300 A1 | 7/2004 | Rogers |
| 2004/0249416 A1 | 12/2004 | Yun et al. |
| 2004/0254443 A1 | 12/2004 | Gott et al. |
| 2004/0254469 A1 | 12/2004 | Shkarlet et al. |
| 2005/0020918 A1 | 1/2005 | Wilk et al. |
| 2005/0020945 A1 | 1/2005 | Tosaya et al. |
| 2005/0033140 A1 | 2/2005 | de la Rosa et al. |
| 2005/0085748 A1 | 4/2005 | Culp et al. |
| 2005/0195103 A1 | 9/2005 | Davis et al. |
| 2005/0249667 A1 | 11/2005 | Tuszynski et al. |
| 2005/0277824 A1 | 12/2005 | Aubry et al. |
| 2006/0058678 A1 | 3/2006 | Vitek et al. |
| 2006/0074355 A1 | 4/2006 | Slayton et al. |
| 2006/0111754 A1 | 5/2006 | Rezai et al. |
| 2006/0163964 A1 | 7/2006 | Kojima et al. |
| 2006/0173321 A1 | 8/2006 | Kubota et al. |
| 2006/0173509 A1 | 8/2006 | Lee et al. |
| 2006/0184070 A1 | 8/2006 | Hansmann et al. |
| 2006/0201090 A1 | 9/2006 | Guevara et al. |
| 2006/0273509 A1 | 12/2006 | Davis et al. |
| 2007/0016041 A1 | 1/2007 | Nita |
| 2007/0038100 A1 | 2/2007 | Nita |
| 2007/0043401 A1 | 2/2007 | John |
| 2007/0093702 A1 | 4/2007 | Yu et al. |
| 2007/0173902 A1 | 7/2007 | Maschino et al. |
| 2007/0179557 A1 | 8/2007 | Maschino et al. |
| 2007/0179570 A1 | 8/2007 | De Taboada et al. |
| 2007/0299370 A1 | 12/2007 | Bystritsky |
| 2008/0033297 A1 | 2/2008 | Sliwa |
| 2008/0045882 A1 | 2/2008 | Finsterwald |
| 2008/0154332 A1 | 6/2008 | Rezal |
| 2008/0194967 A1 | 8/2008 | Sliwa et al. |
| 2008/0200810 A1 | 8/2008 | Buchalter |
| 2008/0319376 A1 | 12/2008 | Wilcox et al. |
| 2009/0012577 A1 | 1/2009 | Rezal et al. |
| 2009/0024189 A1 | 1/2009 | Lee et al. |
| 2009/0099482 A1* | 4/2009 | Furuhata ............... A61N 7/00 601/2 |
| 2009/0099483 A1 | 4/2009 | Rybyanets |
| 2009/0105581 A1 | 4/2009 | Widenhorn |
| 2009/0112133 A1 | 4/2009 | Deisseroth et al. |
| 2009/0112278 A1 | 4/2009 | Wingeier et al. |
| 2009/0114849 A1 | 5/2009 | Schneider et al. |
| 2009/0149782 A1 | 6/2009 | Cohen |
| 2009/0163964 A1 | 6/2009 | Boyden et al. |
| 2009/0221902 A1 | 9/2009 | Myhr |
| 2009/0222059 A1 | 9/2009 | Hillis et al. |
| 2009/0276005 A1 | 11/2009 | Pless |
| 2010/0016707 A1 | 1/2010 | Amara et al. |
| 2010/0022889 A1 | 1/2010 | Caberg et al. |
| 2010/0030299 A1 | 2/2010 | Covalin |
| 2010/0087698 A1 | 4/2010 | Hoffman |
| 2010/0125207 A1 | 5/2010 | Kim et al. |
| 2010/0125312 A1 | 5/2010 | Stevenson et al. |
| 2010/0145215 A1 | 6/2010 | Pradeep et al. |

(56) References Cited

U.S. PATENT DOCUMENTS

| | | |
|---|---|---|
| 2010/0324440 A1 | 12/2010 | Moore et al. |
| 2011/0009734 A1 | 1/2011 | Foley et al. |
| 2011/0040171 A1 | 2/2011 | Foley et al. |
| 2011/0040190 A1 | 2/2011 | Jahnke et al. |
| 2011/0082326 A1 | 4/2011 | Mishelevich et al. |
| 2011/0092800 A1 | 4/2011 | Yoo et al. |
| 2011/0112394 A1 | 5/2011 | Mishelevich |
| 2011/0130615 A1 | 6/2011 | Mishelevich |
| 2011/0144716 A1 | 6/2011 | Bikson et al. |
| 2011/0178442 A1 | 7/2011 | Mishelevich |
| 2011/0190668 A1 | 8/2011 | Mishelevich |
| 2011/0196267 A1 | 8/2011 | Mishelevich |
| 2011/0208094 A1 | 8/2011 | Mishelevich |
| 2011/0213200 A1 | 9/2011 | Mishelevich |
| 2011/0270138 A1 | 11/2011 | Mishelevich |
| 2011/0288610 A1 | 11/2011 | Brocke |
| 2012/0029393 A1 | 2/2012 | Lee |
| 2012/0053391 A1 | 3/2012 | Mishelevich |
| 2012/0083719 A1 | 4/2012 | Mishelevich |
| 2012/0209346 A1 | 8/2012 | Bikson et al. |
| 2012/0245653 A1 | 9/2012 | Bikson et al. |
| 2012/0265261 A1 | 10/2012 | Bikson et al. |
| 2012/0289869 A1 | 11/2012 | Tyler |
| 2013/0066239 A1 | 3/2013 | Mishelevich |
| 2013/0066350 A1 | 3/2013 | Mishelevich |
| 2016/0220850 A1 | 8/2016 | Tyler |
| 2019/0105517 A1 | 4/2019 | Tyler |
| 2022/0062661 A1 | 3/2022 | Tyler |

FOREIGN PATENT DOCUMENTS

| | | |
|---|---|---|
| CN | 201098346 Y | 8/2008 |
| CN | 101288600 A | 10/2008 |
| CN | 101500644 A | 8/2009 |
| JP | 62035906 U | 3/1987 |
| JP | H11-290386 A | 10/1999 |
| JP | 2000040191 A | 2/2000 |
| JP | 2001327495 A | 11/2001 |
| JP | 2002000613 A | 1/2002 |
| JP | 2006192181 A | 7/2006 |
| JP | 2006195872 A | 7/2006 |
| JP | 2007517534 A | 7/2007 |
| WO | WO94/006380 A1 | 3/1994 |
| WO | WO98/007367 A1 | 2/1998 |
| WO | WO2007/130308 A2 | 11/2007 |
| WO | WO2008/017998 A2 | 2/2008 |
| WO | WO2008/089003 A2 | 7/2008 |
| WO | WO2009/017264 A1 | 2/2009 |
| WO | WO2009/117323 A2 | 9/2009 |

OTHER PUBLICATIONS

Abbott; Microscopic marvels: The glorious resolution; Nature, vol. 459; pp. 638-639 <DOI:10.1038/459638a>; Jun. 2009.

Anastassiou et al.; The Effect of Spatially Inhomogeneous Extracellular Electric Fields on Neurons; Journal of Neuroscience; 30(50; pp. 1925-1936 <DOI:10.1523/JNEUROSCI.3635-09.2010>; Feb. 2010.

Andrews; Neuroprotection Trek 'The Next Generation: Neuromodulation I. Techniques' Deep Brain Stimulation, Vagus Nerve Stimulation, and Transcranial Magnetic Stimulation; Annals of The New York Academy of Sciences; 993(1); pp. 1-13 <DOI: 10.1111/j.1749-6632.2003.tb07506.x>; May 2003.

Arroyo et al.; Mirth, laughter and gelastic seizures; Brain; 116(4); pp. 757-780; Aug. 1, 1993.

Ayling et al.; Automated light-based mapping of motor cortex by photoactivation of channelrhodopsin-2 transgenic mice; Nature Methods; vol. 6; pp. 219-224 <DOI:10.1038/nmeth.1303>; Mar. 2009.

Bachtold et al.; Focused ultrasound modifications of neural circuit activity in a mammalian brain; Ultrasound in Medicine and Biology; 24(4); pp. 557-565; May 1, 1998.

Barker; An introduction to the basic principles of magnetic nerve stimulation; Journal of Clinical Neurophysiology; 8(1); pp. 26-37; Jan. 1991.

Bartsch et al.; Stimulation of the greater occipital nerve induces increased central excitability of dural afferent input; Brain; 125(7); pp. 1496-1509; Jul. 1, 2002.

Baker et al.; Deep brain stimulation for obsessive-compulsive disorder: using functional magnetic resonance imaging and electrophysiological techniques: technical case report; Neurosurgery; 10 pages; 61(Suppl2); ONSE367-368; Nov. 1, 2007.

Boddaert et al.; Autism: functional brain mapping of exceptional calendar capacity; The British Journal of Psychiatry; 187(1); pp. 83-86; Jul. 1, 2005.

Bragin et al.; Gamma (40-100 Hz) oscillation in the hippocampus of the behaving rat; The Journal of Neuroscience; vol. 15, No. 15, No. 1, pp. 47-60; <DOIi:10.1523/JNEUROSCI.15-01-00047.1995>; Jan. 1995.

Bragin et al.; Termination of Epileptic Afterdischarge in the Hippocampus; The Journal of Neuroscience; 17(7); pp. 2567-2579 <DOI:10.1523/JNEUROSCI.17-07-02567.1997>; Apr. 1997.

Breneman et al.; Piezo- and Flexoelectric Membrane Materials Underlie Fast Biological Motors in the Ear; Mater Res Soc Symp Proc; 1186E doi:10.1557/PROC-1186-JJ06-04; (Author Manuscript) Spring 2009.

Burns et al.; Treatment of medically intractable cluster headache by occipital nerve stimulation: long-term follow-up of eight patients; Lancet; 369(9567); pp. 1099-1106; Mar. 31, 2007.

Buzsáki; Two-stage model of memory trace formation: A role for fnoisyf brain states; Neuroscience; 31(3); pp. 551-570 <DOI:10.1016/0306-4522(89)90423-5>; Jan. 1989.

Buzsáki et al.; High-frequency network oscillation in the hippocampus; Science; 256(5059); pp. 1025-1027 <DOI:10.1126/science.1589772>; May 1992.

Buzsáki; The Hippocampo-Neocortical Dialogue, Cerebral Cortex, 6(2); pp. 81-92 <DOI:10.1093/cercor/6.2.81>; Mar.-Apr. 1996.

Clarke et al.; Transcranial magnetic stimulation for migraine: clinical effects; Journal of Headache and Pain; 7(5); pp. 341-346; Oct. 1, 2006.

Clement et al.; A non-invasive method for focusing ultrasound through the human skull; Physics in Medicine and Biology; 47(8); pp. 1219-1236; Apr. 5, 2002.

clinical trials.gov; Deep brain stimulation (DBS) for treatment resistant bipolar disorder (DBS-BIPO); Oct. 2012; 4 pages; retreived from the internet (https://web.archive.org/web/20121214183548/https://clinicaltrials.gov/ct2/show/NCT01372722); on Dec. 17, 2012.

Cooper et al.; A Probe Technique for Determining the Thermal Conductivity of Tissue; Journal of Heat Transfer; 94(2); pp. 133-140 <DOI:10.1115/1.3449883>; May 1972.

Dalecki; Mechanical bioeffects of ultrasound; Annu Rev Biomed Eng.; 6; pp. 229-248; Aug. 15, 2004.

Dinno et al.; The significance of membrane changes in the safe and effective use of therapeutic and diagnostic ultrasound; Physics in Medicine and Biology; 34(11); pp. 1543-1552 <DOI:10.1088/0031-9155/34/11/003>; Nov. 1989.

Farrell et al.; Study of the human visual cortex: direct cortical evoked potentials and stimulation; Journal of Clinical Neurophysiology; 24(1); pp. 1-10; Feb. 1, 2007.

Fleury; New piezocomposite transducers for therapeutic ultrasound; 2nd International Symposium on Therapeutic Ultrasound ,Seattle, 31/07; 4 pages; Feb. 8, 2002.

Fry et al.; Production of reversible changes in the central nervous system by ultrasound; Science; 127(3289); pp. 83-84; (Author Manuscript); Jan. 10, 1958.

Gavrilov et al.; Application of focused ultrasound for the stimulation of neural structures; Ultrasound in Medicine and Biology; 22(2); pp. 179-192; Jan. 1, 1996.

Gavrilov et al.; The effect of focused ultrasound on the skin and deep nerve structures of man and animal; In Progress in Brain research; 43; pp. 279-292; Jan. 1, 1976.

George et al. Daily repetitive transcranial magnetic stimulation (rTMS) improves mood in depression; Neuroreport; 6(14); pp. 1853-1856; Oct. 2, 1995.

(56) References Cited

OTHER PUBLICATIONS

George et al.; Changes in mood and hormone levels after rapid-rate transcranial magnetic stimulation (rTMS) of the prefrontal cortex; The Journal of Neuropsychiatry and Clinical Neurosciences; 8(2); pp. 172-180; Spring 1996.

George et al.; Vagus nerve stimulation: a new tool for brain research and therapy; Biological Psychiatry; 47(4); pp. 287-295; Feb. 15, 2000.

Ghanam et al.; Vagal nerve stimulator implantation: an otolaryngologist's perspective; Otolaryngol Head Neck Surgery; 135(1); pp. 46-51; Jul. 2006.

Girardeau et al.; Selective suppression of hippocampal ripples impairs spatial memory; Nature Neuroscience; 12(10); pp. 1222-1223 <DOI:10.1038/nn.2384>; Oct. 2009.

Goss et al.; Comprehensive compilation of empirical ultrasonic properties of mammalian tissues; The Journal of the Acoustical Society of America, 64(2); pp. 423-457 <DOI: 10.1121/1.382016>; Aug. 1978.

Griesbauer et al.; Wave propagation in lipid monolayers; Biophysical Journal; 97(10); pp. 2710-2716; Nov. 15, 2009.

Haar et al.; Therapeutic ultrasound; European Journal of Ultrasound; 9(1); pp. 3-9; Mar. 1, 1999.

Hamani et al.; Deep Brain Stimulation for the Treatment of Epilepsy; International Journal of Neural Systems; 19(3); pp. 213-226 <DOI:10.1142/S0129065709001975>; Jun. 2009.

Hauptman et al.; Potential surgical targets for deep brain stimulation in treatment-resistant depression; Neurosurg Focus; 25(1); E3, doi: 10.3171/FOC/2008/25/7/E3; 9 pages; the year of publication is sufficiently earlier than the effective U.S. filing date and any foreign priority date so that the particular month of publication is not an issue) 2008.

Hayner et al.; Numerical analysis of ultrasonic transmission and absorption of oblique plane waves through the human skull; The Journal of the Acoustical Society of America; 110(6); pp. 3319-3330 <DOI:10.1121/1.1410964>; Dec. 2001.

Heimburg; Lipid ion channels; Biophysical Chenistry; 150(1); pp. 2-22; Aug. 1, 2010.

Huerta et al.; Transcranial magnetic stimulation, synaptic plasticity and network oscillations; Journal of NeuroEngineering and Rehabilitation; 6(7); 10 pages <DOI:10.1186/1743-0003-6-7>; Mar. 2009.

Hynynen et al.; 500-element ultrasound phased array system for noninvasive focal surgery of the brain: a preliminary rabbit study with ex vivo human skulls; Magnetic Resonance in Medicine; 52(1); pp. 100-107; Jul. 2004.

Hynynen et al.; Clinical applications of focused ultrasound-the brain; International Journal of Hyperthermia; 23(2); pp. 193-202; Jan. 1, 2007.

Hynynen et al.; Demonstration of potential noninvasive ultrasound brain therapy through an intact skull; Ultrasound in Medicine and Biology; 24(2); pp. 275-283; Feb. 1, 1998.

Jefferys et al.; Synchronized bursting of CA1 hippocampal pyramidal cells in the absence of synaptic transmission; Nature; vol. 300; pp. 448-450 <DOI:10.1038/300448a0>; Dec. 1982.

Johansen-Berg et al.; Anatomical connectivity of the subgenual cingulate region targeted with deep brain stimulation for treatment-resistant depression; Cerebral Cortex; 18(6); pp. 1374-1383; Oct. 10, 2007.

Komisaruk et al.; Brain activation during vaginocervical self-stimulation and orgasm in women with complete spinal cord injury: fMRI evidence of mediation by the vagus nerves; Brain Research; 1024(1-2); pp. 77-88; Oct. 22, 2004.

Komisaruk et al.; Functional MRI of the brain during orgasm in women; Annual review of Sex Research; 16(1); pp. 62-86; Mar. 1, 2005.

Latikka et al; Conductivity of living intracranial tissues; Physics in Medicine and Biology; 46(6); pp. 1611-1616; Jun. 2001.

Lee et al.; Neural correlates of affective processing in response to sad and angry facial stimuli in patients with major depressive disorder; Psychopharmacology and Biological Psychiatry; 32(3); pp. 778-785; Apr. 1, 2008.

Lee et al.; The neural substrates of affective processing toward positive and negative affective pictures in patients with major depressive disorder; Progress in Neuro-Psychopharmacology and Biological Psychiatry; 31(7); pp. 1487-1492; Oct. 1, 2007.

Lessmann et al.; Neurotrophin secretion: current facts and future prospects; Progress in Neurobiology; 69(5); pp. 341-374 <DOI:10.1016/S0301-0082(03)00019-4>; Apr. 2003.

Li et al.; Experimental demonstration of an acoustic magnifying hyperlens; Nature Materials; pp. 1-4, DOI:10:1038/NMAT2561; Oct. 2009.

Li et al.; Synaptic vesicle recycling studies in transgenic mice expressing synaptophluorin; Proc. Natl. Acad. Sci. USA; 102(17); pp. 6131-6136; Apr. 26, 2005.

Lipton et al.; Single-pulse transcranial magnetic stimulation for acute treatment of migraine with aura: a randomised, double-blind, parallel-group, sham-controlled trial; Lancet Neurology; 9(4); pp. 373-380; Apr. 1, 2010.

Martin. et al.; High?intensity focused ultrasound for noninvasive functional neurosurgery; Annals of Neurology; 66(6); pp. 858-861 <DOI:10.1002/ana.21801>; Dec. 2009.

Mayberg et al.; Deep brain stimulation for treatment-resistant depression; Neuron; 45(5); pp. 651-660; Mar. 3, 2005.

Mayo Clinic; Bipolar disorder: treatments drugs. Mayo Clinic. Aug. 2012. 10 pages; www.mayoclinic.com. Accessed Dec. 17, 2012.

Mcnamara; Cellular and molecular basis of epilepsy; The Journal of Neuroscience; 14(6); pp. 3413-3425 <DOI:10.1523/JNEUROSCI.14-06-03413.1994>; Jun. 1994.

Meloy et al.; Neurally augmented sexual function in human females: a preliminary investigation; Neuromodulation: Technology at the Neural Interface; 9(1); pp. 34-40; Jan. 1, 2006.

Menkes et al.; Right frontal lobe slow frequency repetitive transcranial magnetic stimulation (SF r-TMS) is an effective treatment for depression: a case-control pilot study of safety and efficacy; Journal of Neurology, Neurosurgery and Psychiatry; 67(1); pp. 113-115; Jul. 1, 1999.

Mihran et al.; Temporally-specific modification of myelinated axon excitability in vitro following a single ultrasound pulse; Ultrasound in Medicine and Biology; 16(3); pp. 297-309; 26 pages; (Author Manuscript); Jan. 1, 1990.

Milad et al.; The role of the orbitofrontal cortex in anxiety disorders; Annals of the New York Academy of Sciences; 1121(1); pp. 546-561; Dec. 1, 2007.

Miller et al.: Enhanced artistic creativity with temporal lobe degeneration: Lancet; 348(9043); pp. 1744-1745; Dec. 21, 1996.

Miller et al.; Assessment tools for adult bipolar disorder; Clinical Psychology: Science and Practice; 16(2); pp. 188-201; 18 pages; (Author Manuscript); Jun. 1, 2009.

Morris et al.; Lipid Stress at Play: Mechanosensitivity of Voltage-Gated Channels; Current Topics in Membranes; 59; pp. 297-338; Jan. 1, 2007.

Morris et al.; Nav channel mechanosensitivity: activation and inactivation accelerate reversibly with stretch; Biophysical Journal; 93(3); pp. 822-833; Aug. 1, 2007.

Muehlberger et al. Lasting outcome of the surgical treatment of migraine headaches—a four year follow-up. Meeting of the American Society of Plastic Surgery. Abstract #14728 Nov. 3, 2008.

Nakashiba et al.; Hippocampal CA3 Output Is Crucial for Ripple-Associated Reactivation and Consolidation of Memory; Neuron; 62(6); pp. 781-787 <DOI:10.1016/j.neuron.2009.05.013>; Jun. 2009.

Nakao et al.; Working memory dysfunction in obsessive-compulsive disorder: a neuropsychological and functional MRI study; Journal of Psychiatric Research, 43(8); pp. 784-791; May 1, 2009.

Nelson et al.; Ultrasound biosafety considerations for the practicing sonographer and sonologist; The American Institute of Ultrasound in Medicine; J Ultrasound Medicine; vol. 28; pp. 139-150; 2009.

Nitsche et al.; Excitability changes induced in the human motor cortex by weak transcranial direct current stimulation; The Journal of Physiology; 527(3); pp. 633-639; Sep. 1, 2000.

Norton; Can ultrasound be used to stimulate nerve tissue ?; Biomedical Engineering Online; 2(1); 6; 9 pages; Mar. 4, 2003.

(56) References Cited

OTHER PUBLICATIONS

O'Brien; Ultrasound-biophysics mechanisms; Progress in Biophysics and Molecular Biology; 93(1-3); pp. 212-255; (Author Manuscript) Jan. 1, 2007.
Pascual-Leone et al.; Responses to rapid-rate transcranial magnetic stimulation of the human motor cortex; Brain: A Journal of Neurology; 117(4); pp. 847-858 <DOI:10.1093/brain/117.4.847>; Aug. 1994.
Patoine; Deep brain stimulation for severe depression: new results suggest it works, but how? Dana Foundation; retrieved May 30, 2018 from the internet (https://web.archive.org/web/20141228035621/http://www.dana.org:80/News/Details.aspx? id=43521); 5 pages; Mar. 5, 2012.
Petrov et al.; Flexoelectric effects in model and native membranes containing ion channels; European Biophysics Journal; 22(4); pp. 289-300; Oct. 1, 1993.
Poo; Neurotrophins as synaptic modulators; Nature Reviews Neuroscience; 2(1); pp. 24-32 <DOI:10.1038/35049004>; Jan. 2001.
Racine; Modification of seizure activity by electrical stimulation: I. after-discharge threshold; Electroencephalography and Clinical Neurophysiology; 32(3); pp. 269-279 <DOI:10.1016/0013-4694(72)90176-9>; Mar. 1972.
Reiman et al.; Neuroanatomical correlates of a lactate-induced anxiety attack; Arch Gen Psychiatry; 46(6); pp. 493-500; Jun. 1, 1989.
Rinaldi et al.; Modification by focused ultrasound pulses of electrically evoked responses from an in vitro hippocampal preparation; Brain Research; 558(1); pp. 36-42; Aug. 30, 1991.
Sailer et al.; Effects of peripheral sensory input on cortical inhibition in humans; The Journal of Physiology; 544(2); pp. 617-629; Oct. 1, 2002.
Sankaranarayanan et al.; The use of phluorins for optical measurements of presynaptic activity; Biophys. J., 79(4); pp. 2199-2208; Oct. 2000.
Satow et al.; Mirth and laughter arising from human temporal cortex; Journal of Neurology, Neurosurgery and Psychiatry; 74(7); pp. 1004-1005; Jul. 1, 2003.
Schienle et al.; Symptom provocation and reduction in patients suffering from spider phobia: an fMRI study on exposure therapy; European Archives of Pschiatry and Clinical Neuroscience; 257(8); pp. 486-493; doi 10.1007/s00406-007-0754-y; 8 pages; Dec. 1, 2007.
Shealy et al.; Reversible effects of ultrasound on spinal reflexes; Archives of Neurology; 6(5); pp. 374-386; May 1962.
Shirvalkar et al.; Cognitive enhancement with central thalamic electrical stimulation; Proceedings of the National Academy of Sciences USA, 103(45); pp. 17007-17012; Nov. 7, 2006.
Snyder et al.; Concept formation: 'object' attributes dynamically inhibited from conscious awareness; Journal of Integrative Neuroscience; 3(1); pp. 31-46; Mar. 2004.
Snyder et al.; Savant-like skills exposed in normal people by suppressing the left fronto-temporal lobe; Journal of Integrative Neuroscience; 2(2); pp. 149-158; 9 pages; (Author Manuscript); Dec. 2003.
Sperli et al.; Contralateral smile and laughter, but no mirth, induced by electrical stimulation of the cingulate cortex; Epilepsia; 47(2); pp. 440-443; Feb. 1, 2006.
Stoppini et al.; A simple method for organotypic cultures of nervous tissue; Journal of Neuroscience Methods; 37(2); pp. 173-182; Apr. 1, 1991.
Sukharev et al.; Mechanosensitive channels: multiplicity of families and gating paradigms; Sci STKE; 2004(219); 25 pages; ref4-; doi 10.1126/stke.2192004re4; Feb. 10, 2004.
Ter Haar; Therapeutic applications of ultrasound; Progress in Biophysics and Molecular Biology; 93(1-3); pp. 111-129; Jan.-Apr. 2007.
Tsui et al.; In vitro effects of ultrasound with different energies on the conduction properties of neural tissue; Ultrasonics; 43(7); pp. 560-565; Jun. 1, 2005.
Tufail et al.; Transcranial pulsed ultrasound stimulates intact brain circuits; Neuron; 66(5); pp. 681-694; Jun. 10, 2010.
Tyler et al.; From Acquisition to Consolidation: On the Role of Brain-Derived Neurotrophic Factor Signaling in Hippocampal-Dependent Learning; Learning & Memory; 9(5); pp. 224-237 <DOI:10.1101/lm.51202>; Sep.-Oct. 2002.
Tyler; Machining physiological intelligence; QT Quarterly; 2(1); pp. 33-37; (the year of publication is sufficiently earlier than the effective U.S. filing date and any foreign priority date so that the particular month of publication is not an issue) Summer 2010.
Tyler et al.; Remote excitation of neuronal circuits using low-intensity, low-frequency ultrasound. PLoS One; 3(10); e3511; doi 10.1371/journal.pone.0003511; 11 pages; Oct. 29, 2008.
Velling et al.; Modulation of the functional state of the brain with the aid of focused ultrasonic action; Neuroscience and Behavioral Physiology; 18(5); pp. 369-375; Sep.-Oct. 1988.
Wagner et al.; Noninvasive human brain stimulation; Annu. Rev. Biomed. Eng.; 9; pp. 527-565; Aug. 15, 2007.
White et al.; Local frequency dependence in transcranial ultrasound transmission; Physics in Medicine & Biology; 51(9); pp. 2293-2305 <DOI:10.1088/0031-9155/51/9/013>; Apr. 2006.
White et al.; Longitudinal and shear mode ultrasound propagation in human skull bone; Ultrasound in Medicine & Biology; 32(7); pp. 1085-1096 <DOI:10.1016/j.ultrasmedbio.2006.03.015>; Jul. 2006.
Ylinen et al.; Sharp wave-associated high-frequency oscillation (200 Hz) in the intact hippocampus: network and intracellular mechanisms; Journal of Neuroscience; 15(1); pp. 30-46 <DOI:10.1523/JNEUROSCI.15-01-00030.1995>; Jan. 1995.
Young et al.; Functional Effects of Focused Ultrasound on Mammalian Nerves; Science; 134(3489); pp. 1521-1522 <DOI:10.1126/science.134.3489.1521>; Nov. 1961.
Yucel et al.; Anterior cingulate dysfunction: implications for psychiatric disorders?; Journal of Psychiatry and Neuroscience; 28(5); pp. 350354; Sep. 2003.
Zaehle et al.; Transcranial alternating current stimulation enhances individual alpha activity in human EEG; PLoS One; 5(11); e13766; doi 10.1371/journal.pone.0013766; 7 pages; Nov. 1, 2010.
Zaghi et al.; Noninvasive brain stimulation with low-intensity electrical currents: putative mechanisms of action for direct and alternating current stimulation; Neuroscientist; 16(3); pp. 285-307; Jun. 2010.
Zhang et al.; Focusing Ultrasound with an Acoustic Metamaterial Network; Physical Review Letters; 102(19) pp. 194301-194304 <DOI:10.1103/PhysRevLett.102.194301>; May 2009.
Zang et al.; Multimodal fast optical interrogation of neural circuitry; Nature; 446(7136); pp. 633-639; Apr. 2007.
Zhao et al.; Altered default mode network activity in patient with anxiety disorders: an fMRI study; European Journal of Radiology; 63(3); pp. 373-378; Sep. 1, 2007.
Tyler; U.S. Appl. No. 16/618,101 entitled "Systems and methods for generating an elastogram of brain tissue using mesoscopic wavelength ultrasound," filed Nov. 27, 2019.
Hool et al.; U.S. Appl. No. 16/642,750 entitled "In-ear electrode assembly for non-invasive nerve stimulation," filed Feb. 27, 2020.
Tyler; U.S. Appl. No. 18/335,541 entitled "Methods and devices for modulating cellular activity using ultrasound," filed Jun. 15, 2023.

* cited by examiner

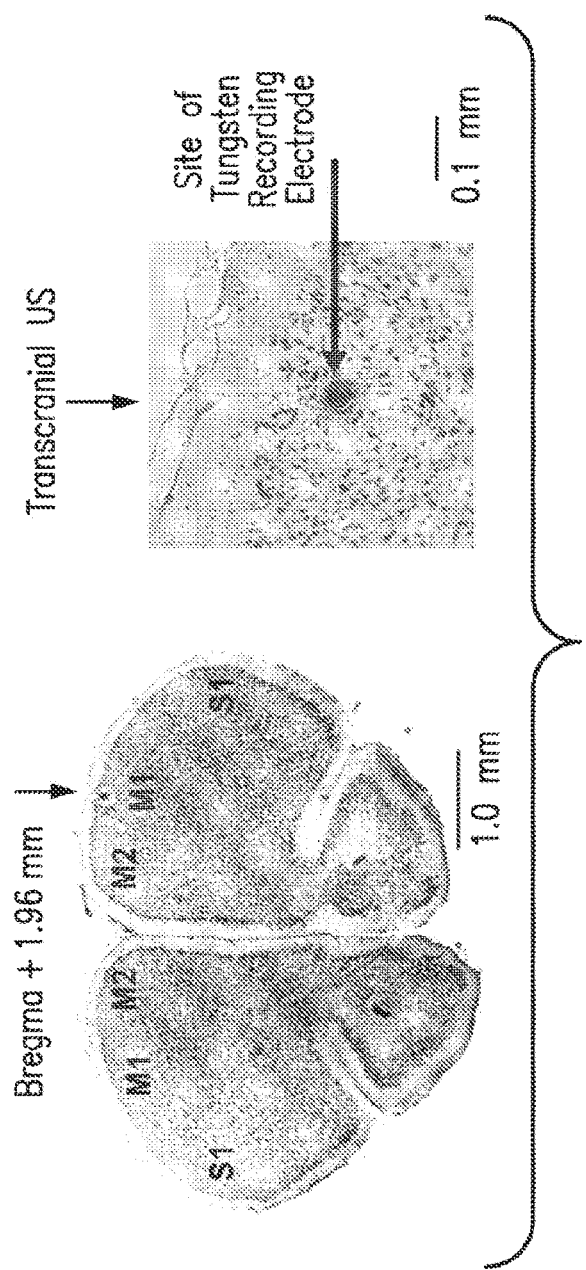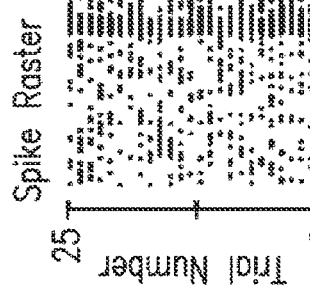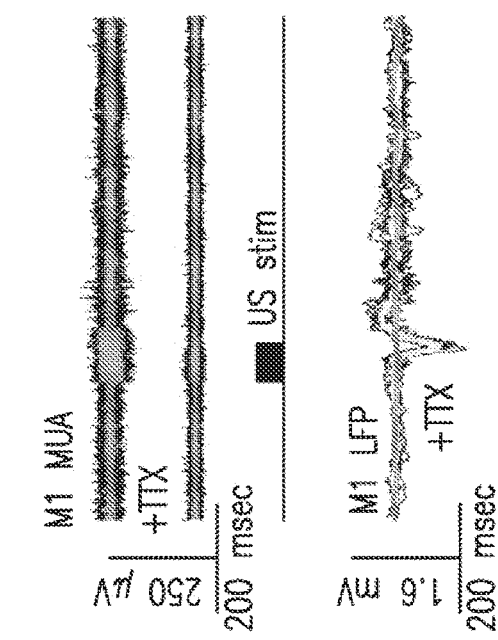
FIG. 12A
FIG. 12B
FIG. 12C

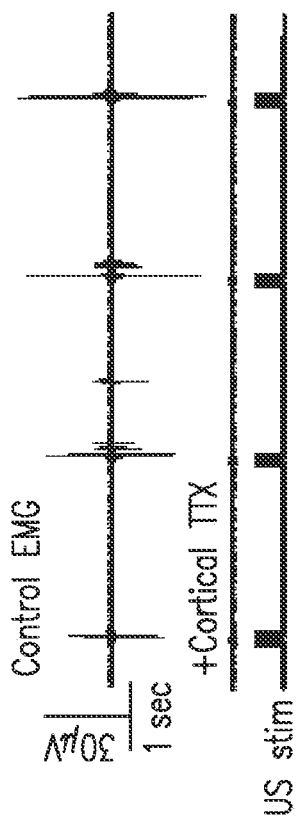
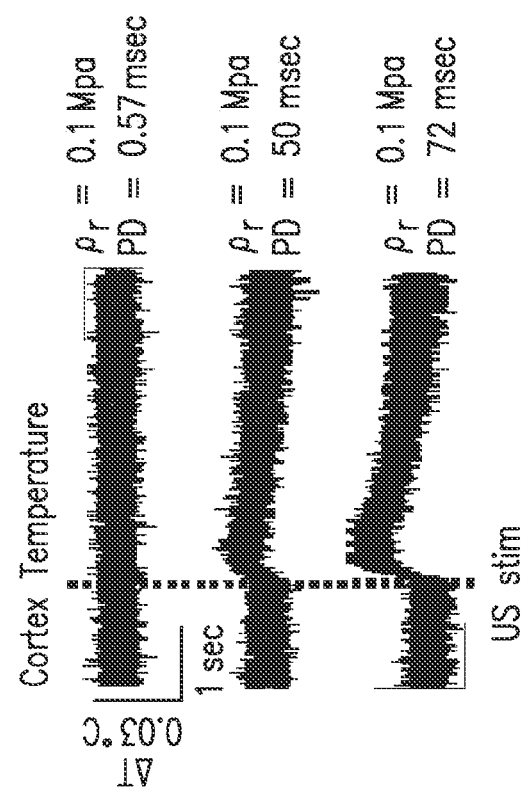
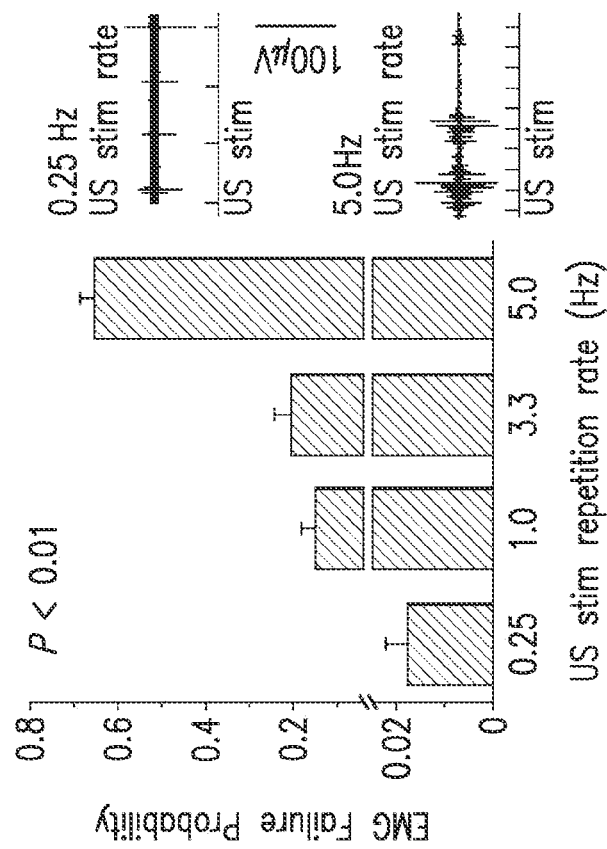
FIG. 13C
FIG. 13D
FIG. 13E

ULTRASOUND MODULATION OF BRAIN ACTIVITY

CROSS REFERENCE TO RELATED APPLICATIONS

This application is a continuation of U.S. patent application Ser. No. 17/468,583, filed Sep. 7, 2021, which is a continuation of U.S. patent application Ser. No. 16/211,143, filed Dec. 5, 2018, now U.S. Patent Application Publication No. 2019/0105517, which is a continuation of U.S. patent application Ser. No. 15/014,805, filed Feb. 3, 2016, now U.S. Patent Application Publication No. 2016/0220850, which is a continuation application of U.S. patent application Ser. No. 13/453,179, filed Apr. 23, 2012, now U.S. Patent Application Publication No. 2012/0289869, which is a continuation of PCT/US2010/055527, filed Nov. 4, 2010, which claims the benefit of U.S. Provisional Patent Application No. 61/257,915, filed Nov. 4, 2009, the contents of which are incorporated herein in their entirety.

FIELD

The present invention is directed to devices and methods for modulating brain activity using ultrasound, particularly devices and methods that provide ultrasound wavelengths to neural tissues.

BACKGROUND

Ultrasound (US) has been used for many medical applications, and is generally known as cyclic sound pressure with a frequency greater than the upper limit of human hearing. The production of ultrasound is used in many different fields, typically to penetrate a medium and measure the reflection signature or to supply focused energy. For example, the reflection signature can reveal details about the inner structure of the medium. A well known application of this technique is its use in sonography to produce a picture of a fetus in a womb. There are other applications which may provide therapeutic effects, such as lithotripsy for ablation of kidney stones or high-intensity focused ultrasound for thermal ablation of brain tumors.

A benefit of ultrasound therapy is its non-invasive nature. Neuromodulation techniques such as deep brain stimulation (DBS) and repetitive transcranial magnetic stimulation have gained attention due to their therapeutic utility in the management of numerous neurological/psychiatric diseases. These methods for stimulating neuronal circuits have been demonstrated to hold promise for the treatment of such diseases and disorders as Parkinson's, Alzheimer's, coma, epilepsy, stroke, depression, schizophrenia, addiction, neurogenic pain, cognitive/memory dysfunction, and others.

What is needed are devices that can provide effective ultrasound therapy to neural tissue, such as the brain, for continuous or short-term applications. Devices that could provide treatments shortly after injury to neural tissue would also be desirable.

SUMMARY OF THE DISCLOSURE

The present invention comprises methods and devices for modulating the activity or activities of the brain in humans and other organisms. Methods of the present invention comprise application of ultrasound (US) to the brain to affect the brain and modulate the brain's activities. Devices of the present invention comprise an ultrasound device operably attached to or associated with a head containing a brain, the ultrasound device may comprise one or more components for generating ultrasound waves, such as ultrasonic emitters, transducers, piezoelectric transducers, piezopolymer transducers, composite transducers, gas matrix piezoelectric transducers, CMUTs (capacitive micromachined ultrasound transducers), and may be provided as single or multiple transducers or in array configurations. Ultrasound transducer elements may also comprise focusing lenses such as acoustic hyperlenses or metamaterials when providing ultrasound waves to affect brain regions. The lenses or metamaterials are useful for brain regions with a size below wavelength diffraction limits of some ultrasound used to treat the brain targets. Optionally, the ultrasound device may comprise power sources, components for transmitting or receiving data, components for remote activation of the ultrasound transducers or other components, global positioning components or other location or tracking components. The ultrasound waves provided may be of any shape, and may be focused or unfocused, depending on the application desired. The ultrasound may be at an intensity in a range of about 0.0001 mW/cm$^2$ to about 100 W/cm$^2$ and an ultrasound frequency in a range of about 0.02 to about 10.0 MHz at the site of the tissue to be modulated.

Methods of the present invention comprise modulating brain activity by providing ultrasound waves to the brain, or particular brain regions, or brain efferents or brain afferents of one or more regions, or combinations thereof, at an effective intensity and for an effective time range so that the brain activity is altered. It is contemplated that an ultrasound device that is operably attached to the subject, such as an ultrasound device comprising a helmet comprising at least ultrasound generating components, is used to provide the ultrasound treatments described herein. Such ultrasound methods and treatments described herein may also be provided to a subject using ultrasound components that are not incorporated into a wearable device, but are attached directly to the subject or are at some physical distance from the subject.

Methods comprise modulating brain activity in a subject by providing an effective amount of at least ultrasound waves to one or more brain structures, for example, by using an ultrasound device, a BRI (Brain Regulation Interface), disclosed herein. A method comprises treating or ameliorating the effects of trauma to the brain by providing an effective amount of ultrasound to a brain region that has received trauma or to a surrounding or remote brain area that may be affected by the trauma. Such a method can reduce the secondary effects of traumatic brain injury. A method comprises impeding or inhibiting memory formation in a subject. A method comprises facilitating the formation of memories. A method of the present invention comprises altering a stress response in a subject. A method comprises activating arousal brain areas to increase alertness, awareness, attention or long-term wakefulness in a subject. A method comprises activation of reward pathways in a subject. Methods of the present invention comprise activation of reward pathways, activating sensory or motor brain regions, and methods for treating humans and animals. Methods of the present invention may comprise combinations of the methods taught herein, and wherein ultrasound is provided by an ultrasound device disclosed herein. Methods disclosed herein may be accomplished by ultrasound devices known to those skilled in the art.

BRIEF DESCRIPTION OF THE DRAWINGS

The accompanying drawings, which are incorporated in and constitute a part of this specification, illustrate several embodiments and together with the description illustrate the disclosed compositions and methods.

FIG. 1C shows a chassis-type body for attachment of transducers, FIG. 1D shows the chassis attached within a helmet, and FIG. 1E shows the chassis positioned on a subject.

FIG. 12A-D shows low-intensity pulsed US stimulates neuronal activity in the intact mouse motor cortex (A) The coronal brain section shows an electrolytic lesion illustrating a recording site from which US-evoked neuronal activity was acquired in M1. (B) (Top) Raw (black) and average (gray; 25 trials) US-evoked MUA recorded from M1 cortex in response to the delivery of pulsed US waveforms. (Middle) Addition of TTX to the cortex reduced synaptic noise and attenuated US-evoked MUA. (Bottom) Raw control (black), average control (green), and average TTX (red) LFP recorded from M1 cortex in response to 25 US stimulus waveforms delivered every 10 s. (C) The spike raster plot illustrates the increase of cortical spiking as a function of time in response to 25 consecutive US stimulation trials. (D) A poststimulus time histogram illustrates the average MUA spike count recorded 500 ms prior to and 500 ms following the delivery of US stimulus waveforms to motor cortex. Data shown are mean±SEM.

FIG. 13A-E shows transcranial stimulation of motor cortex with pulsed US functionally activates descending corticospinal motor circuits in intact mice. (A) Raw (left) and full-wave rectified (FWR; right) EMG traces obtained for a spontaneous muscle twitch (top) and average (ten trials) increase in muscle activity produced by transcranial US stimulation of motor cortex (bottom). The duration of the US stimulus wave-form (black), average US-evoked EMG trace (gray), and EMG integral (gray dashed line) are shown superimposed at lower right. (B) EMG response latencies (top) and amplitudes (bottom) recorded from the left triceps brachii in response to right motor cortex stimulation are plotted as a function of trial number repeated at 0.1 Hz. Individual US-evoked raw EMG traces are shown for different trials (right). (C) EMG failure probability histograms are shown for four progressively increasing stimulus repetition frequencies (left;). Raw US-evoked EMG traces are shown for two different stimulus repetition frequencies (right). Data shown are mean±SEM. (D) Raw EMG traces illustrating application of TTX to the motor cortex blocks US-evoked descending corticospinal circuit activity. (E) Raw (black) and averaged (gray; ten trials) temperature recordings obtained from motor cortex in response to transmission of US waveforms with short pulse durations (PD) used in stimulus waveforms (top). Similarly, temperature recordings of cortex in response to waveforms having a PD ~100 times longer than those used in stimulus waveforms (middle and bottom).

DETAILED DESCRIPTION

Figure 1A:
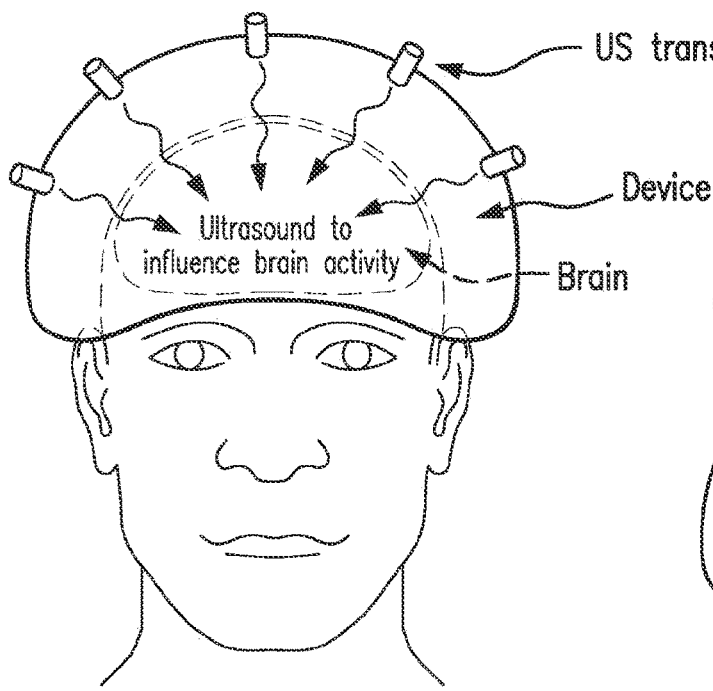
FIG. 1A-E are diagrams that illustrate exemplary systems and devices for modulating brain activity. 1A shows device comprising ultrasound transducers, 1B shows a cross-section of the body portion and the transducers of 1A.

The present invention comprises methods and devices for modulating the activity of the brain of humans or animals. The methods and devices comprise use of ultrasound waves directed to the brain in living subjects. Methods of the present invention comprise providing an effective amount of ultrasound waves, such as low intensity, low frequency ultrasound, low intensity ultrasound, or other intensity or frequency ultrasound to the brain to affect the brain and modulate the brain's activities, and to alter or control physiological or behavioral responses by the body of the subject.

Devices of the present invention comprise a device operably connected to the subject comprising one or more components for generating ultrasound waves, herein referred to as transducers, and including but not limited to, ultrasonic emitters, transducers or piezoelectric transducers, piezocomposite transducers, piezopolymers, CMUTs (capacitive micromachined ultrasound transducers), and which may be provided as single or multiple transducers or in array configurations. The ultrasound waves provided may be of any shape or amplitude, and may be focused or unfocused, depending on the application desired. The ultrasound may be at an intensity in a range of about 0.0001 mW/cm$^2$ to about 100 W/cm$^2$ and an ultrasound frequency in a range of about 0.02 MHz to about 10.0 MHz at the site of the cells or tissue to be modulated.

One or more cooling components may be incorporated into the body of the device, or may be placed on the scalp before, during or after providing ultrasound waves to the head. A cooling component may be ultrasound transparent, so that the waveforms, intensity and/or frequency are not altered by the cooling component. A cooling component may be an ice bag; a freezable container that is chilled by placing in a cold location, such as a freezer; a container of chemicals such that a chemical reaction can be initiated that is endothermic and cools the container; a mechanically chilled material or container which is cooled by mechanical means; or any other material or container known in the art that may provide a cool or cold surface that may be applied to the head of a subject.

As disclosed herein, aspects of the invention are described in the context of providing ultrasound to mammalian brain tissue, which includes specific regions of the brain, or brain afferents or brain efferents, or providing ultrasound to one or more brain regions, combinations of these, or to cause alterations in synthesis, release or uptake of neurotransmitters. For example, the brain may comprise tissue with neurons within it located in the head region, neural precursor cells, such as neural stem cells, neurons, axons, neural cell bodies, ganglia, dendrites, synaptic regions, neuronal tissue, or other cells positioned in the brain of a living organism among neurons, such as glial cells, oligodendrites, or astrocytes. Treatments of neural cells is disclosed in PCT/US2009/050560, which is incorporated herein in its entirety.

Ultrasound has been shown to influence neuronal activity by suppressing the amplitudes and/or conduction velocity of evoked action potentials. The use of moderate and high intensity, high-frequency ultrasound and long exposure times to control neuronal activity minimizes ultrasound's practicality for modulating neuronal activity in living organisms. The present invention comprises methods for low-intensity (<500 mW/cm$^2$), low-frequency ultrasound (<0.9 MHz) and effects on cellular modulation, such as methods for influencing neuronal activity. For example, low intensity may comprise about 450 mW/cm$^2$, 400 mW/cm$^2$, 350 mW/cm$^2$, 300 mW/cm$^2$, 250 mW/cm$^2$, 200 mW/cm$^2$, 150 mW/cm$^2$, 100 mW/cm$^2$, 50 mW/cm$^2$, 25 mW/cm$^2$, 10 mW/cm$^2$, and levels of ultrasound intensity within these stated amounts, including from about 450 m W/cm$^2$ to about 1 mW/cm$^2$. Other intensities that are contemplated by the present invention comprise from about 1 W/cm$^2$ to about 100 W/cm$^2$. For example, an acoustic intensity of the present invention may comprise about 1 W/cm$^2$, about 2 W/cm$^2$, about 3 W/cm$^2$, about 4 W/cm$^2$, about 5 W/cm$^2$, about 10 W/cm$^2$, about 15 W/cm$^2$, about 20 W/cm$^2$, about 25 W/cm$^2$, about 30 W/cm$^2$, about 40 W/cm$^2$, about 50 W/cm$^2$, about 60 W/cm$^2$, about 70 W/cm$^2$, about 75 W/cm$^2$, about 80 W/cm$^2$, about 90 W/cm$^2$, about 100 W/cm$^2$, or in a range of about 10 mW/cm$^2$ to about 500 mW/cm$^2$. Low frequency ultrasound may comprise ranges from about 0.88 MHz to about 0.01 MHz, from about 0.80 MHz to about 0.01 MHz, 0.80 MHz to about 0.1 MHz, from about 0.70 MHz to about 0.1 MHz, from about 0.60 MHz to about 0.1 MHz, from about 0.50 MHz to about 0.1 MHz, from about 0.40 MHz to about 0.1 MHz, from about 0.30 MHz to about 0.1 MHz, from about 0.20 MHz to about 0.1 MHz, from about 0.10 MHz to about 1.0 MHz, and ultrasound frequencies within these ranges. Other frequencies contemplated by the present invention comprise ranges from about 0.1 MHz to about 1.5 MHz, from about 0.1 to about 1.3 MHz, from about 0.1 to about 1.0 MHz, from about 0.1 to about 0.9 MHz, from about 0.1 to about 0.8 MHz, from about 0.1 to about 0.5 MHz, from about 0.1 to about 0.4 MHz, from about 0.5 to about 1.5 MHz, from about 0.7 to about 1.5 MHz, from about 1.0 to about 1.5 MHz, from about 0.02 MHz to about 10 MHz, and ultrasound frequencies within these ranges.

As used herein, the cited intensities and frequencies are the intensity and frequency levels at the target tissue site, not the actual output number of the transducer. For example, the pressure waveform experienced at the site of the target tissue would have a frequency below about 0.9 MHz and an intensity below about 900 mW/cm$^2$. The output of a transducer may have to be much larger than the resulting effective amount at the target tissue site. For example, a transducer may output 0.9 MHz ultrasound at about 90 W for transmission through an intact scalp and skull for the effective amount at the brain tissues being treated to be about 0.9 MHz and below about 900 mW/cm$^2$, as the skull absorbs a significant portion of ultrasound waves. Thus, the frequencies and intensities stated and claimed herein are the frequencies and intensities experienced at the target tissue site, not the output of the ultrasound transducers.

As used herein, providing ultrasound waves to a target site to modulate brain activity comprises providing an ultrasound stimulus waveform to a subject. The ultrasound stimulus waveform may also alternatively be referred to herein as a waveform, and the two terms are used interchangeably as can be understood by those skilled in the art. As used herein, modulating brain activity means altering the brain activity in one or more sites of the brain. The brain activity may be increased or decreased by the action of at least the ultrasound waves, which may include increasing or decreasing neuron firing, receptivity, release or uptake of neurohormones, neurotransmitters or neuromodulators, increase or decrease gene transcription, protein translation or protein phosphorylation or cell trafficking of proteins or mRNA, or affect the activity of other brain cell or structure activity.

A stimulus waveform may be provided to a subject, human, animal or other subjects, once or multiple times in a single treatment, or in a continuous treatment regimen that continues for a day, days, weeks, months, years, or for the life of the subject. Determining the length of treatment needed is within the skills of medical and/or research professionals. It is contemplated by the present invention that a stimulus waveform may be pulsed or continuous, have one or multiple frequencies, and other characteristics as described herein. For example, in particular methods, a pulsed ultrasound stimulus waveform may be transmitted for about 10 microseconds, for about 25 microseconds, for about 50 microseconds, for about 100 microseconds, for about 250 microseconds, for about 500 microseconds, for about 1000 microseconds, for about 2000 microseconds, for about 3000 microseconds, for about 4000 microseconds, for about 5000 microseconds, for about 1 second, for about 2 seconds, for about 3 seconds, for about 4 seconds, for about 5 seconds, for about 6 seconds, for about 7 seconds, for about 8 seconds, for about 9 seconds, for about 10 seconds, and then this treatment may be repeated for the same or a different length of time, one or more times. For example, a stimulus waveform may be provided every 11 seconds for a duration of about 250 microseconds for years, or for the life of the subject.

Figure 3:
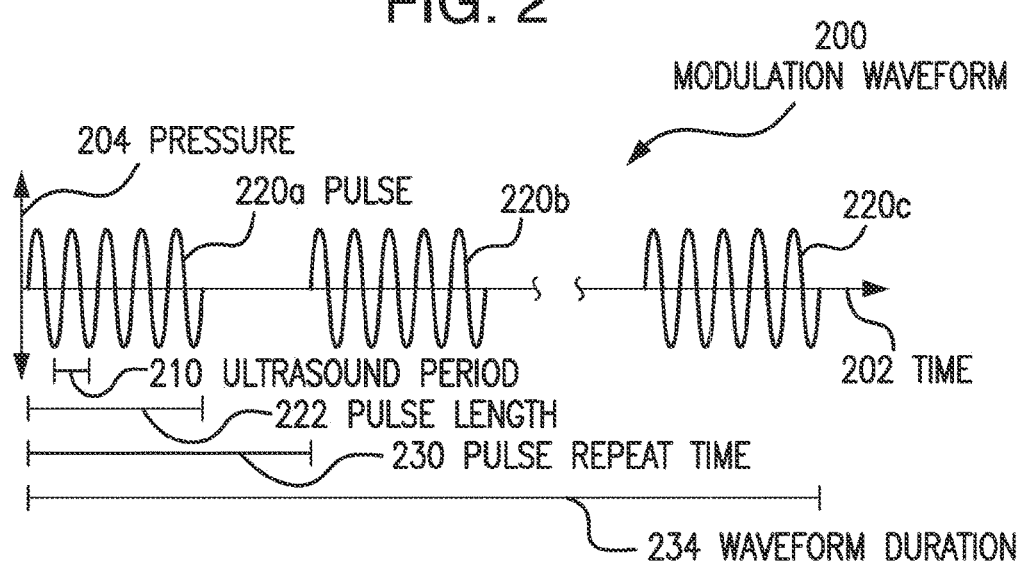
FIG. 3 illustrates an exemplary embodiment of a pulsing strategy used to generate ultrasound stimulus waveforms that provide ultrasound energy to the brain or neural tissue for modulation of activity.

FIG. 3 illustrates ultrasound waves in a graph that illustrates an example ultrasound waveform 200 for modulating neural activity, according to an embodiment. The horizontal axis 202 indicates time, and the vertical axis 204 indicates pressure, both in arbitrary units. The modulating waveform 200 contains one or more pulses, such as pulse 220a and pulse 220b and pulse 220c. Each pulse includes one or more cycles at an ultrasound frequency. For example, pulse 220a includes five cycles of an ultrasound frequency with a period ($\tau$) 210 in seconds equal to the reciprocal of the frequency (f) in Hertz (i.e., $\tau=1/f$). The number of cycles in a pulse is designated cycles per pulse (c/p). The pulse length 222 is designated PL and is given in seconds by the product of the period t and number of cycles per pulse c/p, i.e., $PL=\tau*c/p$.

Pulses are separated by quiescent periods that are related to the time between pulse starts, shown in FIG. 3 as pulse repeat time 230. The reciprocal of the pulse repeat time 230 in seconds is the pulse repeat rate in Hertz, designated herein the pulse repeat frequency PRF, to distinguish it from the ultrasound frequency f. In some embodiments, the pulse repeat frequency PRF is a constant for a waveform 200. In some embodiments, the pulse repeat frequency PRF increases from a minimum (PRFmin) to a maximum (PRFmax) over a time interval called a ramp time. For example, in some embodiments, PRF increases from PRFmin=0 to PRFmax=3000 Hz over ramp time=5 seconds. In other embodiments the PRF is not swept and may range from 0.001 kHz to 900 KHz. The waveform continues for a waveform duration 234 that ends with the last pulse in the waveform. The number of pulses in the waveform is designated Np.

The pressure amplitude of the ultrasound wave is proportional to a voltage range used to drive a piezoelectric transducer(s), for example a lead zirconate titanate (PZT) transducer or other piezoelectric element. For example, a voltage range may be selected between 100 milliVolts (mV. 1 mV=$10^{-3}$ Volts) and 50 V, which correspond to intensity levels less than 500 mW/cm$^2$ depending on the sensitivity and output characteristics of the transducer(s) used Although pulses may be sine waves having a single ultrasound frequency herein, other oscillating shapes may be used, such as square waves, or spikes, or ramps, or a pulse includes multiple ultrasound frequencies composed of beat frequencies, harmonics, or a combination of frequencies generated by constructive or deconstructive interference techniques, or some or all of the aforementioned.

The present invention comprises devices, methods using such devices, and systems for modulation of brain structures, which results in modulation of the activities of such structures. Such devices, systems and methods comprise providing ultrasound waves to brain structures, cells or other tissues. Exemplary embodiments of devices and methods of the present invention are provided herein. Methods comprise providing ultrasound to a subject, for example, by the use of one or more low intensity, low frequency ultrasound and/or low intensity ultrasound, or one or more other ultrasound intensity or frequency transducers. For example, an ultrasound (US) transducer can be acoustically coupled to an external surface of a subject, or alternatively, the US transducer can be in an acoustically effective range of the target tissue. The ultrasound transducer is then be driven to form stimulus waveforms in the tissue, cell, or organ, for example with an intensity below about 100 Watts per square centimeter (mW/cm$^2$), below about 1 W/cm$^2$, or below about 500 mW/cm$^2$. The ultrasound waveforms may comprise one or multiple frequencies.

In an embodiment, driving the ultrasound transducer comprises driving the ultrasound transducer to form a pressure fluctuation waveform or a stimulus waveform including a plurality of pulses, each pulse of duration less than about 10000 microseconds (μs). Pulse duration may be variable depending on a particular method or device, and may have a duration of about 10 seconds or less, such as about 100 to 10000 microseconds. Driving the ultrasound transducer may comprise driving the ultrasound transducers to form a pressure fluctuation waveform or a stimulus waveform with a plurality of pulses within a waveform duration that is less than about ten second (s). This comprises only one stimulus waveform and this waveform may be repeated a nearly infinite number of times. As used herein, pressure fluctuation waveform and stimulus waveform are used interchangeably.

Driving the ultrasound transducer may comprise driving the ultrasound transducers to form a stimulus waveform at a frequency above about 0.20 MHz. The waveform may be one or more of known waveforms arbitrary or not, including but not limited to, sine, square, sawtooth, triangle, ramps and spikes. The ultrasound waves may be focused to provide action at a particular site in or on the subject, or focused at more than one site, or the waves may be unfocused and provide action at multiple sites. The waves may be continuous or pulsed, depending on the desired application. The frequency or intensity may be uniform throughout a treatment period, or may alternate or sweep from one number to another, and back to the original number. Those skilled in the art are able to determine such parameters for the desired application. Examples are disclosed herein.

The acoustic frequency and intensity characteristics of an UNMOD stimulus underlie its core effect on brain activity. A broad range of acoustic frequencies, intensities, and transmission modes have been used to produce variable excitation and inhibition of neuronal activity. The acoustic frequencies used to manipulate neuronal activity range from 0.25 MHz (Tufail et al., 2010) to 7.0 MHz (Mihran et al., 1990b). While lower frequencies of US have longer wavelengths and lower spatial resolutions than higher frequencies, acoustic frequencies <1 MHz for stimulating intact brain circuits using US are a useful range. US<0.7 MHz represents the frequency range where optimal gains between transcranial transmission and brain absorption of US have been observed (Hayner and Hynynen, 2001; White et al., 2006a, b). In mice, optimal waveforms for evoking intact brain circuit activity are composed of acoustic frequencies ranging between 0.25 and 0.50 MHz (Tufail et al., 2010). For these ranges, implementing broadband transducers, which have a center frequency between 0.2 and 0.7 MHz for UNMOD is useful. Use of immersion-type (water-matched) transducers coupled to the skin with US gel to minimize acoustic impedance mismatches when transmitting acoustic energy from a transducer into the brain is also contemplated by the present invention.

Other waveform variables, in addition to acoustic frequency and transducer characteristics, such as mode of transmission (continuous wave versus pulsed wave) and pulse profile (cycles per pulse, cp; pulse repetition frequency, PRF; and number of pulses, np) may affect the intensity characteristics of any given US stimulus waveform. Those skilled in the art can determine an intensity profile for a stimulus waveform. In in vitro studies (Tyler et al., 2008), stimulus waveforms composed of US pulses having a high pulse intensity integral (P//; ≈4.0 J/cm$^2$) were used, which were repeated at slow PRFs (≈, 50 Hz) for long durations (≈, 5 sec). Stimulation of brain activity in vivo may use other US waveforms. For example, stimulus waveforms constructed of US pulses having a low P// (<0.1 mJ/cm$^2$), which were repeated at high PRFs (1.0-3.0 kHz) for short durations (<0.4 sec) were effective for stimulating normal brain circuit activity in vivo (Tufail et al., 2010). These two different US pulsing strategies (high P// with a low PRF for in vitro stimulation versus a low P// with a high PRF for in vivo), indicated optimal US waveforms for triggering brain activity and have low temporal average intensity values in a range between 30 and 300 mW/cm$^2$.

In addition to the general pulsing strategies described herein, US transmitted in a continuous wave (CW) mode is capable of influencing brain activity, and may show different effects and time courses compared to pulsed US. Short bursts of pulsed US can stimulate brief (tens of milliseconds) periods of neuronal activity and US stimuli delivered in CW-mode for 5 seconds can induce seizure activity lasting >20 seconds in normal mice, and can disrupt kainic acid-induced electrographic seizure activity in epileptic mice. Repeated short bursts of pulsed US can attenuate seizure activity in epileptic mice indicating UNMOD may be a general interference source for disrupting aberrant activity. The influence of US stimuli on brain activity patterns may depend on stimulus amplitude, duration, and temporal frequency, as well as the initial state of the brain when stimulation ensues. The implementation of any particular UNMOD stimulus waveform or transmission approach may depend on the outcome sought.

Disclosed herein are several methods for delivering US across the skin and skull in order to achieve brain stimulation. For example, an aspect of the present invention comprises use of unfocused US for stimulating broad, nonspecific brain regions. A nonspecific brain stimulation method with single element planar US transducers can be useful depending on the desired outcome. For example, unfocused US transmitted from planar transducers may rapidly terminate seizure activity in mice suffering from epilepsy or for treating a variety of other brain diseases including severe or mild traumatic brain injuries.

Transmission of US from the transducer into the brain may occur at points where acoustic gel is coupling the transducer to the head. One may cover the entire face of the transducer with acoustic gel to prevent transducer face heating and damage. Alternatively, coupling the transducer to the head through small gel contact points may be a physical method for transmitting US into restricted brain regions. The spatial envelope of US transmitted into the brain may be laterally restricted by using acoustic collimators. The use of acoustic collimators allows one to stimulate restricted brain regions in a targeted manner. Single element focused transducers may be used for delivering spatially restricted acoustic pressure fields to brains. Such single element focused transducers can be manufactured having various focal lengths depending on the size and center frequency of the transducer. An aspect of the invention comprises using air-coupled transducers to deliver transcranial pulsed ultrasound into the brain from single-element transducers or from phased arrays as described below. In aspects, gel-filled pads or other fluid filled bladders may be used for acoustically coupling transducers to the skin and or the skull in brain regulation interface designs.

A focusing method may involve the use of multiple transducers operating in phased arrays to focus US through the skull to specific brain regions. US can be focused through human skulls using phased transducer arrays. Although the spatial resolution for focusing US is currently limited by the acoustics or wavelength employed, recent advances in focusing US with adaptive optics (Zhang et al., 2009) allows US to gain spatial resolutions below the diffraction limits, similar to that recently achieved in optical microscopy (Abbott, 2009). US may confer spatial resolutions similar those achieved by DBS electrodes. Aspects of methods described herein contemplate use of subdiffraction methods using hyperlenses, metamaterials, and acoustic bullets with nonlinear lenses.

Figure 8A:
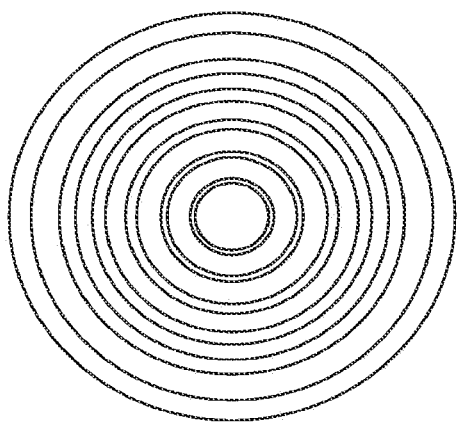
FIG. 8A-F illustrates exemplary arrangements of phased array transducers.
Figure 8B:
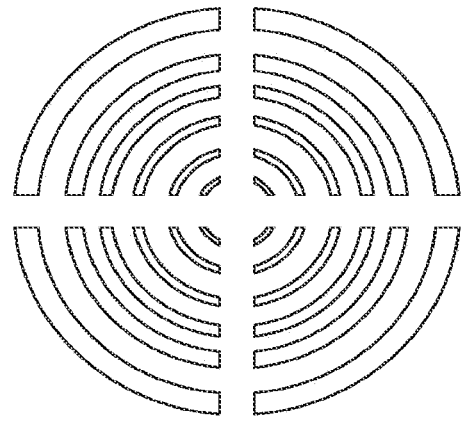
Figure 8C:
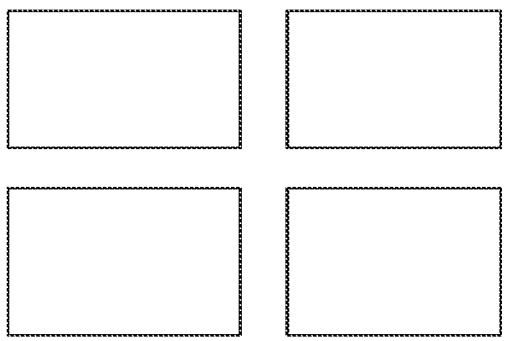
Figure 8D:
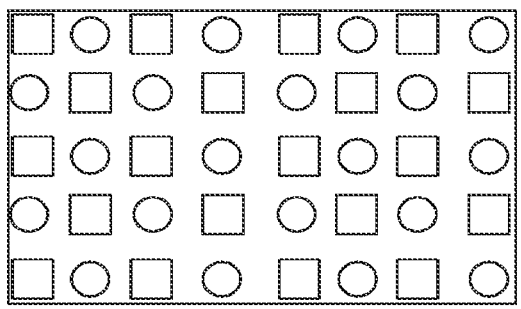
Figure 8E:
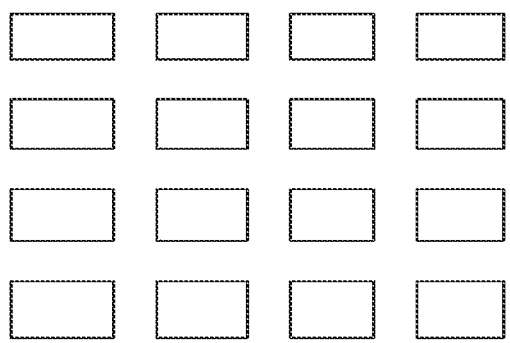

One or more US transducer may function individually or in multiples, such as in one or more arrays. FIG. 8A-F illustrate exemplary arrangements of phased array transducers. FIG. 8A, shows a specific arrangement of a phased array transducer, for example, made from a piezoelectric material such as polyvinylidene fluoride (PVDF). The darker areas represent the active region of the phased array. FIG. 8B shows a different phased array arrangement containing 24 elements. Different phased array arrangements may contain differing numbers of elements, any of which can be used in an ultrasound device of the present invention. For example, depending on the intended use and the intended brain structure to be targeted, an ultrasound device of the present invention may have circular arrays like those of 8A or B, or may have arrays arranged in rectangular patterns like those of 8C or E, or both, as in 8D. Piezoelectric materials can be flat or curved in convex or concave orientations.

Figure 8F:
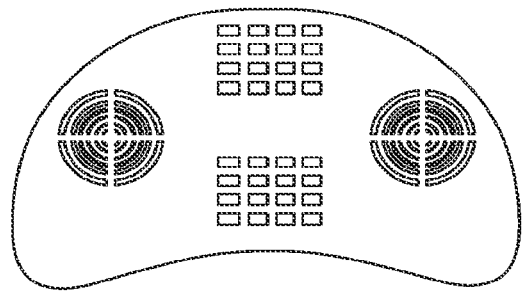

An ultrasound device of the present invention may use any combination of curved, concave, convex, or flat phased arrays in any desired geometrical shape or arrangement necessary to produce a focused or unfocused ultrasound field in one or more brain regions or structures. Phased arrays may be mounted statically on or in the body of an ultrasound device of the present invention, or may have piezoactuators or other motion control devices to change the shape and/or position of one or more transducers or one or more arrays. Such movement control allows for adjustments or changes to focus the ultrasound fields. Such adjustments or changes may be made in response to feedback information received from the subject wearer or made by other controllers, such as a remote control site. FIG. 8F illustrates an ultrasound device of the present invention comprising multiple phased arrays, wherein two arrays are in a circular arrangement and two arrays are in a rectangular arrangement.

Figure 10A:
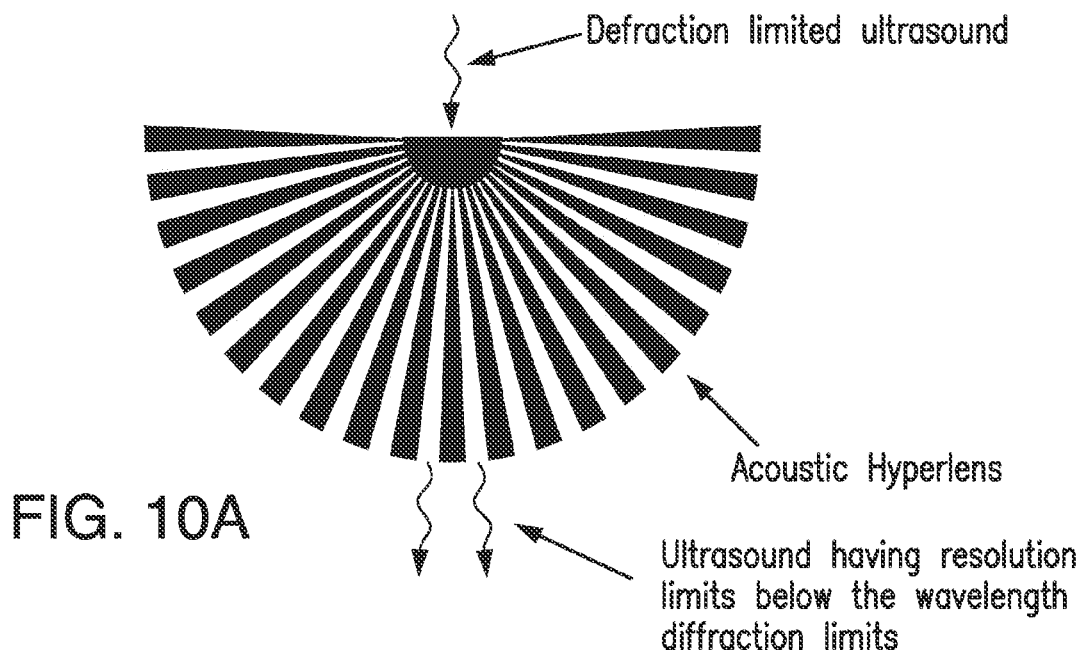
FIG. 10A-B illustrate exemplary examples of an acoustic hyperlens (A) and such an acoustic hyperlens or metamaterials attached to ultrasound transducers and an ultrasound device (B) for achieving subdiffraction spatial resolutions in treating very small brain regions with ultrasound.
Figure 10B:
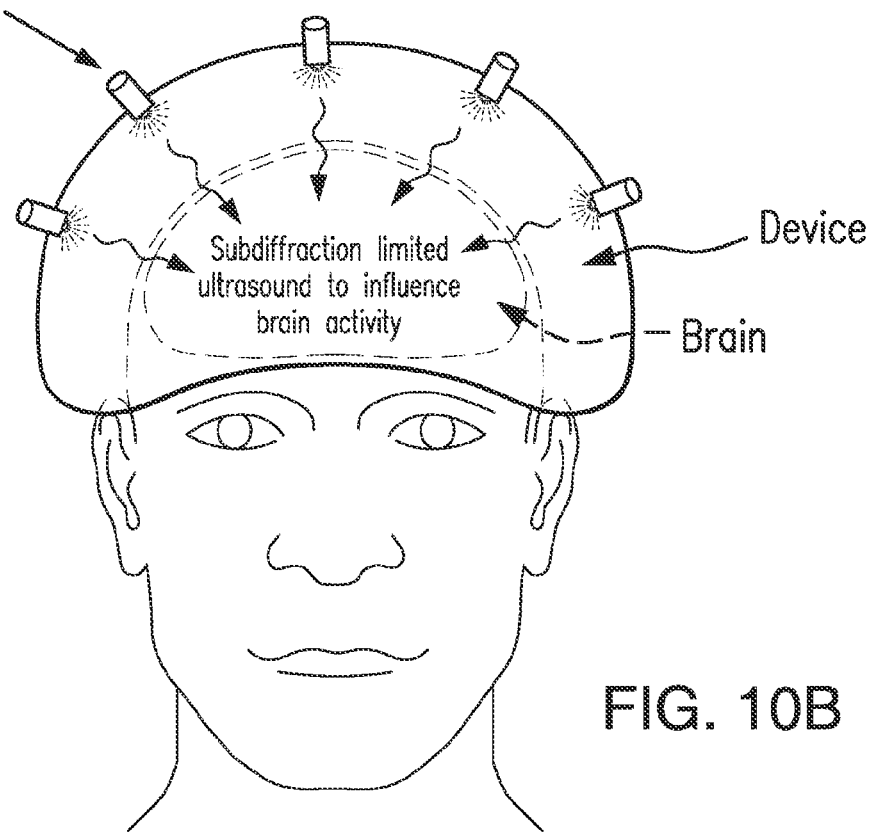

In other aspects of the device or methods, acoustic hyperlenses or metamaterials may be used to achieve focusing and spatial resolutions of the ultrasound waves below the diffraction limits. See FIG. 10 which shows an illustration of an ultrasound device of the present invention comprising an acoustic hyperlens. Systems, methods and devices for providing ultrasound for the present invention may comprise materials that bend light or sound and can focus the waves. Such materials have been used to make hyperlenses, also referred to as superlenses or metamaterials. Such materials, superlenses and other similar components may be used to focus the ultrasound waves in the methods and devices of the present invention. For example, transducers, of any type, in conjunction with a focusing element such as a hyperlens or metamaterial are used for focusing the ultrasound waves used to modulate brain activity. Such materials can refract light backward, or have a negative index of refraction. Acoustic metamaterials can manipulate sound waves in many ways, including but not limited to, collimation, focusing, cloaking, sonic screening and extraordinary transmission. An example of a hyperlens comprises a non-resonant radially symmetric layered structure as taught in Li, et al., Nature Materials, DOI: 10:1038, NMAT2561, p. 1-4, 25 Oct. 2009, herein incorporated in its entirety.

As used herein, a device of the present invention capable of delivering ultrasound to a human or animal subject may be referred to as an ultrasound device or as a Brain Regulation Interface (BRI), and such terms are used interchangeably. In general, an ultrasound device may be worn on the head of a subject and the device comprises at least one ultrasound transducer for providing ultrasound waves to a portion of the brain of the subject. The methods of providing ultrasound herein may be used on exposed brain tissue, with allowance for the effect removal of the skull would have on the ultrasound amount provided.

A device of the present invention comprises a structure that is acoustically connected with a subject's body, such as a head, that may be removably attached or adjacent to the body part. In some embodiments, transducer can be coupled to the skin of appendages such as the hands or feet using air- or water-matched transducers to stimulate various somatosensory experiences processed by the nervous system including the brain. The structure may comprise elements for providing ultrasound, an ultrasound transducer, including but not limited to, ultrasonic emitters, transducers or piezoelectric transducers, piezocomposite transducers, piezopolymers, and CMUTs.

A device of the present invention comprises at least a body and one or a plurality of components for generating ultrasound waves. The body of a device may be a chassis that is insertable into other head gear, or a body may be head gear such as a cap, a headband, a helmet, a protective head covering, a hood, a stretchable material, a flexible material similar to a scarf that can be tied on the head, or other head gear that may be adapted to hold components for generating sound waves and/or other components. For simplicity, the body of a device is referred to herein as a chassis or as a helmet, but that reference is not meant to be a limitation of the invention. A chassis generally refers to a body of a device that can be physically combined with other head gear. Methods of the present invention may comprise use of ultrasound transducers or other components that are affixed to the head of the subject, such as bolted to the skull bone and under the skin of the scalp, to provide ultrasound waveforms to the brain. One or more, or all, of the components of a device may be held within the body of the device, affixed to the skull or scalp of the subject, or provided in a separate element. The separate element may be provided between the body and the head of the subject or may be exterior to the body of the device.

A device of the present invention comprises a device that is wearable by a subject and used for providing at least ultrasound waves to the brain of the subject, comprising a body which covers at least a portion of a subject's head and/or scalp, when worn by the subject, and a plurality of components, wherein at least one component is an ultrasound component. Head as used herein comprises the region from the top of the shoulder blades, including the neck region and at least the last two vertebrae of the top of the spine, the skull and jaw bones, the ears, and the tissues residing on and within, particularly the brain. The scalp is included within this region and refers to the area of the head where hair grows or where hair can be found in persons who are not bald, not including facial hair. When scalp is referred to, it refers to the region of the head from the forehead, behind the ears, and to the hairline dorsal to the face.

FIG. 1A is a diagram that illustrates an exemplary system for modulating brain activity, according to an embodiment wherein the device comprises a helmet or head covering to be worn on the head of a subject. It is contemplated that the helmet portion is attached to the head by attachment components such as a chin strap or other components used to hold a helmet or hat on a head. It is contemplated that the device is not connected by wires to an external source, though such embodiments may be employed if necessary, for example, for downloading information, or charging a mobile energy source, or providing energy to a device.

To illustrate the operation of a system and device of the present invention, a head is depicted wearing an ultrasound device of the present invention. However, the system or device does not include the head or its external surface. A system or device comprises components for generating ultrasound waves such as ultrasound transducers, of which several are shown, and controller, not shown. The controller may be within the helmet portion, or located at a separate site on the subject's body, or may be located at a separate site on or within the subject's body, such surgically implanted controllers, or carried in a pack or pocket, or may be remote and not attached, to the subject's body. A controller may be built into a transducer. A controller may provide drive voltages and pulse patterns to one or more transducers, or may receive information from a remote or local component and using that information, drive one or more transducers. In some aspects, the transducer may be an emitting transducer, a receiving and transmitting transducer, or a receiving transducer. The ultrasound transducers are connected to a controller for receiving waveform and power, and the transducers are driven by the controller. The transducers are acoustically coupled to the brain in order to introduce acoustic energy into the brain. For example, acoustic coupling may be accomplished using air, water, gel or other acoustic transmitting substrates. Such substrates may be incorporated into ultrasound transducers, or may be provided in separate containers provided between a transducer and the scalp of a subject, or may be applied directed to the scalp of the subject, such as by applying a gel directly to the scalp of a subject. Transducers may be coupled to body parts other than the head in order to provide stimulation of somatosensory experiences, which are processed by the nervous system including the brain. Although applied peripherally, ultrasound transducers coupled to the body for providing somatosensory experiences such as pain, mechanical sensation, and thermal sensations will modify the activity of the brain in certain circuits. Such embodiments and devices are therefore collectively referred to as brain regulation interfaces although coupling of transducers may occur on peripheral tissues. The transducers use the received waveform and power to emit ultrasound frequency acoustic beams or waves, such as those shown as wavy lines entering the brain of the subject in the figures. The controller may comprise a process for waveform formation, which determines the waveform to be emitted by transducers into the brain. For example, a controller may comprise an electrical circuit for providing drive voltages to a piezoelectric transducer so the transducer can deliver ultrasound waveforms to the brain. In some aspects, the transducers are battery powered and receive only waveform information from the controller.

Although a particular number of transducers and controllers are depicted in FIG. 1 for purposes of illustration, in other aspects, more or fewer or the same number of transducers is included, and a controller may be replaced by one or more devices that each perform a different or redundant function of a controller, including the waveform formation process. Controllers and transducers may operate independently of one another or may operate in conjunction with each other such as in a phased array design. Connections between transducers and a controller to send power and waveforms to transducers may be wired, or in other embodiments, one or more connections may be wireless, or carry power or waveforms for multiple transducers.

Transducers may each transmit an acoustic beam into the brain, and some of the beams may intersect. In some aspects, the waveform transmitted in a beam is effective in modulating brain activity everywhere the beam intersects the neural tissue. In some aspects, the waveform transmitted in a beam is only effective, or is more effective, in an intersection region with another beam. In some aspects, the transmitted waveforms are effective in only a portion of the intersection region, dependent upon interference patterns of constructive and destructive interference among the waveforms in the intersecting beams. In some aspects two or more ultrasound beams may intersect with one another or with other materials such as metamaterials outside of the brain to create structured ultrasound patterns, which are then transmitted into the brain to activate or inhibit one or more regions of the brain.

The intensity of the acoustic beam is given by the amount of energy that impinges on a plane perpendicular to the beam per unit time divided by the area of the beam on the plane, and is given in energy per unit time per unit area, i.e., the power density per unit area, e.g., Watts per square centimeter ($W/cm^2$). This is the spatial-peak temporal-average intensity (Ispta); and is used routinely for intensity herein. In aspects, the Ispta at the site of the brain tissue is less than 500 $mW/cm^2$. In aspects of the invention, the Ispta at the site of brain tissue is less than 100 $W/cm^2$. Another definition of intensity widely used in the art is spatial-peak pulse-average intensity (Isppa); for multiple cycle pulses, the Isppa may be less than 10 $W/cm^2$.

Any ultrasound transducer known in the art may be incorporated into the helmet component of the device or bolted to the skull of a subject and used to transmit an acoustic beam into a brain. For example, Olympus NDT/Panametrics 0.5 MHz center frequency transducers, as well as Ultran 0.5 and 0.35 MHz center frequency transducers may be used in devices of the present invention. An ultrasound transducer may be composed of any single or combination of piezoelectric materials known to those skilled in the art, which include piezcopolymers, piezoceramics, piezocomposites, or any other piezoelectric material which responds to a voltage. In some aspects, capacitive micromachined ultrasonic transducer (CMUT) technology may be used. For example, CMUTs may be arranged in flexible array designs that comfortably permit adaptive beam forming and focusing. For example, the CMUTs may be mounted on the inner surface of the helmet region to transmit ultrasound to the brain. CMUTs may be mounted within the helmet material or on the exterior of the helmet to transmit ultrasound to various brain regions. In an aspect, CMUTs may be mounted directly to the skull of the subject through the skin surface or underneath the skin surface to transmit ultrasound waveforms to the brain. In an aspect other piezoelectric materials could be used in place of CMUTs in a similar manner. For example, PVDF or piezocomposites or other piezopolymers could be mounted directly to the skull of a subject through the skin or underneath the skin surface to transmit ultrasound waveforms to the brain. In some aspects, PVDF, piezocomposites or piezopolymers may be arranged in flexible array designs that comfortably permit adaptive beam forming and focusing. An aspect of the invention comprises use of ultrasound transducers or other components in a device of the present invention used in combination with ultrasound transducers or other components that are physically attached to a subject, wherein both the device components and the physically attached components are used to provide methods for brain activity modulation.

Any devices known in the art may be used as a controller or microcontroller. For example, waveforms may be generated using an Agilent 33220A function generator (Agilent Technologies, Inc., Santa Clara, California, USA) and amplified using an ENI 240L RF amplifier. Pulses in some waveforms may be triggered using a second Agilent 33220A function generator. Data controlling the above devices may be generated by waveform formation processes using a general purpose computer with software instructions. Although a system or device is depicted with several transducers and corresponding beams, more or fewer transducers or beams or both may be included in a system or device to produce the desired effect.

Figure 1B:
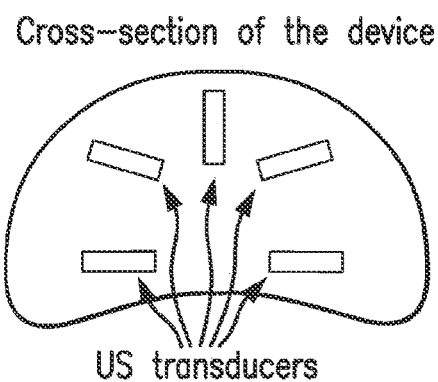
Figure 1C:
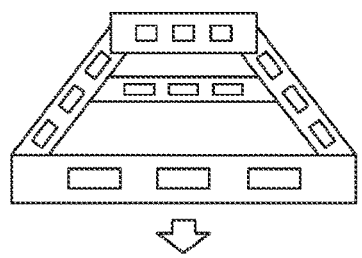
Figure 1E:
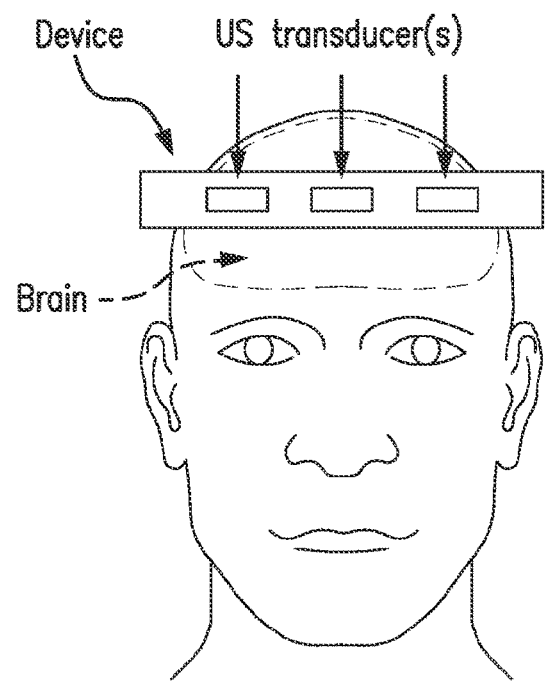
Figure 1D:
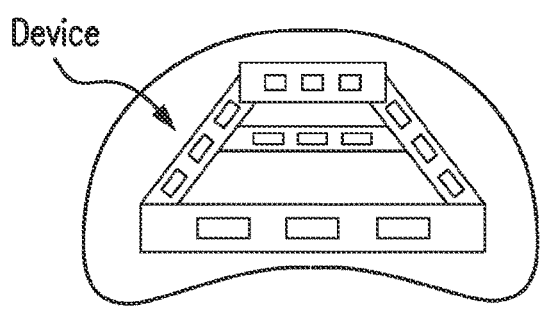

FIG. 1B-E illustrate arrangements of transducers in exemplary embodiments of the present invention. FIG. 1B shows a cross-section of an ultrasound device of the present invention with the transducers placed throughout the helmet component. FIG. 1C shows a chassis-type embodiment which may be removably mounted within head gear such as a protective helmet. Examples of helmet components include military antiballistic helmets, fireman helmets, astronaut helmets, bicycle helmets, sports protective helmets, and fighter pilot helmets. The chassis comprises transducers affixed to the chassis body and may further comprise components for attaching the chassis to a helmet, such as mounting straps, and a suspension system. The chassis can then be inserted into a helmet and worn by a subject so that ultrasound can be applied to the brain of the subject. The chassis can then be removed from the helmet and placed in the same or a different helmet. FIGS. 1D and E show the insertion of the chassis in a helmet and the helmet with the chassis on a subject, respectively.

Figure 2:
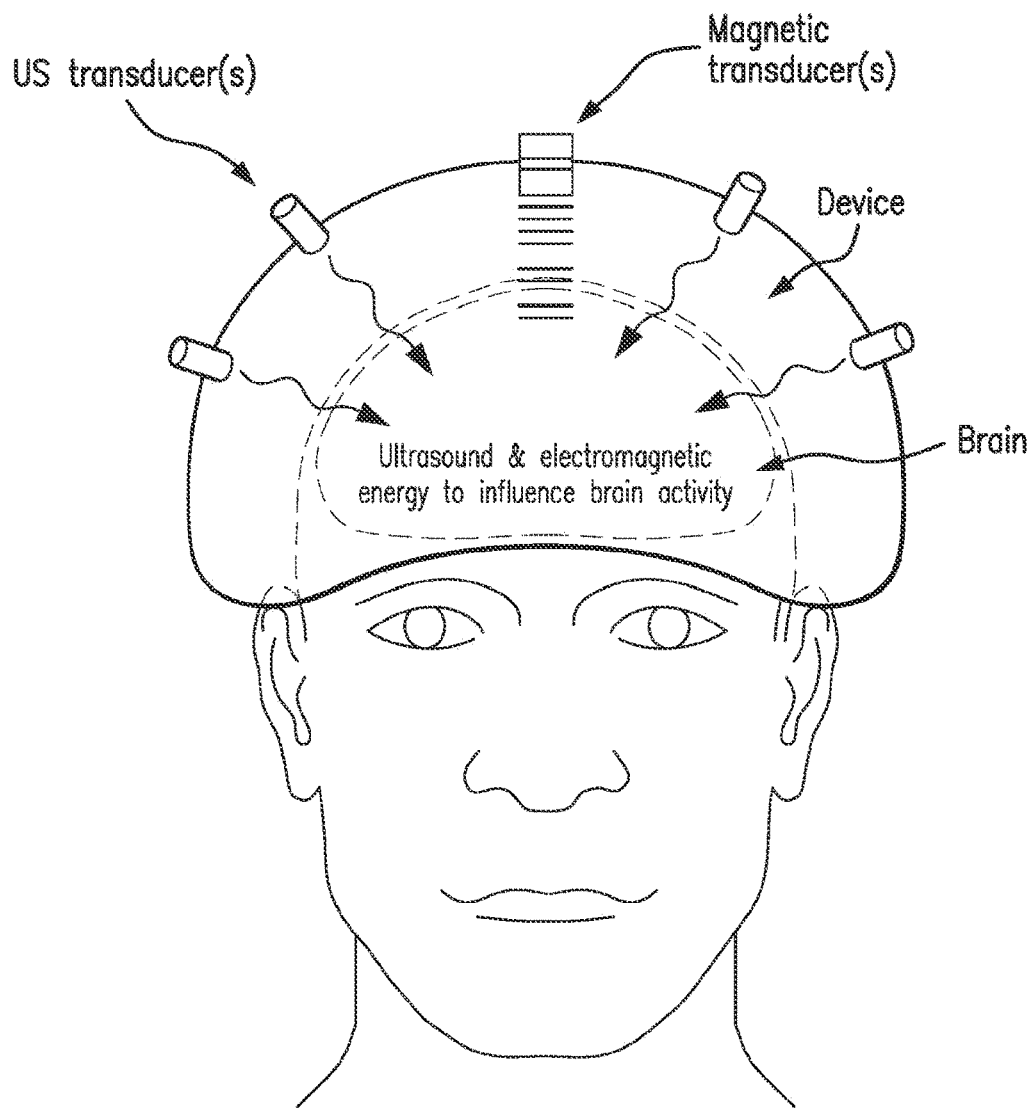
FIG. 2 shows an exemplary embodiment of an ultrasound device of the present invention comprising components that provide both ultrasound and electromagnetic energy to the brain.

Systems and devices of the present invention may comprise components other than those for providing ultrasound, and which may be referred to herein collectively as other components. For example, light waves or electromagnetic energy may be provided to a brain using devices of the present invention. FIG. 2 shows an exemplary embodiment of an ultrasound device of the present invention comprising other components, such as components that provide electromagnetic energy, to the brain.

Such a device may be used for stimulating or inhibiting the activity of the brain using magnetic radiation or for making ultrasound waves more or less effective at changing brain activity by delivering magnetic energy prior to ultrasound waves, or after ultrasound waves, or simultaneously during the delivery of ultrasound waves.

Figure 4:
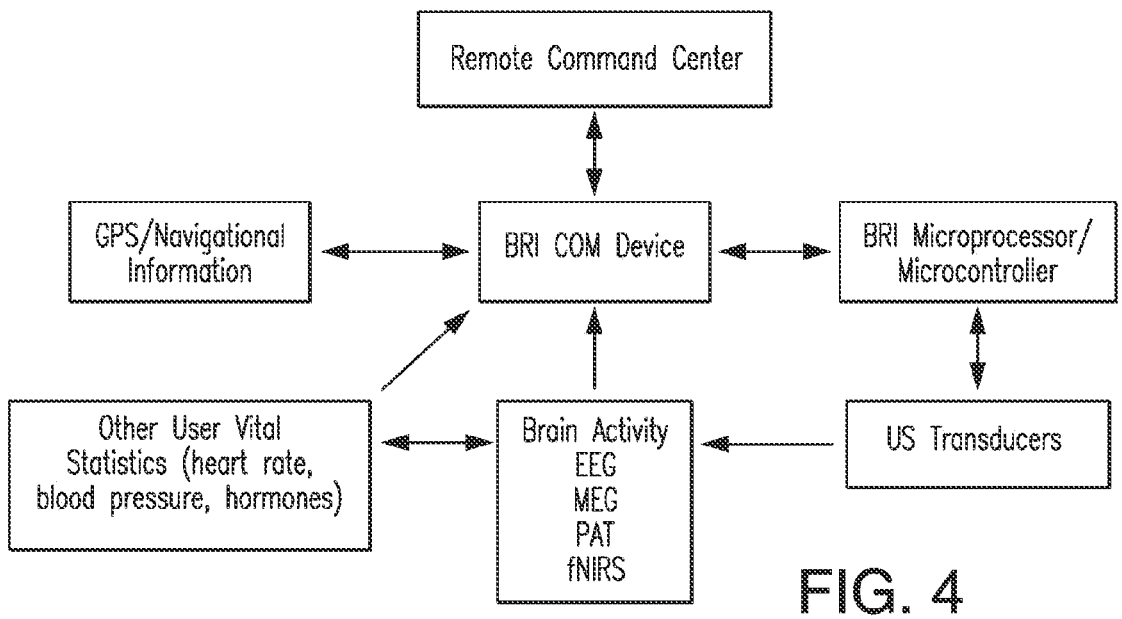
FIG. 4 is a flow chart showing a brain regulation interface (BRI) device of the present invention and exemplary components that the device may comprise.
Figure 5:
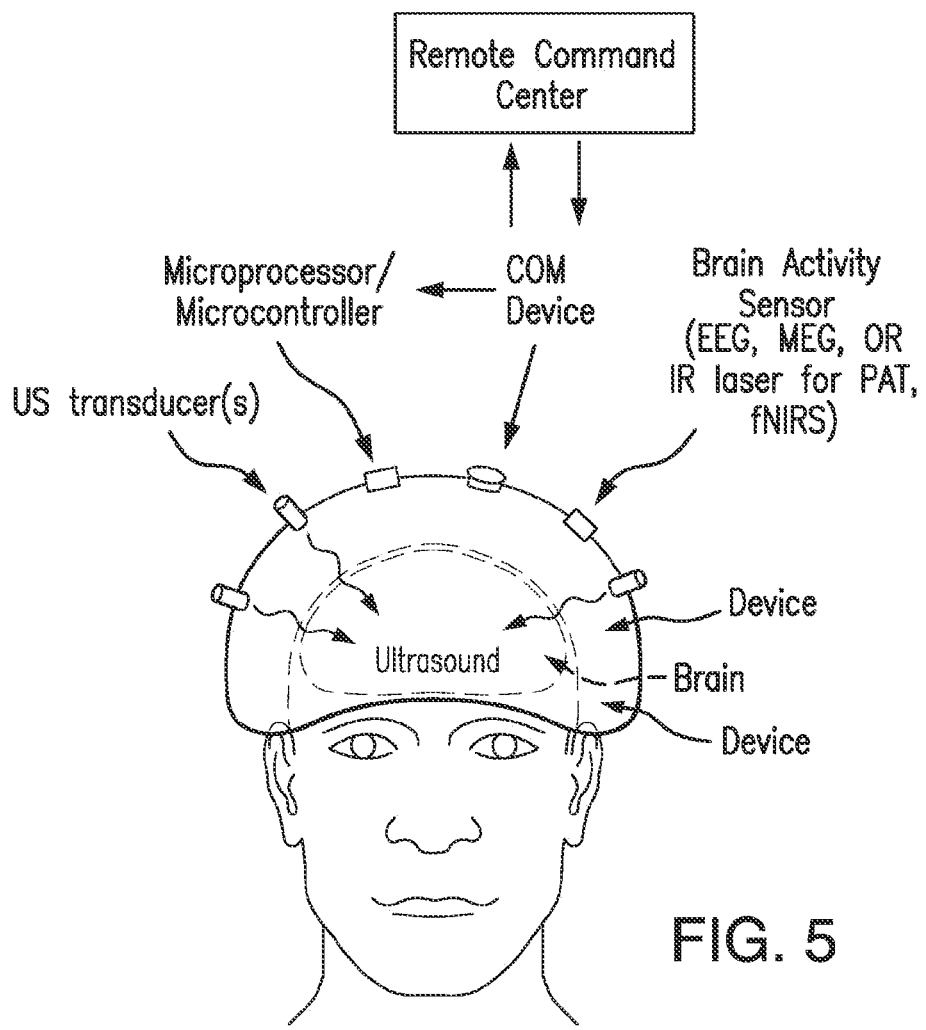
FIG. 5 illustrates an exemplary ultrasound device comprising a plurality of components for modulation of brain activity, for monitoring brain activity and for transmitting and receiving information about the subject's physical location and/or vital statistics such as blood pressure, heart rate, respiration rate, and/or blood oxygenation levels. The illustration also illustrates components that may be used with a brain regulation interface (BRI) device including ultrasound transducers, magnetic transducers, light emitting devices, and communication devices.

FIG. 4 illustrates various other components that a device may comprise. Information may be sent to or from an ultrasound device of the present invention and processors or microprocessors and microcontrollers, computer interfacing components, computers and software may be implemented in the transfer of such information. A device of the present invention may comprise components for measuring or detecting physiological status indicators such as heart rate, blood pressure, blood oxygenation levels such as the oxygen content of hemoglobin, hormone levels, or brain activity by detection methods, including but not limited to, EEG, MEG, IR lasers and PAT, or fNIRS. A device of the present invention may comprise components for geographical or global location, such as GPS, or other navigational detection of the location of the device, and its wearer. Information and commands may be transmitted to and from a remote command center, such as a centralized computing cluster, wherein the remote command center can control one or more of the other components comprised by the device. Information and commands may be transmitted to and from a portable remote command center that comprises a screen or other informational device, such as a PDA or a cell phone, that the subject can access and thus control the components of the device. Communication may be made with devices and controllers onboard or remotely located using methods known in the art, including but not limited to, RF, WIFI, WiMax, Bluetooth, UHF/VHF, GSM, CDMA, LAN, WAN, or TCP/IP. FIG. 5 illustrates a device comprising components including ultrasound transducers, microprocessors/microcontroller, a COM device for transmitting information and control to and from a remote command center, all of which are contained by the helmet portion, the body, of the device.

Figure 6:
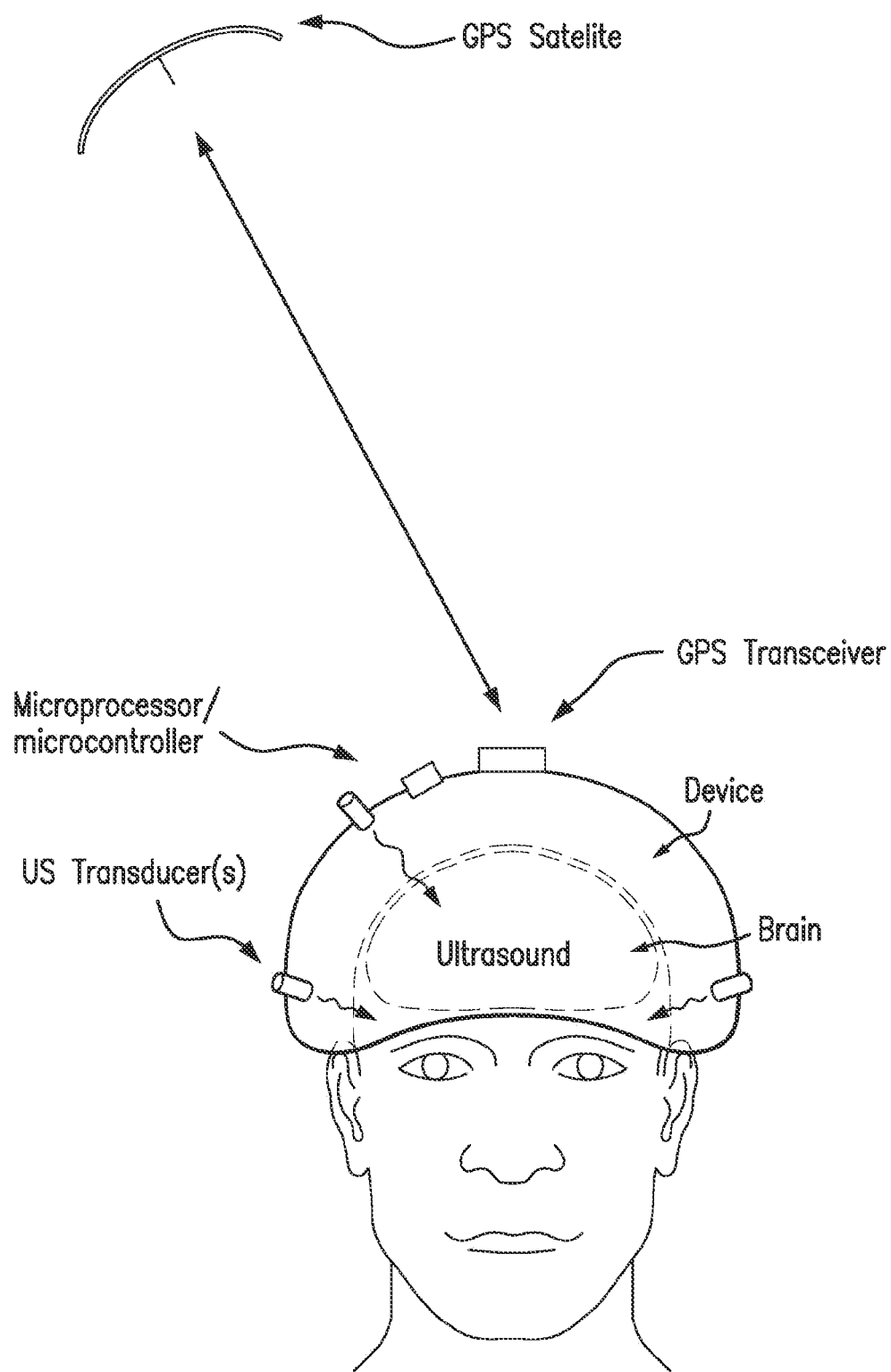
FIG. 6 illustrates an exemplary ultrasound device (BRI) comprising locational or global positioning components.

FIG. 6 illustrates an exemplary ultrasound device comprising locational or global positioning components. For example, the microprocessor receives information from a GPS unit. The GPS data may be processed by a microprocessor integrated in an ultrasound device. This information is used to activate the ultrasound transducer to generate ultrasound to stimulate a brain structure, for example, one or more sections of the vestibular system and/or to modify the vestibular ocular reflex. This aids in the navigation of the user, for example by causing a change in the subject wearer's body orientation or position. The GPS component of the ultrasound device can be used for locating, tracking and providing navigational support to the subject wearing the device and to remote command centers. The GPS component may be used to locate or track a subject wearing the device.

Figure 7:
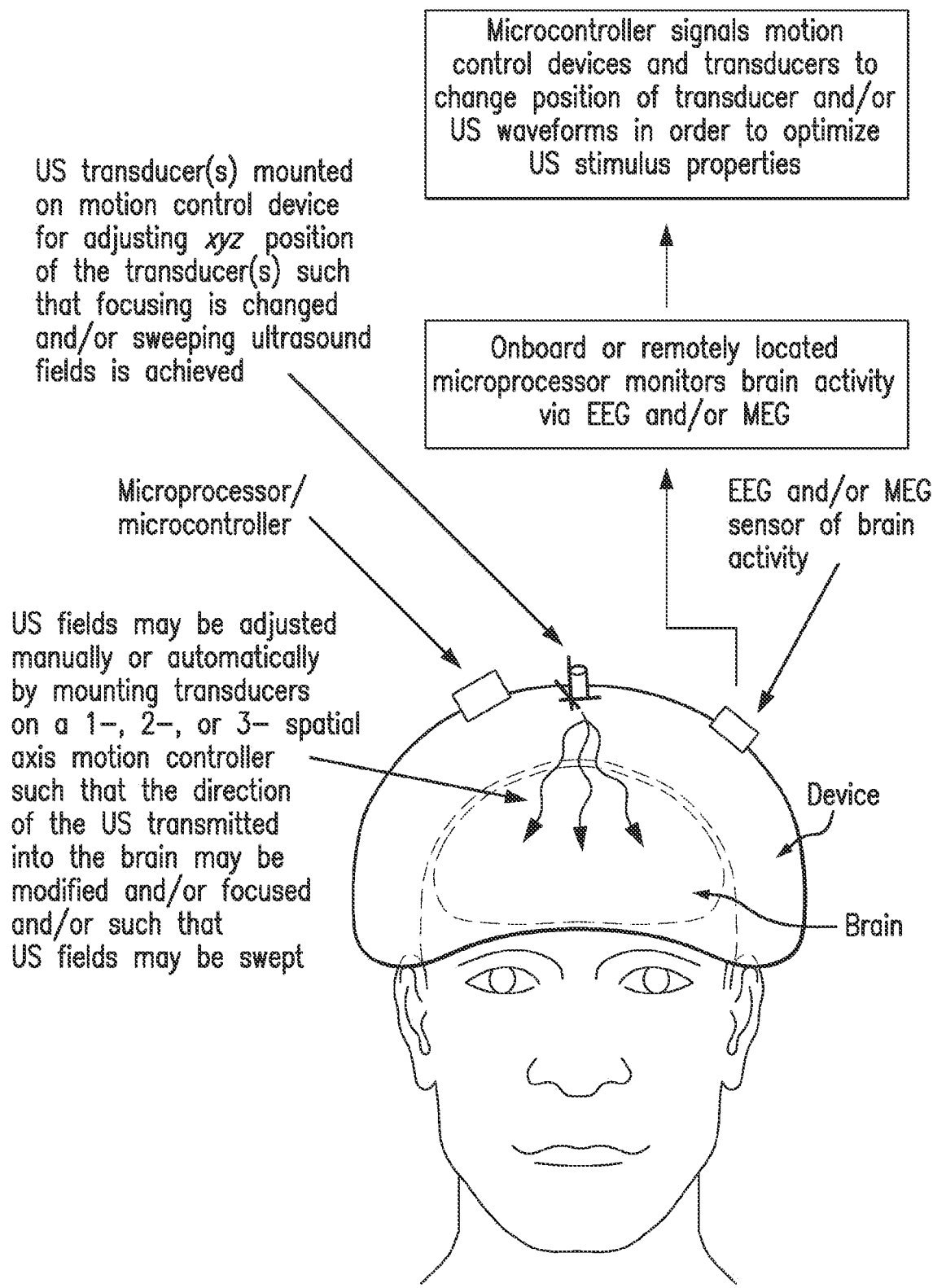
FIG. 7 illustrates an exemplary ultrasound device having movable or rotatable components, such as a movable or rotatable ultrasound transducer.

FIG. 7 illustrates an exemplary device having movable or rotatable components, such as a movable or rotatable ultrasound transducer. The ultrasound fields may be adjusted manually or automatically, either locally or remotely controlled, by using transducers mounted on a 1-, 2-, 3-spatial axis motion controller. The direction of the ultrasound transmitted into the brain may be modified, focused or provide a sweeping action of ultrasound waves to the brain. A signal may be sent to a motion controller to change the position of the mounted transducer one or more times, or may provide a constant movement (sweeping) for the transducer. FIG. 7 also illustrates other components such as a sensor for brain activity.

The present invention comprises systems for modulating activity in a brain structure. For example, a system for modulating activity in a brain structure may comprise a support for at least one ultrasound transducer, at least one ultrasound transducer; and an instruction for at least one ultrasound component. For example, a support may be a body or an element that contains components such as an ultrasound transducer. An instruction may comprise commands from a microprocessor or microcontroller driving the ultrasound transducer to provide ultrasound waves at a desired frequency, intensity or waveform.

Systems and devices for providing ultrasound for the present invention may comprise helmets having materials that bend light or sound and can focus the waves. Such materials, including but not limited to, super-lenses, hyperlenses or metamaterials, and other similar components may be used to focus the ultrasound waves in the methods and devices of the present invention. For example, transducers, of any type, in conjunction with a focusing element, such as a acoustic hyperlens, super-lens or metamaterial, are used for focusing the ultrasound waves below the diffraction limits and are provided to one or more sites in the brain to modulate brain activity. Such materials can refract light or sound backward, or have a negative index of refraction and have been referred to as a "metamaterial". A focusing element, such as a metamaterial, may be used in conjunction with one or more transducers, and/or with phased arrays of transducers in order to focus or direct ultrasound waves to one or more brain regions.

Ultrasound devices of the present invention may be constructed of different materials depending on the intended application. For example, in some aspects where the ultrasound device comprises a personal protection helmet, the materials used in the construction of such helmets may include molded polycarbonate plastics (i.e. GE Lexan), carbon fiber composites, and/or ABS plastics. In other aspects, the ultrasound devices may comprise anti-ballistic helmets for combat, tactical, military, and/or national security personnel. Materials used in the construction of such helmets may include thermocomposite plastics (hybrid thermoplastics) reinforced with carbon fibers, DuPont Kevlar, DuPont Mark III, Honeywell Spectra, DSM Dyneema, aramid/polyvinyl butyral phenolic combinations, thermoplastic polyurethane, polyphenylene sulfide, polypropylene, and/or polyethylene. In aspects where ultrasound devices are used for medical intervention or treatment, the head gear portion may be constructed of any plastic or composite materials, and may be made of or include metals such as aluminum, titanium, steel, and ceramic-metal composites. Aspects of ultrasound devices, for example, one used in methods comprising video-gaming/entertainment, aircraft/ space helmets, and/or communication applications, may be constructed using any suitable material. Devices may comprise other materials such as natural and/or synthetic raw materials such as, but not limited to nylon, vinyl, leather, platinum, copper, silver, gold, zinc, nickel, and polymer-based plastics such as Delrin. Ultrasound devices of the present invention may also comprise light-emitting diodes (LEDs), organic light-emitting diodes (OLEDs), laser-diodes, magnetic coils, and/or epoxies depending on the embodiment and intended use of an ultrasound device. Materials and methods of constructing head gear such as helmets are known to those skilled in the art.

The present invention comprises devices and methods for treating or alleviating traumatic brain injury (TBI), which may be referred to herein as brain trauma. TBI may result from one or several activities that can cause TBI such as combat injury, trauma to the brain from sports or trauma resulting from accidents such as car crashes or falls. While some brain injuries have immediate and obvious physical effects, some TBI events associated with mild concussions stemming from combat or blast injury or sport-related injuries may be mild at first, but develop over time. Following the initial brain insult, secondary damage may spread throughout the brain and can lead to severe mental, cognitive, sensory, emotional and physical impairments arising from cell death, excitotoxicity, and other events occurring from the secondary injury. The secondary injury may last from hours to days to months following the primary insult.

Methods and devices of the present invention reduce the deleterious consequences of secondary injury following a TBI provide enhanced recovery and minimize damage caused during delayed injuries. Methods and devices of the present invention reduce, minimize, and/or eliminate primary and secondary injuries stemming from TBI or other brain injury resulting from ballistic or blast injuries in military or combat personnel or related civilian casualties. Devices of the present invention which provide ultrasound waves may be used to treat, ameliorate, reduce, minimize, and/or eliminate primary and secondary injuries stemming from TBI or other brain injury resulting from an accidental head trauma such as an automobile, bicycle or skateboard accidents, sport-related concussive injury, such as those commonly found in American Football, lacrosse, soccer, rugby or hockey. Devices may comprise personal protective headgear such as a helmet which is commonly worn by military personnel or sports participants, or may be provided as a medical device to be administered by emergency personnel such as a physician and/or EMT. Methods of the present invention comprise treating or ameliorating the effects of trauma to the brain by providing an effective amount of ultrasound to a brain region that has received trauma or a surrounding or remote brain region that has or could have secondary injuries from the trauma, said ultrasound may be provided by an ultrasound device of the present invention.

Devices of the present invention that are useful in treating TBI may provide focused and/or unfocused ultrasound having a frequency ranging from 25 kHz to 50 MHz and an intensity ranging from 0.025 to 250 W/cm$^2$ which may modulate brain function and provide neuroprotection by regulating cerebrovascular dynamics (vasodilation/vasoconstriction), direct modification (inhibition) of neuronal circuit (bioelectric) activity, direct excitation of neuronal circuit activity, modulating the buffering of intracellular calcium concentrations, and/or increasing the synthesis and/or release of neurotrophic factors such as brain-derived neurotrophic factor. A device may be provided to the head of a subject, such as a human or animal, during the engagement of risk-related activity, or provided to the subject as long as needed, for example, from 500 msec to years following the initial injury. An aspect of the invention comprises using an ultrasound device of the present invention in rapid response situations, such as responding to a car accident, or during evaluation of the subject after an incident of force to the head to reduce secondary injury to the brain. In use, a device may be automatically activated in response to an external event, such as a concussive blow detected by a pressure/force sensor or may be activated by the subject wearing the device or by other appropriate personnel, either in direct contact with the subject or by remote activation. A device may comprise a pressure/force transducer or sensor to detect a force event impacting the head of a device wearer. The pressure/force transducer or sensor may communicate with a controller or microprocessor, either contained within the device or at a remote site, to initiate the sequence of steps needed to activate at least one ultrasound transducer to provide ultrasound to the device wearer to minimize subsequent secondary injury to the brain. A device may comprise global positioning capabilities, such as a GPS transceiver for communicating the global position of an injured subject with a device attached, which would aid in medical personnel locating the injured subject.

The present invention comprises methods for stimulating normal brain wave activity patterns in deep or superficial brain circuits using transcranial pulsed ultrasound. The present invention comprises modifying cognitive processes such as learning and memory using transcranial pulsed ultrasound, for example, by stimulating sharp wave ripple oscillations, or activity in any other frequency band including gamma, beta, theta, or alpha. Though not wishing to be bound by any particular theory, it is believed that sharp wave ripple oscillations underlie memory consolidation. Pulsed transcranial ultrasound methods may be used to modulate BDNF signaling and for example, other cellular cascades mediating processes underlying synaptic plasticity and learning. Such methods may comprise application of ultrasound to one or more brain regions for one or more times. Methods comprise administration of ultrasound waves to the brain continuously, or on regular intervals, as necessary to affect the brain area and reach the desired outcome. Such methods are disclosed herein.

The present invention comprises methods of using transcranial pulsed US to stimulate one or more intact brain circuits wherein such methods do not require exogenous factors or surgery. Due to temperature increases <0.01° C. in response to US stimulus waveforms (FIG. 5D), an aspect of the invention comprises predominantly nonthermal (mechanical) mechanism(s) of action. Though not wishing to be bound by any particular theory, it is thought that the nonthermal actions of US are understood in terms of cavitation—for example, radiation force, acoustic streaming, shock waves, and strain neuromodulation, where US produces fluid-mechanical effects on the cellular environments of neurons to modulate their resting membrane potentials. The direct activation of ion channels by US may also represent a mechanism of action, since many of the voltage-gated sodium, potassium, and calcium channels influencing neuronal excitability possess mechanically sensitive gating kinetics (Morris and Juranka, 2007). Pulsed US could also produce ephaptic effects or generate spatially inhomogeneous electric fields, proposed to underlie aspects of synchronous activity (Anastassiou et al., 2010; Jefferys and Haas, 1982). underlying the ability of US to stimulate intact brain circuits.

Methods, systems and devices of the present invention comprise using pulsed US to probe intrinsic characteristics of brain circuits. For example, US stimulation of motor cortex produced short bursts of activity (<100 ms) and peripheral muscle contractions, whereas stimulation of the hippocampus with similar waveforms triggered characteristic rhythmic bursting (recurrent activity), which lasted 2-3 s. Stimulation of a given brain region with US can mediate broader circuit activation based on functional connectivity. Such abilities have been shown and discussed for other transcranial brain-stimulation approaches like TMS (Huerta and Volpe, 2009). For example, the effects of US on activity in corticothalamic, corticocortical, and thalamocortical pathways are contemplated by the present invention. Brain activation with transcranial pulsed US may be dependent on the plane of anesthesia. For example, when mice were in moderate to light anesthesia planes (mild responsiveness to tail pinch), US-evoked activity was highly consistent across multiple repeated trials.

Using a method of transcranial US brain stimulation with an acoustic collimating tube (d=2 mm), an estimate of the volume of cortical activation may be ≈3 mm$^3$ as indicated by c-fos activity (FIG. 15). This activated brain volume may have been restricted by anatomical features along the dorsal-ventral US transmission path implemented (for example the corpus callosum restricting the depth of activation to the cortex). The 1.5-2.0 mm lateral area of activation observed represents a more reliable measure and is approximately five times better than the ≈1 cm lateral spatial resolution offered by transcranial magnetic stimulation (TMS) (Barker, 1999). Due to the millimeter spatial resolutions conferred by US, structured US fields may be used to drive patterned activation in sparsely distributed brain circuits. Similarly, focusing with acoustic meta-materials (having a negative refractive index) enables subdiffraction spatial resolutions to be achieved for US (Zhang et al., 2009). Brain regions <1.0 mm may be accurately targeted for neurostimulation using 0.5 MHz US. Such spatial scales make transcranial US for brain stimulation amenable to a variety of research and clinical applications.

Focusing of US through skull bones, including those of humans, can be achieved using transducers arranged in phased arrays. A recent clinical study reported using transcranial MRI-guided high-intensity focused ultrasound (0.65 MHz, >1000 W/cm$^2$) to perform noninvasive thalamotomies (d=4.0 mm) for the treatment of chronic neuropathic pain by focusing US through the intact human skull to deep thalamic nuclei using phased arrays (Martin et al., 2009). Pulsed US in the noninvasive stimulation of human brain circuits is contemplated by the present invention.

The present invention comprises methods wherein two modalities are used simultaneously or sequentially. As US is readily compatible with magnetic resonance imaging (MRI) it is feasible that pulsed US could be used for brain-circuit stimulation during simultaneous MRI imaging in the functional brain mapping of intact, normal or diseased brains. Aspects of methods comprise pulsed US used to induce forms of endogenous brain plasticity as shown with TMS (Pascual-Leone et al., 1994). In such an embodiment, pulsed US drives specific brain activity patterns shown to underlie certain cognitive processes like memory trace formation (Girardeau et al., 2009; Nakashiba et al., 2009). For example, in mice, transcranial US can promote sharp-wave ripple oscillations (FIG. 16C) and stimulate the activity of endogenous BDNF (FIG. 16D), an important regulator of brain plasticity and hippocampal-dependent memory consolidation (Tyler et al., 2002).

A method of the present invention comprises blocking memory formation and memory consolidation to prevent the formation of short- and/or long-term memories. Such methods include methods for treating, ameliorating or reducing post-traumatic stress disorder (PTSD), such as that resulting from combat stress. Other methods include use of a device of the present invention in applications where it is beneficial or necessary that the subject's memory is altered or prevented from forming. A device may comprise an antiballistic helmet and/or other head wearable device wherein the ultrasound treatments are administered by the subject wearing the device or by other personnel. A device may provide focused and/or unfocused ultrasound ranging from 25 kHz to 50 MHz and an intensity ranging from 0.025 to 250 W/cm$^2$ in a treatment method to modulate brain function in a manner that alters neuronal plasticity such that the formation of memories related to specific events are blocked. Such methods may comprise prior, concurrent or post treatment with chemical, electrical, magnetic, or genetic methods to enhance the memory control.

Methods of the present invention comprise altering synaptic plasticity by providing ultrasound to memory centers of the brain. Ultrasound methods are used to reduce synaptic plasticity or to promote certain types of synaptic plasticity such as long-term depression if a memory is to be forgotten, and synaptic plasticity such as long-term potentiation is enhanced if a memory is to be retained. Promotion of plasticity in memory centers is useful in treatments for dementia, Alzheimer's disease, or loss of memory due to other events, such as a stroke. Memory centers of the brain comprise the limbic system, the prefrontal cortex, the hippocampus, the amygdala, the cerebellum and entorhinal cortex, including Broadman's Areas 34 and 28.

Methods of the present invention comprise impeding or inhibiting memory formation in a subject by providing an effective amount of ultrasound to a brain region, wherein the brain region comprises the hippocampal formation, hippocampus proper, limbic system, amygdala, thalamus, cerebellum, striatum, entorhinal cortex, perirhinal cortex, and cerebral cortex (including prefrontal cortex, auditory cortex, visual cortex, somatosensory cortex, and/or motor cortex), afferents or efferents of said regions, or combinations thereof. Methods of the present invention comprise providing ultrasound to a subject, optionally using an ultrasound device described herein, prior to an event, for example, about 1 minute, 10 minutes, 20 minutes, 30 minutes, 40 minutes, 1 hour, 1.5 hours, 1.75 hours, 2 hours, 2.5 hours, 2.75 hours, 3 hours, 3.5 hours, 4 hours or for about 4.5 hours prior to an event for which a subject's memory is to be impeded, and optionally, providing ultrasound to a subject during an event, and optionally after the event occurs, for example, for at least 1 minute, 10 minutes, 20 minutes, 30 minutes, 1 hour, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, 10 hours, 10.5 hours, 11 hours, 11.5 hours, 12 hours, 12.5 hours, 13 hours, 13.5 hours, 14 hours, or for a longer time period if needed, after the event, and thereby inhibiting memory formation or storage. Methods may also comprise providing chemical, pharmaceutical, electrical, magnetic or light therapy before, during or after ultrasound is provided. A method of the present invention comprises providing ultrasound using a device described herein.

Human brain targets where ultrasound is provided to prevent the formation of memories include, but are not limited to, the hippocampal formation, hippocampus proper, amygdala, thalamus, cerebellum, striatum, entorhinal cortex, perirhinal cortex, and cerebral cortex (including prefrontal cortex, auditory cortex, visual cortex, somatosensory cortex, and/or motor cortex). Embodiments of the present invention comprise use of a device of the present invention to provide ultrasound to modify brain activity in at least one, or in a combination of the aforementioned anatomical areas in a manner that is effective to disrupt normal neuronal plasticity including, for example, long-term potentiation (LIP), long-term depression (LTD), spike-timing dependent plasticity (STDP), and/or homeostatic plasticity by modulating the spatiotemporal patterns of brain activity, which lead to the formation of short- and/or long-term memories. Changes in brain activity induced by ultrasound may act on calcium-dependent biochemical processes, which include an increase and/or decrease in either, or both, kinase and phosphotase activity to modulate the activity of proteins, by modulating gene transcription, or protein translation. Conversely, different ultrasound waveforms may be projected to the aforementioned brain regions in a manner which will promote neuronal plasticity (LTP/STDP) in order to enhance the learning and/or memory of events as a therapeutic treatment method for dementia, Alzheimer's disease or other age-related, injury-related, and/or developmental memory disorders.

Methods of the present invention comprise administration of ultrasound to the brain of an animal, including humans, such as by transcranial routes, to modify cognitive processes. An aspect of the invention comprises providing transcranial pulsed ultrasound to modify cognitive processes in a human or animal. For example, spatial learning and memory can be modified using methods of the present invention (FIGS. 17 and 18A-18B). Methods of the present invention comprise delivery of pulsed transcranial ultrasound to the intact hippocampus and/or associated brain regions to modify cognitive processes, including by not limited to, modifying normal cognition or enhancing cognitive processes. Methods for increasing the strength of synapses comprise providing transcranial ultrasound to one or more brain regions.

The Morris Water Maze is a classic test used to assay cognition in rodents. Intact mice hippocampi were stimulated using ultrasound methods disclosed herein. If US stimulation occurred 5 minutes immediately before training the mice on the MWM task, the mice do not learn as well and additionally, the mice have worse memory of the escape location compared to sham controls. It is currently believed that the disruption of learning and memory consolidation is due to stimulating hippocampal activity in patterns absent of context, which disrupts the formations of associations amongst environmental cues, as well as alters the neuronal firing code needed for normal learning and memory to occur. Thus, by providing disruptive hippocampal stimulation with pulsed ultrasound learning can be attenuated and memory can be blocked. Methods of the present invention comprise providing ultrasound to disrupt learning and/or interfere with memory consolidation by stimulating one or more brain regions in the absence of context (for the animal stimulated).

For example, if mice are stimulated for 5 minutes per day for 7 days before training them on the MWM task (without stimulating the day of or immediately before training on any training day) then the mice receiving intact hippocampal stimulation in this chronic paradigm perform better than sham controls. They remember better and learn faster. It is believed that traditional models of plasticity explain the findings, where the synaptic strengths of hippocampal synapses are increased by stimulating across repeated days in controlled environments. Ultrasound stimulates the release of brain-derived neurotrophic factor (BDNF) and BDNF induces plasticity and mediates learning, thus, the repeated prolonged increase in BDNF signaling enhances cognitive function. Methods of the present invention comprise repeated stimulation of the hippocampus by transcranial ultrasound to improve learning and memory. Methods of the present invention comprise repeated stimulation of one or more brain regions by transcranial ultrasound to improve learning and memory. Methods of the present invention comprise repeated stimulation of the hippocampus by transcranial ultrasound for treating a disease or physiological condition where disrupted cognition is present in an animal. For example, such diseases or physiological conditions include, but are not limited to, mental retardation, Down's syndrome, Fragile X, Alzheimer's disease, age-related cognitive decline, and other conditions where cognition is delayed, faulty or impaired. Methods comprising providing ultrasound to the brain of an animal for the upregulation of neurotrophic factors may be used treat diseases where different brain circuits are targeted. For example, dysregulated BDNF signaling occurs in diseases or physiological conditions including, but not limited to, epilepsy, anxiety, depression, Alzheimer's disease, Parkinson's disease, and following stroke and brain injury. Methods of the present invention comprise upregulation of neurotrophic factors, including but not limited to BDNF, Nerve Growth Factor, Neurotrophin-3, Fibroblast Growth Factor, Insulin-like Growth Factor, by transcranial ultrasound for treating a disease or physiological condition where neurotrophic dysregulation or impaired neurotrophic signaling occurs. For example, increasing BDNF signaling by performing chronic repeated brain stimulation with ultrasound may encourage plasticity which can have a profound effect on diseased, faulty or impaired brain circuits. Likewise, chronic repeated brain stimulation with ultrasound may encourage plasticity to enhance learning and memory in normal brain circuits. An ultrasonic method of the present invention comprises enhancing learning or memory formation in a subject, comprising providing an effective amount of ultrasound to a brain region, wherein the brain region comprises the hippocampal formation, hippocampus proper, amygdala, thalamus, cerebellum, striatum, entorhinal cortex, perirhinal cortex, and cerebral cortex, prefrontal cortex, auditory cortex, visual cortex, somatosensory cortex, or motor cortex, afferents or efferents of the regions, or combinations thereof.

Aspects of the present invention comprise methods and devices to provide transcranial ultrasound to modify dysfunctional, impaired or diseased brain circuits in humans and animals. Patients with various types of brain impairments have been shown to benefit from brain stimulation using electromagnetic energy, such as that transduced using electrodes, lasers, magnetic coils, and other energy emitting devices. Ultrasound for brain stimulation can confer many advantages over electromagnetic-based brain stimulation strategies. For example, aspects of ultrasound methods disclosed herein do not require surgery and can confer a spatial resolution at least 3-5 times better than that achieved with other noninvasive techniques, such as transcranial magnetic stimulation. Further, ultrasound can be rapidly deployed for brain stimulation, which can facilitate the providing of first line interventions to treat traumatic brain injuries or neurocritical care conditions such as refractory seizure activity.

Methods disclosed herein attenuate seizure activity using pulsed ultrasound.

Brain regulation devices disclosed herein can be used in neurocritical care situations to rapidly provide a noninvasive brain stimulation intervention using pulsed ultrasound. For example, status epilepticus (SE) refractory to conventional anti-epileptic drugs typically has a poor prognosis, but patients may recover well if seizures can be terminated. Methods for using transcranial pulsed ultrasound (TPU) to stimulate intact brain activity are disclosed herein and can be used for treatment of seizure activity. TPU can synchronize intact hippocampal oscillations in high-frequency and gamma bands without producing damage. Data disclosed herein shows TPU can disrupt kainic acid-induced SE by providing a whole-brain stimulation interference source. The studies showed acute and chronic effects of transcranial ultrasound on healthy and kainic acid (KA) induced SE mice.

Methods of the present invention comprise treatment of brain dysfunction by modulating cortical and subcortical brain circuit activity by providing ultrasound to the cortical and subcortical regions of the brain. The present invention is useful for treating neurocritical emergencies like SE that carry high morbidity. SE-induced in rodents serves as a model of Temporal Lobe Epilepsy with hippocampal sclerosis, the most frequent epilepsy in humans. Aspects of the present invention comprise treating temporal lobe epilepsy, optionally with hippocampal sclerosis, by providing ultrasound to one or more brain regions. Such ultrasound may be pulsed transcranial ultrasound.

Aspects of the methods of the present invention comprise use of pulsed, transcranial ultrasound, continuous wave ultrasound or both. Use of ultrasound devices disclosed herein may be used in methods for acute treatment of brain diseases or impairment. Devices for providing ultrasound as disclosed herein may be used treating brain diseases or brain impairment by providing chronic stimulation. For example, chronic stimulation with brain regulation devices providing ultrasound may be used to increase plasticity and enhance cognitive processes in animals to treat degenerative diseases such as Alzheimer's disease. Such devices and methods may be used to treat neurodevelopmental diseases in children or other aged humans or animals, such as mental retardation, fragile x, Down's syndrome, etc. Both diseased or impaired brain tissues and normal brain tissues may be modulated using ultrasound devices disclosed herein.

Figure 19A:
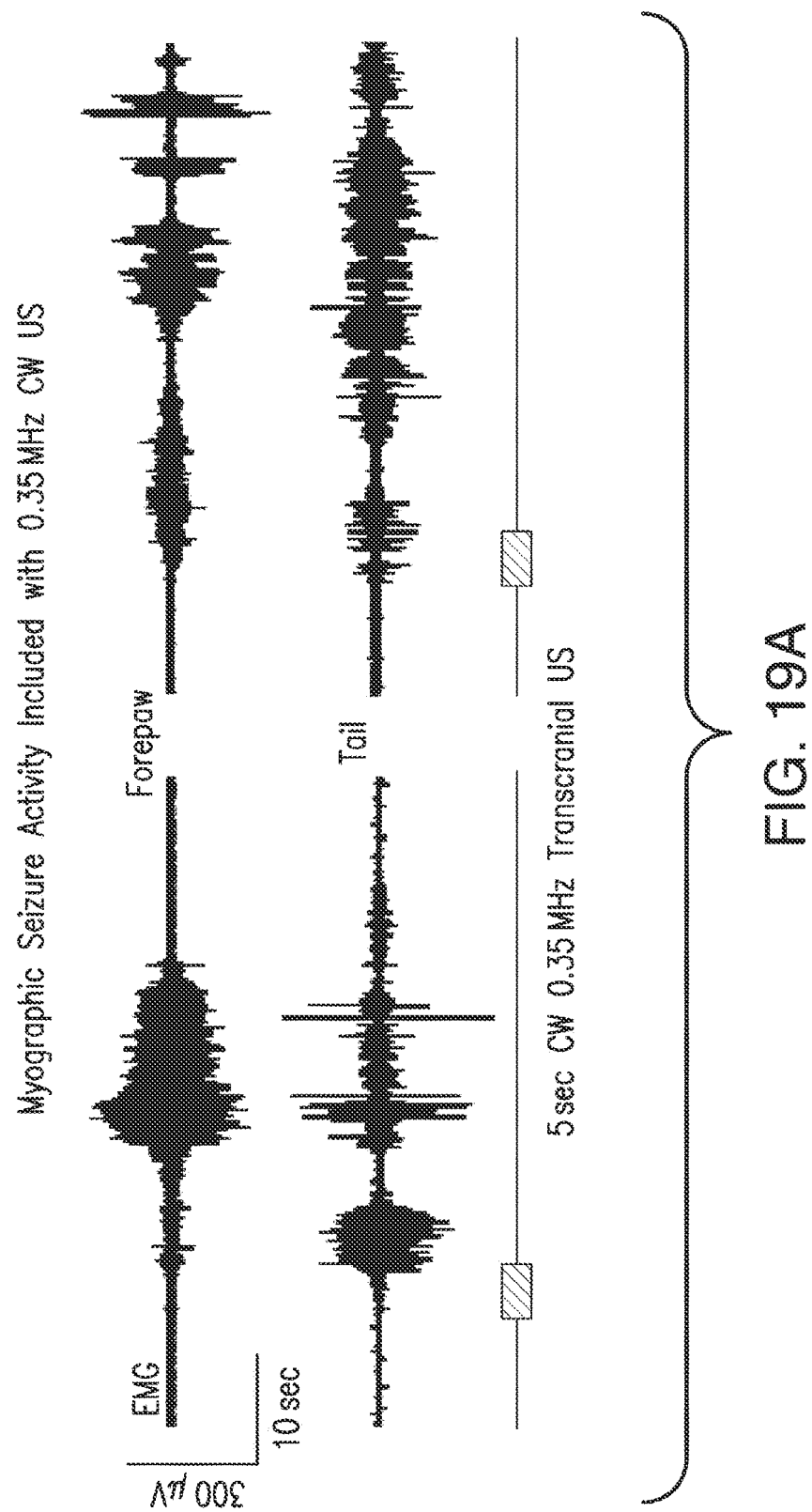
FIG. 19A-C illustrates that transcranial pulsed ultrasound can be used to modulate brain activity to study and or treat neurological diseases. (A) Shows EMG recordings in response to transcranial ultrasound stimuli delivered to the brain of normal mice in a continuous wave mode for 5 seconds. The brain activity pattern stimulated by continuous wave transcranial ultrasound is indicative of that observed during epileptic seizure activity. Such seizure activity patterns are known to occur for ten seconds or longer following the onset of a brain stimulus as shown by the EMG traces in response to transcranial stimulation of brain tissues with continuous wave ultrasound. Evoking such seizure activity patterns can be helpful in studying epilepsy by mapping diseased or prone circuits, as well as by using US to modulate brain activity patterns to screen for pharmacological compounds or genes useful for treating abnormal brain activity. When compared to the activity patterns illustrated in FIGS. 12-16 produced with pulsed ultrasound, the data in panel (A) triggered with continuous wave ultrasound show that transcranial ultrasound can influence brain activity in radically different manners depending on the ultrasound stimulus waveform used and depending on the desired outcome. (B) A mouse is shown at left immediately after being injected with kainic acid to produce a standard model of epilepsy. EMG activity before (top right) and after (bottom right) the onset of epileptic seizure activity is illustrated. The EMG traces on the bottom right show the presence of seizure activity as indicated by the increased persistent EMG activity compared to the pre-seizure trace on the top right. (C) EMG traces showing that brain stimulation achieved with transcranial ultrasound can be used to terminate seizure activity in a mouse model of epilepsy. Four different examples illustrate the delivery of transcranial ultrasound is capable of quickly attenuating pronounced seizure activity as indicated by the decreasing EMG amplitude soon after the delivery of a transcranial ultrasound stimulus waveform. Such an effect of ultrasound on diseased brain activity can be administered manually in response to seizures detected visually or by way of EEG or EMG activity. In another embodiment of the present invention, the delivery of ultrasound to the brain can be controlled automatically in response to seizure activity detected by EEG, EMG, MEG, MRI, or other readout of brain activity.
Figure 19B:
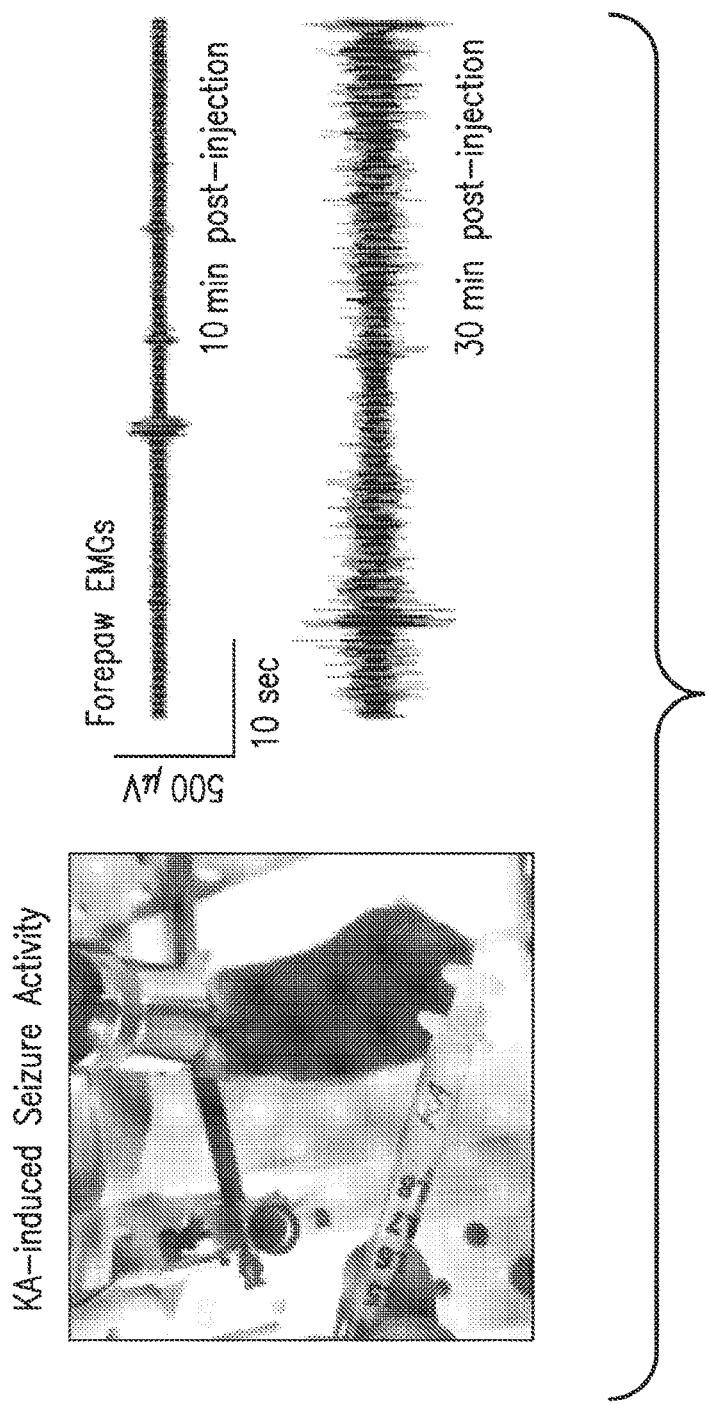

As shown in FIG. 19, continuous wave ultrasound, in contrast to pulsed ultrasound, may be used to induce seizure activity in normal brain circuits. In diseased or impaired brain circuits, such as when seizure activity is present, continuous wave ultrasound or pulsed ultrasound may be used to disrupt the aberrant activity, such as seizures. The outcome is highly dependent on the initial state of the brain. If aberrant activity is present, methods providing ultrasound can interfere with aberrant activity. If aberrant activity is not present, such as in normal brain tissue, the induction of seizures may be used to functionally identify epileptic circuits. Use of ultrasound devices and methods described herein are useful prior to, during, or after surgical manipulation of brain tissue, for example, to map functional and/or dysfunctional brain circuits. For example, methods comprise use of ultrasound to identify diseased brain circuits, such as epileptic brain circuits which may require surgical removal.

Aspects of the present invention comprise methods and devices to provide ultrasound to regulate or modify the activity of certain brain circuits to reduce anxiety and stress responses induced by environmental cues or other conditions, for example, combat situations or operation of complex or sensitive machinery such as a space shuttle, or other intra-/extra-atmospheric craft. Though not wishing to be bound by any particular theory, it is believed that stress responses are mediated in the brain and/or nervous system by several neuromodulators, neurohormones, and neurotransmitters including, but not limited to noradrenaline, epinephrine, norepinephrine (NE), acetylcholine (ACh), cortisol, corticotropin-releasing hormone (CRH), adrenocorticotropic hormone (ACTH), and glucocorticoids. Brain circuits involved in mediating responses to stressors include, but are not limited to, the locus ceruleus, the paraventricular nucleus of the hypothalamus (PVN), the autonomic nervous system, the sympathetic nervous system; ("fight-or-flight" response), hypothalamic-pituitary-adrenal axis (HPA), adrenal medulla, and the pons. Methods of the present invention comprise altering a stress response by a subject by providing an effective amount of ultrasound to a brain region, wherein the brain region comprises the locus ceruleus, the paraventricular nucleus of the hypothalamus (PVN), the autonomic nervous system, the sympathetic nervous system; ("fight-or-flight" response), hypothalamic-pituitary-adrenal axis (HPA), adrenal medulla, or the pons.

There are several different types of stress responses. The "fight-or-flight" stress response is an acute stress response, which is put into effect when a general alarm system in the brain is activated by an increase in the activity of neurons in the locus ceruleus. This increase in activity leads to an increase in noradrenergic activity to increase awareness and attention. Other acute stress responses include the actions of Ach to trigger the release of epinephrine and NE from the medulla and adrenal glands, as well as activation of the HPA to mediate appropriate behaviors. Acute stress can be positive for the subject in situations where the subject is challenged. Prolonged exposure to acute stress leads to decreased cognitive and physiological functioning. This is due to an abnormally high level of circulating stress hormones, such as cortisol, CRH, ACTH, as well as maladaptive plasticity in local brain circuits such as the locus ceruleus, PVN, hippocampus, prefrontal cortex, and the amygdala.

Problems associated with prolonged chronic stress, such as that seen in military or tactical personnel, presents major problems and is termed combat stress reaction, which has been previously called shell shock or battle fatigue. Combat stress reaction can manifest itself leading to fatigue, slow response times lack of ability to make decisions, lack of an ability to carry out missions, disconnection, and other poor cognitive abilities. Combat stress reaction can lead to other stress disorders such as post-traumatic stress disorder, generalized anxiety disorder, depression, and acute stress disorder. Subjects other than military or combat personnel can present with combat stress reaction or other stress disorders and be treated using methods described herein.

An aspect of the present invention comprises use of a device for providing ultrasound of the present invention to decrease the deleterious effects of prolonged stress on physiological and cognitive performance of a subject by providing ultrasound to excite and/or inhibit the aforementioned brain stress systems. In an aspect of the invention, the acute stress response is left intact to maximize combat/tactical personnel efficiency during hostile engagement, but the activity of the brain stress centers are reduced by providing ultrasound following environmental exposure to the stressors. For example, after a stressful event, such as a battle or a patrol in a dangerous region, tactical, military, or combat personnel activate the ultrasound device once they have returned to a relatively safe environment. In an embodiment, a sensor that detects circulating stress hormone levels communicates information regarding the subject's physiological state of stress hormones is in communication with an ultrasound device worn by the such that the ultrasound device becomes active and provides an effective amount of ultrasound to reduce prolonged and/or chronic stress. Reduction of the stress response interrupts the chronic state of stress which leads to the combat stress reaction and underlies subsequent PTSD, depression, generalized anxiety disorder, and acute stress disorder in many individuals.

Methods of the present invention comprise use of an ultrasound device to provide ultrasound to activate brain regions, which increase arousal, attention, and awareness. Methods for activation of brain regions may be employed by any subject where arousal, attention or awareness are sought. For example, ultrasound devices may be worn by operators of heavy machinery or equipment, astronauts, pilots, and combat or tactical personnel where increased attention, arousal, increased alertness and for long-term wakefulness is desirable in order to improve performance and to minimize risk of injury to the user and others and/or accidents. Shift-workers or long-haul truck drivers may also benefit from such methods.

There are numerous centers in the brain which are responsible for regulating attention, arousal, and alertness. Increasing activity in these brain regions can increase reaction times, enhance cognitive performance, and promote appropriate behavioral or physiological responses. Some of the neurotransmitter and neuromodulator systems involved in the regulation of arousal and alertness are acetylcholine, dopamine, histamine, hypocretin, serotonin, and norepinephrine. Brain circuits, which mediate arousal and attention include, but are not limited to the prefrontal cortex, basal forebrain, the hypothalamus, tuberomamillary nuclei, basolateral amygdala, ventral tegmental area, medial forebrain bundle, locus ceruleus, the thalamus, and the dorsal raphe nucleus. Specific thalamocortical oscillations (~40 Hz) are known to occur during wakefulness or alertness and can be detected using EEG and or MEG. There are other patterns of brain activity, which indicate enhanced arousal, alertness, and attention and these can also be detected using MEG and or EEG.

Methods of the present invention comprise activating arousal brain regions to increase alertness, awareness, attention or long-term wakefulness in a subject by providing an effective amount of ultrasound to a brain region, wherein the brain region comprises prefrontal cortex, basal forebrain, the hypothalamus, tuberomamillary nuclei, basolateral amygdala, ventral tegmental area, medial forebrain bundle, locus ceruleus, the thalamus, and the dorsal raphe nucleus. Ultrasound may be provided by a device of the present invention. A device may provide focused and/or unfocused ultrasound ranging from 25 kHz to 50 MHz and an intensity ranging from 0.025 to 250 W/cm$^2$ in a treatment method to modulate brain function in a manner that alters alertness, wakefulness, and/or attention. Methods of the present invention comprise providing ultrasound to effect release of acetylcholine, dopamine, histamine, hypocretin, serotonin, and norepinephrine. For example, an ultrasound device of the present invention may provide ultrasound to a subject to activate to activate arousal brain regions in the subject to increase alertness, awareness, attention, and long-term wakefulness for enhanced attention and alertness during sensitive operations, such as during combat environments, while operating heavy machinery, for astronauts, or pilots.

Methods of providing ultrasound to activate arousal brain regions may be used to promote long-term wakefulness by using ultrasound to stimulate one of more of the arousal brain regions, systems, circuits and/or for neurotransmitter release. Subjects engaged in long-term activity activate an ultrasound device of the present invention to reduce the likelihood of entering sleep cycles or to prevent microsleep. Methods comprise use of an ultrasound device of the present invention in combination with EEG and/or MEG sensors to monitor brainwave activity. The sensors can relay information regarding the brainwave patterns to an onboard microprocessor or a remote processor such that when brainwaves show the user is entering a reduced awareness/alertness or sleep cycle the ultrasound device is activated, such as by a microcontroller, to begin transmitting ultrasound to one or more arousal-related brain regions which increases wakefulness such that the subject returns to an awake state. Methods of providing ultrasound to activate arousal brain regions or neurotransmitters in a subject for arousal include treating subjects in reduced consciousness states, such as those in a coma or a minimally conscious state where thalamocortical activity and oscillations are impaired or disrupted.

A device of the present invention may comprise multiple components for activating brain structures. For example, a device may comprise laser diodes and MEG/EEG sensors, in addition to ultrasound transducers and optionally magnetic transducers. Scattered photons from the laser diodes are provided at the inner surface of the body of the device so that the photons are between the inner surface of the device and the outer surface of the head. The scattered photons are detected by ultrasound transducers present on the inner surface of the body of the device. The interaction with the photons provides information about brain activity regarding blood flow and blood oxygenation via photoacoustic tomography. In an alternative aspect, sensors that provide information about the scattered photons can be used in functional near-infrared spectroscopy (INIRS). MEG (magnetoencephalography) or EEG sensors may be used in a device of the present invention to detect electrical brain activity, or to detect changes in brain electrical activity. The data regarding brain activity acquired from these sensors can be relayed to a remote or local microprocessor. A local microprocessor may one that is integrated directly in or on the body of the device. The relayed data may be used by the microprocessor to return instructions to components in the device, such as ultrasound transducers, such as to modulate the ultrasound waveform, adjust the frequency, intensity or waveform characteristics to fine tune the ultrasound being delivered to the subject.

Methods of the present invention comprise activation of reward pathways in a subject by providing an effective amount of ultrasound to a brain region, wherein the brain region comprises the mesolimbic and mesocortical pathways, including connections between the medial forebrain bundle (MFB) and its connections to the nucleus accumbens (NA) wherein dopamine (DA) acts as a neuromodulator, the prefrontal cortex, the anterior cingulate cortex (ACC), basolateral amygdala (BLA), or the ventral tegmental area (VTA), as well as dopaminergic, glutamatergic, serotonergic, and cholinergic systems. Ultrasound may be provided by an ultrasound device of the present invention. Activation of reward pathways may be used to condition and/or reinforce certain desired attributes and/or to motivate specific behavioral actions. The major anatomical pathways responsible for "reward" in the nervous system are the mesolimbic and mesocortical pathways, which include connections between the medial forebrain bundle (MFB) and its connections to the nucleus accumbens (NA) wherein dopamine DA acts as a neuromodulator. Other areas crucial to reward pathways involve the prefrontal cortex, the anterior cingulate cortex (ACC), basolateral amygdala (BLA), and the ventral tegmental area (VTA). These reward (pleasure)

centers of the brain have powerful functions in reinforcing certain behaviors. These pathways mediate addiction to drugs of abuse and/or other appetitive behaviors. For example, in rats conditioned to press a bar to receive intracranial self-stimulation (ICSS) of the VTA, MFB, and/ or NA will lead to reinforcing behaviors such that the rat ignores all other environmental cues and will engage in repeated bar pressing behaviors in order to gain the reinforcing/pleasure inducing ICSS of those brain nuclei.

Methods of the present invention comprise ultrasound devices that deliver ultrasound waveforms to any one or a combination of the reward brain regions in order to reinforce desired behavioral actions. A device may provide focused and/or unfocused ultrasound ranging from 25 kHz to 50 MHz and an intensity ranging from 0.025 to 250 W/cm$^2$ in a treatment method to modulate brain function in a manner that rewards behaviors and/or increases the motivation to engage in certain behaviors. Since temporal contiguity of the reinforcement (brain stimulation) with the behavioral action is needed for the activation of reward pathways to promote behaviors, timing of the delivery of ultrasound waveforms to the reward brain regions may affect the behavioral response. Better behavioral responses are found when the delivery of reinforcing ultrasound stimulus waveforms occurs in close temporal contiguity with the behavior to be reinforced. Ultrasound stimulus waveforms may be provided from about one hour prior to the occurrence of the behavior to be reinforced to about one hour following the behavioral actions to be reinforced. Longer or shorter time ranges for ultrasound provision may be appropriate for some behaviors, or for later stages of treatment, and such ranges may be determined by those skilled in the art. More specific and restricted timing windows for providing ultrasound may lead to more robust behavioral conditioning. The activation of the ultrasound device of the present invention may be controlled by the subject or may be remotely controlled via various communication ports.

Methods for activation of reward pathways can be used for training a desired behavior or response. For example, ultrasound devices of the present invention may be used to provide ultrasound to a reward pathway to reinforce behaviors that are beneficial for military/combat/tactical personnel, machine operators, systems engineers, or other technical personnel to train the subjects to respond with specific behavioral routines and/or sensitive procedures. This will reduce job-specific learning curves and to increase job-performance. Such training can also be used to train athletes or any other subject where conditioned responses would be beneficial. Such training may also be used to change deleterious behaviors by providing reward stimulation that substitutes for the deleterious behavior. For example, when tempted to engage in a deleterious behavior such as an addictive behavior, a reward pathway is activated and the subject is "distracted" from the deleterious behavior.

Methods of the present invention comprise providing ultrasound to the prefrontal cortex and a device of the present invention may be used to provide the ultrasound. Providing ultrasound to the prefrontal cortex, alone or in combination with other treatments, such as transcranial magnetic stimulation, may be used to activate that brain region and may be useful for treatments of drug-resistant depression or clinical depression. Such ultrasound may be focused or unfocused.

Methods of the present invention comprise modulating cerebrovascular dynamics by providing ultrasound to brain regions. Ultrasound induces vasodilation or vasoconstriction in peripheral tissues by activating nitric oxide/nitric oxide synthetase. Data of the inventor showed that air-coupled ultrasound transducers induced vasodilation in the brains of rodents. Pulsed ultrasound remotely modulated brain hemodynamics by inducing cerebrovascular vasodilation in an intact brain. An ultrasound device of the present invention may alter brain activity by altering cerebrovascular blood flow and indirectly increase or decrease neuronal activity, altering energy utilization and metabolism, or increase oxygen to brain regions. The application of ultrasound through treatment devices may be used to regulate the cerebrovascular dynamics of the brain such that the blood-brain barrier is modified in order to allow the better absorption of one or more active agents, such as drugs or pharmaceuticals, to specific brain regions, for example, so that the active agent is effective in local brain regions while not affecting other surrounding brain regions. Application of ultrasound waves to a brain region can increase and or decrease linear blood cell density as well as cerebrovascular flux. The modulation of blood flow can be coupled to brain activity, but it can also be uncoupled from the effects on brain activity. Methods of the present invention comprise modulating blood vessel diameter in the brain of a human or animal, comprising providing an effective amount of ultrasound, in pulsed or continuous form, to a brain region, wherein an effective amount of ultrasound causes vasodilation or vasoconstriction of blood vessels in the area of the brain where the ultrasound waves impinge.

Methods of the present invention comprise activating sensory or motor brain regions in a subject by providing an effective amount of ultrasound to a brain region, wherein the brain region comprises all or part of a vestibular system, an aural region, a visual region, an olfactory region, a proprioperceptive region, afferents or efferents of one or more regions, or combinations thereof. Ultrasound may be provided by an ultrasound device of the present invention. An aspect of the present invention comprises methods and devices that allow a human-machine interface for communications with the subject operably attached to an ultrasound device of the present invention to activate sensory or motor brain regions of the subject to produce movement or to create synthetic brain imagery. For example, such methods and devices are used for projections of virtual sounds to auditory regions of the brain, ability to generate virtual maps/images onto visual brain regions, ability to control body movement patterns of an individual. Such brain stimulation may be effected either directly or indirectly. For example, an operator or the subject may stimulate the vestibular system to cause the subject to make a turning motion in order to guide that subject via GPS or other feedback from navigation technology, or stimulate motor areas of the subject's brain to cause the subject to make a motor action. Such methods and devices may be used for any application, including but not limited to, recreational, entertainment, and/or video gaming applications.

Figure 9A:
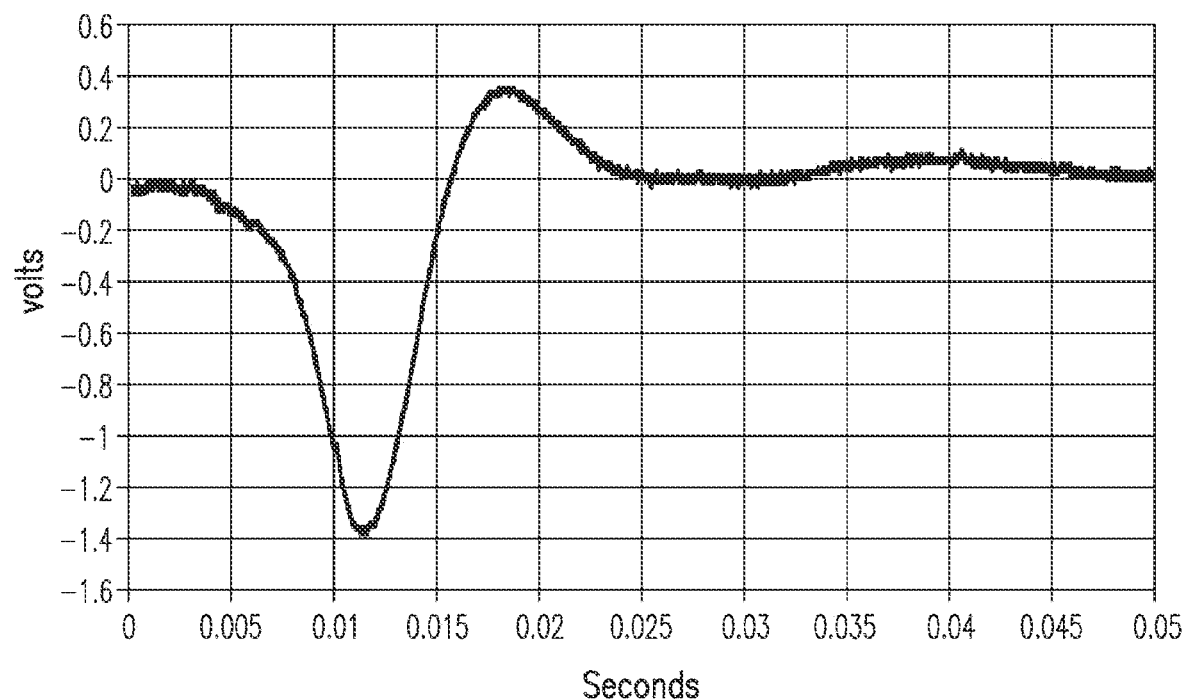
FIG. 9A-B are graphs showing the energy produced in the conversion of mechanical energy to electrical energy using piezopolymers.
Figure 9B:
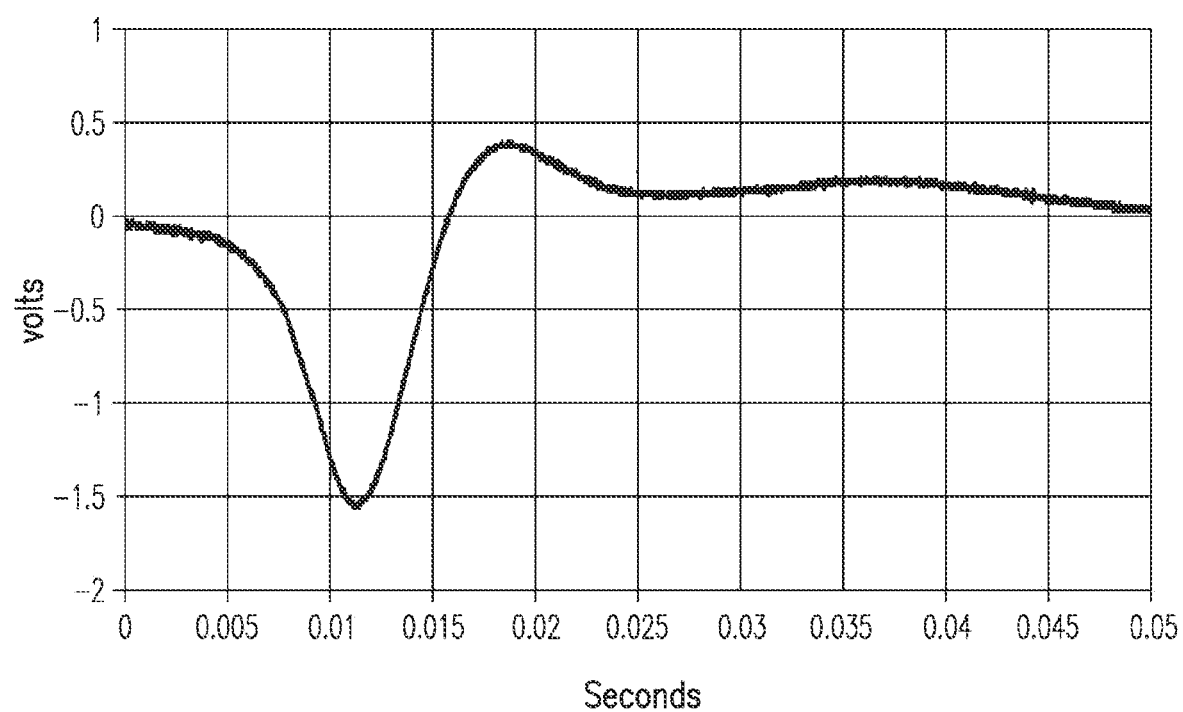

Methods of the present invention comprise harvesting energy, for example, to power a device of the present invention. For example, mechanical energy generated by a physical activity such as walking, jogging, running, peddling, etc. is converted to electrical energy using piezopolymers or piezoelectric fiber composites. The electrical energy produced charges or re-charges the capacitive or battery elements which may be powering the ultrasound transducer microcontrollers or other components of a device. For example, a subject's footwear, i.e., boot, shoe, etc. comprises PVDF piezopolymers or piezoelectric fiber composites (e.g., Piezoflex from Airmar Technology Corp.). The subject's footwear may comprise one or more microcontrollers for harvesting the energy that is generated during the physical activity. The electrical energy then supplies power to a device via at least one microcontroller and at least one battery. Voltage traces confirm energy harvesting or conversion of mechanical energy into electrical energy using piezopolymers. FIGS. 9A and B are graphs showing the energy produced in the conversion of mechanical energy to electrical energy using piezopolymers.

Methods of the present invention comprise methods of facilitating uni- and bi-directional communication between a subject wearing an ultrasound device of the present invention and a remote control unit or processor. The remote control unit/processor includes but is not limited to a central command location or unit, or its equivalents, a monitoring station for vital functions, or its equivalents, or some type of console (e.g., gaming console). A device of the present invention may send information or data to a remote control unit/processor for further analysis and evaluation, using communication networks, including but not limited to, radio frequency (RF), wi-fi, wi-max, Bluetooth, ultrasound, and infrared radiation. Such data include but are not limited to information related to the subject's brain activity, vital functions such as EEG and MEG, and the subject's global positioning. Other data include photoacoustic tomography, information regarding the timing of events, and force/blast information. Software and algorithms may be used to analyze the data transmitted from the subject. Based on the computational analysis of the data, a device may alter one or more stimuli, such as ultrasound, being provided to the subject, for example, provide modified ultrasound waveform patterns. Modifications may include changes in acoustic frequency and intensity and changes in ultrasound focusing. The changes in ultrasound waveform patterns modify brain function to achieve a desired outcome The disclosed methods and devices achieve acoustic impedance matching between water-matched ultrasound transducers and the surface of the head of the subject. For example, one or more water-matched ultrasound transducers are coupled to ultrasound coupling pads and installed into an ultrasound device. The water-matched ultrasound transducer receives voltage pulses from at least one microcontroller of an ultrasound device. For example, the ultrasound transducer is in electrical communication with a microcontroller at one position of the transducer, and contacts an ultrasound coupling pad at a different location of the transducer. The ultrasound coupling pad is in contact with the transducer in one location and, in another location of the pad, is in contact with the surface of the head of the wearer of the device. For example, the transducer transits from the outside of the body of the device to the inner surface of the device. At the outer surface of the body of the device, the transducer is operably connected to a microcontroller, either remotely or by an electrical means such as a wire. At the inner surface of the body of the device, the transducer is in contact with the ultrasound coupling pad. The use of ultrasound coupling pads helps provide optimal power transfer during ultrasound transmission. Ultrasound coupling pads include but are not limited to degassed water in a polymer bladder. One or more ultrasound coupling pads mounted within an ultrasound device serve to couple water-matched ultrasound transducers directly to the subject's head surface.

The methods of providing ultrasound waves to neural tissue or the brain to modulate brain activity may further comprise providing other elements or treatments, such as providing pharmaceutical or chemical compounds, and/or electrical or light waves in conjunction with ultrasound waves. Such other elements or treatments may be provided to a subject before, concurrently with, or after ultrasound is provided to the subject. Methods comprising combinations of one or more types of treatments or elements, for example, such as ultrasound and pharmaceutical treatments, are contemplated by the present invention.

Definitions

As used in the specification and the appended claims, the singular forms "a," "an," and "the" include plural referents unless the context clearly dictates otherwise. Thus, for example, reference to "a pharmaceutical carrier" includes mixtures of two or more such carriers, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

The term "treating" refers to inhibiting, preventing, curing, reversing, attenuating, alleviating, minimizing, suppressing or halting the deleterious effects of a disease and/or causing the reduction, remission, or regression of a disease. Those of skill in the art will understand that various methodologies and assays can be used to assess the development of a disease, and similarly, various methodologies and assays may be used to assess the reduction, remission or regression of the disease.

"Increase" is defined throughout as 1, 2, 3, 4, 5, 6, 7, 8, 9, 10, 11, 12, 13, 14, 15, 16, 17, 18, 19, 20 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 150, 200, 250, 300, 400, or 500 times increase as compared with basal levels or a control.

EXAMPLES

Example 1: Treatment of TBI

A person is injured and has traumatic brain injury resulting from exposure to a blast from an explosion. Because this person is a military service member, the person is wearing an anti-ballistic helmet comprising ultrasound transducers. The ultrasound transducers are located in a phased array or as single transducer elements. A sensor in the helmet registers the pressure force of the blast and communicates wirelessly to a remote control position located a distance from the blast zone that a blast has occurred. A GPS signal is sent that provides data about the location of device. A sensor, located in the attachment straps of the helmet, relays data that the device is still attached to the subject. Other sensors relay data about the subject's physical condition such as heart rate, brain activity, blood pressure, etc. The EEG data shows a location of injury to the brain that indicates traumatic brain injury. In some embodiments, treatment may be provided by way of transducers that are not comprised in an anti-ballistic helmet, but through a portable treatment unit that can be administered by emergency responding personnel such as a combat medic. Such a portable treatment unit may be comprised of one or more ultrasound transducers and can be handheld or not. A portable treatment unit may also comprise EEG electrodes in order to monitor brain activity.

Upon receiving the data, the remote site responds by transmitting data and ultrasound wave process data to the transducers in the phased array of the helmet. A microcontroller changes the orientation of some of the transducers in and adjacent to the phased array. The ultrasound transducers provide a focused ultrasound treatment to the site of traumatic brain injury, comprising providing ultrasound waves at 0.5 MHz and 100 mW/cm$^2$. The ultrasound transducers also provide focused and unfocused ultrasound waves ranging from 25 kHz to 50 MHz to areas around the injury site to ameliorate secondary effects from the traumatic brain injury. Medical personnel are sent to the blast site and the subject using GPS locational data. While undergoing ultrasound treatment, the subject is transported to a hospital.

Example 2: Alteration of Memory

A human with post-traumatic stress disorder (PTSD), such as that resulting from combat stress, presents to a psychiatrist requesting relief from disturbing memories. An ultrasound device of the present invention is placed on the human subject's head and unfocused ultrasound ranging from 25 kHz to 50 MHz is applied in multiple treatments to modulate brain function in a manner that alters neuronal plasticity such that the formation of memories related to specific events are blocked. Concurrently with ultrasound therapy, the subject is administered anti-anxiety medication, a serotonin release inhibitor, SRI. The ultrasound waves target one or more brain regions, comprising the hippocampal formation, hippocampus proper, limbic system, amygdala, thalamus, cerebellum, striatum, entorhinal cortex, perirhinal cortex, and cerebral cortex (including prefrontal cortex, auditory cortex, visual cortex, somatosensory cortex, and/or motor cortex), brain afferents or brain efferents of said regions, or combinations thereof. One treatment comprises providing ultrasound waves at 30 MHz and 300 mW/cm$^2$ to the amygdala in multiples of 250 milliseconds with a rest period of 500 milliseconds for 10 minutes, evoking the memory by recall of the events, and repeating the treatment when the memory is evoked. In other treatments ultrasound ranging in single or multiple frequencies ranging from 25 kHz to 50 MHz can be used to treat the brain in a pulsed or continuous wave mode at intensities less than 1 W/cm$^2$ in single or multiple repeat sessions as needed. After several days to weeks of treatment, the subject reports less depression, fewer panic attacks, and is able to return to many every day activities such as socializing with friends.

Example 3: Reduction of Anxiety

A person is being trained to operate a space craft and a reduction in stress responses is sought in performing emergency response training. While training in performing specific emergency response activities, the person wears an ultrasound device comprising an astronaut helmet and ultrasound transducers. Ultrasound waves are provided to the person's brain to modulate one or more of noradrenaline, epinephrine, norepinephrine (NE), acetylcholine (ACh), cortisol, corticotropin-releasing hormone (CRH), adrenocorticotropic hormone (ACTH), or glucocorticoids, and brain structures including the locus ceruleus, the paraventricular nucleus of the hypothalamus (PVN), the autonomic nervous system, the sympathetic nervous system; ("fight-or-flight" response), hypothalamic-pituitary-adrenal axis (HPA), adrenal medulla, and the pons. For example, one treatment comprises providing unfocused ultrasound waves at 50 MHz and 40 mW/cm$^2$ by sweeping the hypothalamic-pituitary-adrenal axis (HPA), and providing focused ultrasound waves through an acoustic hyperlens to the pons at 200 kHz and 40 W/cm$^2$. After several training sessions during which ultrasound treatments are provided, the stress response, as measured by physiological data such as respiration rate, heart rate and blood pressure, and by levels of adrenalin, is lowered in the person.

Example 4: Activation of Brain Regions for Arousal and Attention

A pilot flying airline routes from New York to Tokyo wears an ultrasound device of the present invention. The body of the device is formed so that a phased array of ultrasound transducers is positioned to provide ultrasound waves to the prefrontal cortex, basal forebrain, the hypothalamus, tuberomamillary nuclei, basolateral amygdala, ventral tegmental area, medial forebrain bundle, locus ceruleus, the thalamus, and the dorsal raphe nucleus. A sensor in the device, for example, an MEG or EEG sensor can detect specific thalamocortical oscillations (~ 40 Hz) known to occur during wakefulness or alertness. When the MEG or EEG sensor detects fewer thalamocortical oscillations or other frequency band oscillations that indicate lessened wakefulness, the sensor data activates a controller imbedded in the device body to activate the ultrasound array to provide unfocused ultrasound waves from about 100 kHz to about 2.5 MHz in a sweeping frequency arrangement and an intensity of 250 mW/cm$^2$ to the hypothalamus, basolateral amygdala, medial forebrain bundle, locus ceruleus, the thalamus, and the dorsal raphe nucleus. The pilot is restored to a wakeful state and continues to fly the airplane in an alert condition.

Example 5: Reward Behaviors

A person has road rage attacks and experiences a road rage attack every day while driving to work. In treatment of this condition, the person begins wearing an ultrasound device of the present invention. When the person controls the rage response successfully, the person then activates the ultrasound device to provide ultrasound waves to a brain region for reward pathways, such as the mesolimbic and mesocortical pathways, including connections between the medial forebrain bundle (MFB) and its connections to the nucleus accumbens (NA) wherein dopamine DA acts as a neuromodulator, the prefrontal cortex, the anterior cingulate cortex (ACC), basolateral amygdala (BLA), or the ventral tegmental area (VTA), as well as dopaminergic, glutamatergic, serotonergic, and cholinergic systems to gain the reinforcing/pleasure inducing ICSS of those brain nuclei. Ultrasounds waves at 200 kHz and 300 mW/cm$^2$ are provided in 100 millisecond pulses for 3 minutes. A cooling unit is provided in the device that also functions as an ultrasound coupling pad to aid in transmission of the ultrasound waves. Occasionally when tempted to engage in the deleterious road rage behavior, a reward pathway is activated and the subject is distracted from the road rage.

Example 6: Virtual Applications and Peripheral and Cranial Nerves

A device of the present invention is used to provide a virtual experience to a person by providing ultrasound waves that modulate brain activity in the vestibular system, aural region, and a visual region. The subject wears an ultrasound device of the present invention that provides ultrasound waves in a focused manner from about 100 kHz to 10 MHz while the virtual experience is desired. The subject may visually follows a display unit of a computer running software that provides the visual cues of the experience, for example a training exercise or a video game. The subject responds with movements or the sensation of movement, hears sounds and/or sees aspects of the training program when the ultrasound waves are impinging on the brain regions or the periphery. In an embodiment, ultrasound may be delivered to the vestibular nerve or the vestibular system to alter the sensation of balance. The modulation of the sense of balance can be coupled to a visual display during the virtual experience such that the subject experiences motion or the sense of movement.

Figure 20A:
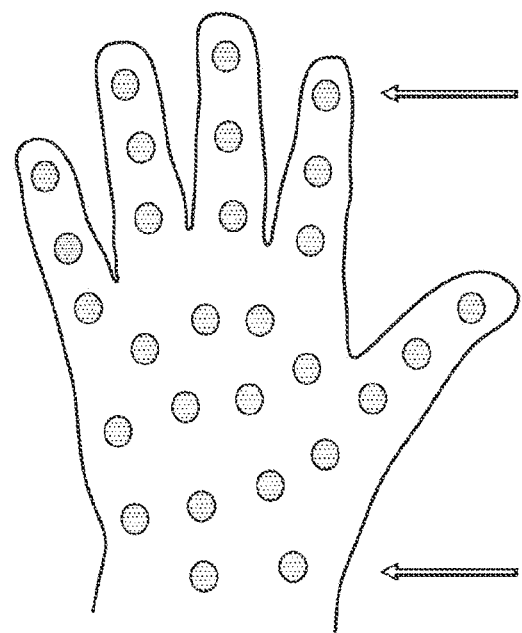
FIG. 20A-B show A—an exemplary embodiment for treating peripheral nerves. The dark circles represent ultrasound transducers for stimulating peripheral nerve structures to evoke mechanical, thermal, or painful sensations, which are processed by the brain and result in a change in brain activity to process the stimulus. B—Different skin receptors making up the nervous system are shown. These nerve structure receptors can be differentially modulated by ultrasound to evoke different types of somatosensory feedback cues, which are interpreted by the brain. Such sensations can be pain, heat, cold, light touch, deep pressure, or other mechanical sensation.
Figure 20B:
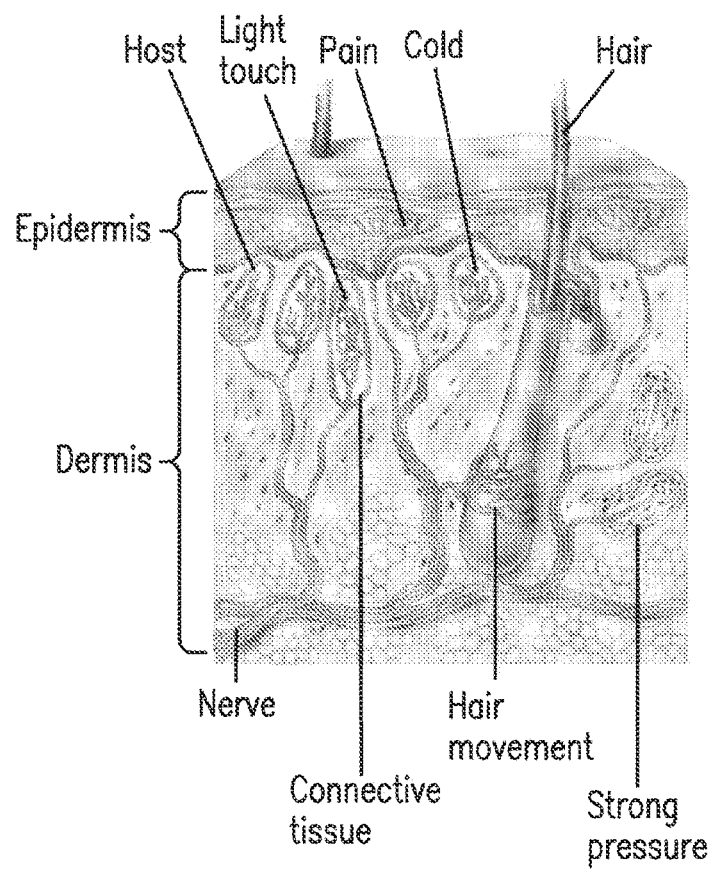

In an embodiment, a device of the present invention is used to provide somatosensory feedback to the hands or feet of the subject by delivering pulsed or continuous wave ultrasound to the periphery. In such an embodiment the ultrasound can be delivered to at least one hand by a glove or other handheld device such as a videogame controller, cellular/mobile telephone or PDA, or to a foot by a shoe, or videogame controller, cellular/mobile telephone or PDA. The pulsed or continuous wave ultrasound can be delivered at acoustic frequencies ranging from 25 kHz to 50 MHz at intensities ranging from 30 mW/cm$^2$ to 1 W/cm$^2$ from air- or water-matched transducers arranged as single elements or phased arrays to produce painful, mechanical, or thermal sensations in peripheral body structures, separate from the brain, such that interactive experiences can be modulated. In such an embodiment, stimulation of peripheral nerve structures with pulsed or continuous wave ultrasound will modulate somatosensory experiences by modulating brain activity through direct peripheral nerve stimulation in the hands, feet, or other body part. See FIG. 20 wherein an embodiment of an ultrasound device for stimulating peripheral nerves in the hand is shown. The stimulation of the peripheral nerve will provide somatosensory feedback to the subject by changing brain activity in areas of the brain responsible for processing pain, mechanical, or thermal stimuli such as the somatosensory cortex. The materials for the transducers can be piezoceramics, piezopolymers, gas matrix piezoelectric transducers, or CMUTs. These devices can also be used to characterize peripheral nerve function by stimulating peripheral nerves to assess damage or function and or to map body receptive fields or they can be used in conjunction with electrical and/or magnetic stimulation to overcome neural recruitment issues in clinical situations or for prosthetic devices. FIG. 20A shows a glove-like device although this could be a cell phone, pda, iPad, or video game controller. Peripheral nerve stimulation will modify brain activity in a way other than direct application of ultrasound to the brain. FIG. 20B shows a picture of human skin with anatomical illustration of hair and nerve endings for detection of heat, cold, pain, proprioperception, etc.

In a like manner, methods of the present invention comprise stimulating cranial nerves, which are nerves that are primarily outside the brain structure itself, for example, but not as a limitation, the vestibular nerve, vestibulocochlear nerve, and the trigeminal nerve. The pulsed or continuous wave ultrasound can be delivered at acoustic frequencies ranging from 25 kHz to 50 MHz at intensities ranging from 30 mW/cm$^2$ to 1 W/cm$^2$ from air- or water-matched transducers arranged as single elements or phased arrays.

For example, a device for modulating peripheral or cranial nerve activity of a human or animal user using ultrasound, may comprise an article configured to be placed on at least a portion of the body of the user, and at least one ultrasonic transducer coupled to the article and configured to emit ultrasound, also referred to as acoustic energy, wherein the portion of the body of the user that is contacted by the ultrasound is not the brain. The article may comprise a glove, a shoe, a piece of clothing, a scarf, a game controller, a cellular telephone, a personal digital assistant, an iPad, a computer, a flexible material, or a non-flexible material. The article may be shaped to be adaptable to the portion of the body to which the ultrasound is applied. There may be one or more ultrasound transducers coupled to the article, and at least one ultrasound transducer is at least one of an ultrasonic emitter, piezoelectric transducer, piezocomposite transducer, piezopolymer, or a capacitive micromachined ultrasound transducer. The device may comprise at least one electromagnetic wave producing component. The device may comprise a global positioning component. The device may comprise a controller coupled to at least one ultrasonic transducer, wherein the controller controls waveform and power emitted by at least one ultrasonic transducer. The controller may be attached to the article. The controller may be located remote to the article. The device may comprise a plurality of ultrasonic transducers positioned in an array of transducers. An array may be in any configuration, for example an array of transducers may be a circular array of transducers. The device may comprise components for focusing the acoustical energy to one or more sites in the brain of the user. Such focusing components are known, and include, but are not limited to, an acoustic hyperlens or acoustic metamaterial. The intensity of the acoustical energy is less than about 500 mW/cm$^2$. The intensity of the acoustical energy is less than about 100 W/cm$^2$. The frequency of the acoustical energy is between about 0.02 MHz and 10.0 MHz. The frequency of the acoustical energy is between about 25 kHz and 50 MHz.

The device may comprise at least one motion control component coupled to the article, and/or may be coupled to at least one ultrasonic transducer, and a motion control component may be configured to change the orientation of at least one transducer relative to its base. The device may be configured for stimulation of peripheral nerves. The device may be configured for stimulation of cranial nerves. For example, the device may stimulate cranial nerves which are distinct from brain, including, but not limited to, the vestibular nerve, the vestibulocochlear nerve or the trigeminal nerve. The device may provide pulsed ultrasound waveforms, continuous ultrasound waveforms or both.

Example 7: Energy Production

A device of the present invention is powered when mechanical energy generated by a physical activity such as walking, is converted to electrical energy using piezopolymers or piezoelectric fiber composites located in the shoes of the person wearing the ultrasound device. The electrical energy produced charges or re-charges the capacitive or battery elements which are powering the ultrasound transducer microcontrollers or other components of a device. The subject's shoe comprises PVDF piezopolymers and three microcontrollers for capturing the energy that is generated during walking. The electrical energy then supplies power to the device where it is stored in a capacitor or battery. Two hours later, while undergoing training, the person uses the stored power to run the ultrasound phased array or single element transducers.

Example 8: Generation and Characterization of Pulsed US Waveforms

Immersion-type US transducers having a center frequency of 0.5 MHz (V301-SU, Olympus NDT, Waltham, MA) or 0.3 MHz (GS-300-D19, Ultran, State College, PA) were used to produce US waveforms. US pulses were generated by brief bursts of square waves (0.2 µs; 0.5 mV peak-to-peak) using an Agilent 33220A function generator (Agilent Technologies, Inc., Santa Clara, CA, USA). Square waves were further amplified (50 dB gain) using a 40 W ENI 240L RF amplifier. Square waves were delivered between 0.25 and 0.50 MHz depending on the acoustic frequency desired. US pulses were repeated at a pulse repetition frequency by triggering the above-referenced function generator with square waves produced using a second Agilent 33220A function generator.

The intensity characteristics of pulsed US stimulus waveforms were characterized by recording voltage traces produced by US pressure waves using a calibrated needle hydrophone (HNR 500, Onda Corporation, Sunnyvale, CA, USA) and an Agilent DSO6012A 100 MHz digital oscilloscope connected to a PC. Intensity measurements were made from targeted points inside fresh ex vivo mouse heads corresponding to the brain region targeted. The transcranial US waveforms were transmitted to intact brain circuits from US transducers using custom-designed acoustic collimators consisting of 3.0 or 4.7 mm (1 ml syringe) diameter polyethylene tubing or 5.0 mm diameter tubing tapered to a 2.0 mm diameter output aperture. Collimating guides were constructed so stimulated regions of the brain were in the far field of US transmission paths and filled with ultrasound coupling gel.

Using measurements recorded from calibrated hydrophones, several acoustic intensity characteristics of pulsed US stimulus waveforms were calculated based on published and industry accepted standards (NEMA, 2004).

The pulse intensity integral (P//) was defined as $$P// = \int \frac{p2(t)}{z\circ} dt$$

where p is the instantaneous peak pressure, $Z_0$ is the characteristic acoustic impedance in Pa s/m defined as ρc where ρ is the density of the medium, and c is the speed of sound in the medium. We estimated ρ to be 1028 kg/m³ and c to be 1515 m/s for brain tissue based on previous reports (Ludwig, 1950). The spatial-peak, pulse-average intensity ($I_{SPPA}$) was defined as $$I_{SPPA} = \frac{P//}{PD}$$

where PD is the pulse duration defined as (t)(0.9P//−0.1 P//) 1.25 as outlined by technical standards established by AIUM and NEMA (NEMA, 2004).

The spatial-peak temporal-average intensity ($I_{SPTA}$) was defined as $I_{SPTA}$=P//(PRF), where PRF is equal to the pulse repetition frequency in hertz.

The mechanical index (MI) was defined as $$MI = \frac{P_r}{\sqrt{f}}.$$

In Vivo US Stimulation

Wild-type mice were used in accordance with animal-use protocols approved by the Institutional Animal Care and Use Committee at Arizona State University. To conduct transcranial US stimulation of intact motor cortex, mice were anesthetized using a ketamine-xylazine cocktail (70 mg/kg ketamine, 7 mg/kg xylazine) administered intraperitoneally. The hair on the dorsal surface of the head over regions corresponding to targeted brain regions was trimmed. Mice were then placed in a custom-designed or Cunningham mouse stereo-tax. US transducers with affixed collimators were lowered to points above the skin corresponding to brain regions using standard stereotactic coordinates. Collimators or transducers were then placed on the surface of the skin above the targeted brain region and coupled to the skin using ultrasound gel. Transcranial pulsed US stimulus waveforms were delivered to the targeted motor cortex or hippocampus using standard TTL triggering protocols. Digital signal markers indicated the onset and length of US stimulus waveforms. During some experiments, simultaneous electrophysiological data were acquired (see below). Only in experiments where in vivo extracellular recordings of brain activity or brain temperature were made was a craniotomy performed. Since cranial windows and electrode insertions were made at sites adjacent to angled US projection lines targeting specific brain regions, in these cases the US was still transmitted through skull bone, although not covered by overlying skin. All other experiments were conducted in wholly intact mice, except for some mapping experiments that required retraction of the skin to identify landmarks on the mouse skull. Following stimulation, animals were either allowed to recover from anesthesia or processed as described below.

Extracellular Recording

Extracellular activity was recorded using standard approaches with tungsten microelectrodes (500 kΩ to 1 MΩ, FHC, Inc., Bowdoin, ME, USA). Tungsten microelectrodes were driven to recording sites through cranial windows (d=1.5 mm) based on stereotactic coordinates and confirmed by electrophysiological signatures. Tungsten microelectrodes were connected to a Medusa PreAmp (RA16PA; Tucker-Davis Technologies, Aluchua, FL, USA) and a multichannel neurophysiology workstation (Tucker-Davis Technologies) or a 16 channel DataWave Experimenter and SciWorks (Data Wave Technologies, Berthoud, CO) to acquire extracellular activity. Raw extracellular activity in response to pulsed US was acquired at a sampling frequency of 24.414 kHz in 10 s trial epochs. The MUA signal was resampled at 1.017 kHz and bandpass filtered between 0.3 to 6 kHz, the LFP signal was filtered between 1 and 120 Hz, wideband activity was filtered between 0.001 and 10 kHz, gamma band activity was filtered between 40 and 100 Hz, and the SWP ripple band was filtered between 160 and 200 Hz. Data analyses were subsequently performed offline.

EMG Recordings

Fine-wire EMG recordings were made using standard approaches and a four-channel differential AC amplifier (model 1700, A-M Systems, Inc., Sequim, WA, USA) with 10-1000 Hz band-pass filter and a 100× gain applied. Electrical interference was rejected using a 60 Hz notch filter. EMG signals were acquired at 2 kHz using a Digidata 1440A and pClamp or a 16 channel Data-Wave Experimenter and SciWorks. Briefly, small barbs were made in a 2 mm uncoated end of Teflon-coated steel wire (California Fine Wire, Co., Grover Beach, CA, USA). Single recording wires were then inserted into the appropriate muscles using a 30 gauge hypodermic syringe before being connected to the amplifier. Ground wires were similarly constructed and subcutaneously inserted into the dorsal surface of the neck.

Brain Temperature Recordings and Estimated Changes

Prior to US stimulation in some experiments, a small craniotomy (d≈2 mm) was performed on mouse temporal bone. Following removal of dura, a 0.87 mm diameter thermocouple (TA-29, Warner Instruments, LLC, Hamden, CT, USA) was inserted into motor cortex through the cranial window. The thermocouple was connected to a monitoring device (TC-324B, Warner Instruments) and to a Digidata 1440A to record temperature (calibrated voltage signal=100 mV/° C.) using pClamp.

The influence of US stimulus waveforms on brain temperature change was estimated using a set of previously described equations valid for short exposure times (O'Brien, 2007). Briefly, the maximum temperature change (ΔTmax) was estimated to be $$\Delta t_{max} \frac{Q \Delta t}{C_v}$$

where Δt is the pulse exposure time, where $C_v$ is the specific heat capacity for brain tissue ≈3.6 J/g/K (Cooper and Trezek, 1972), and where Q is the rate at which heat is produced defined by Nyborg (1981):

$$\overset{\circ}{Q} = \frac{ap_0^2}{pc}$$

where p is the density of the medium, c is the speed of sound in the medium as described above, where α is the absorption coefficient of brain (≈0.03 Np/cm for 0.5 MHz US; Goss et al., 1978), and $p_0$ is the pressure amplitude of US stimulus waveforms.

Data Analyses

All electrophysiological data (MUA, LFP, and EMG) were processed and analyzed using custom-written routines in Matlab (The Mathworks, Natick, MA, USA) or Clampfit (Molecular Devices). Single spikes were isolated using a standard thresholding window. Ultrasound waveform characteristics were analyzed using hydrophone voltage traces and custom-written routines in Matlab and Origin (OriginLab Corp., Northampton, MA, USA). All histological confocal and transmitted light images were processed and analyzed using ImageJ (http://rsb.info.nih.gov/ij/). Electron microscopy data were also quantified using ImageJ. All statistical analyses were performed using SPSS (SPSS, Inc., Chicago, IL, USA). Data shown are mean±SEM unless indicated otherwise.

Figure 11A:
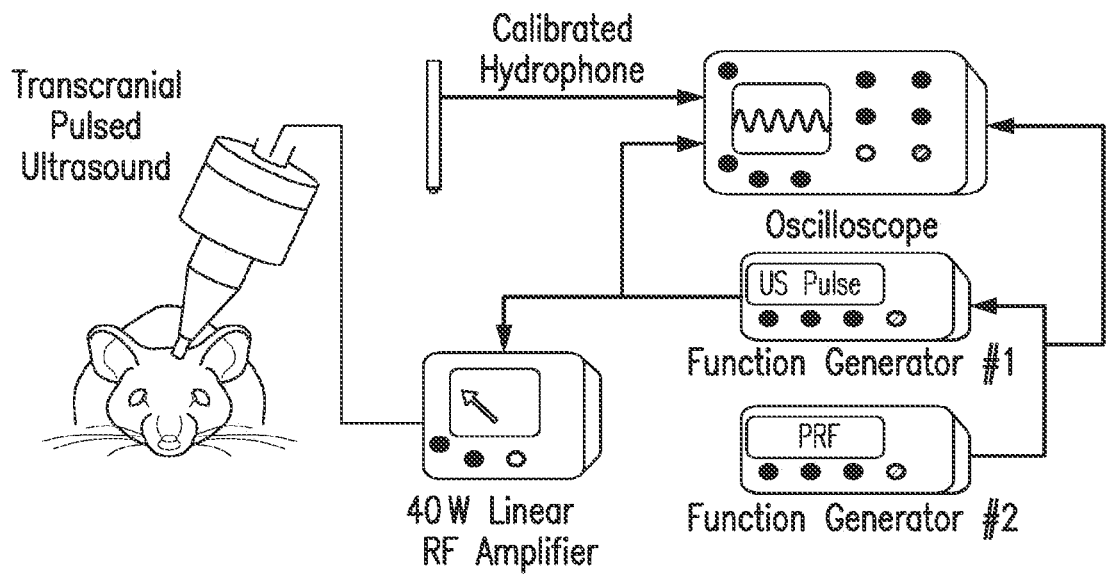
FIG. 11A-C shows ultrasound stimulus waveforms for the transcranial stimulation of intact brain circuits (A) Illustration of the method used to construct and transmit pulsed US waveforms into the intact mouse brain. Two function generators were connected in series and used to construct stimulus waveforms. An RF amplifier was then used to provide final voltages to US transducers. (B) An example low-intensity US stimulus waveform is illustrated to highlight the parameters used in their construction. The acoustic intensities generated by the illustrated stimulus waveform are shown in the yellow box. (C) Projected from a transducer surface to the face of a calibrated hydrophone, the acoustic pressure generated by a 100 cycle pulse of 0.5 MHz ultrasound is shown (left). The pressure generated by the same US pulse when transmitted from the face of the transducer through a fresh ex vivo mouse head to regions corresponding to motor cortex (0.8 mm deep) is shown (right).

Example 9: Construction and Transmission of Pulsed Ultrasound Stimulus Waveforms into Intact Brain Circuits US stimulus waveforms were constructed and transmitted into the intact brains of anesthetized mice (n=192; FIG. 11A). The optimal gains between transcranial transmission and brain absorption occurs for US at acoustic frequencies (f)<0.65 MHz (Hayner and Hynynen, 2001; White et al., 2006). Herein transcranial stimulus waveforms were constructed with US having f=0.25-0.50 MHz. Intensity characteristics of US stimulus waveforms were calculated based on industry standards and published equations developed by the American Institute of Ultrasound Medicine, the National Electronics Manufacturers Association, and the United Stated Food and Drug Administration (NEMA, 2004; see above description).

Figure 11B:
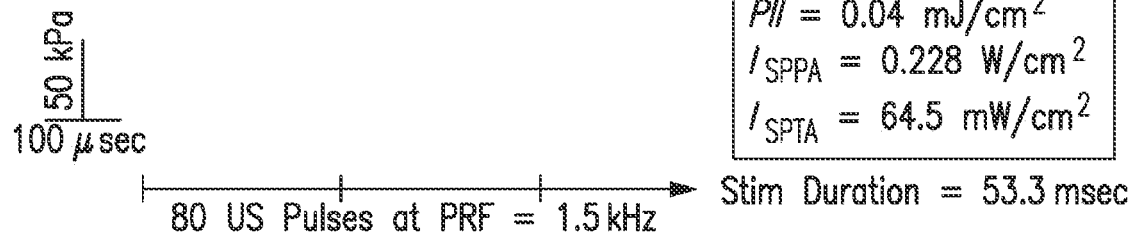
Figure 11C:
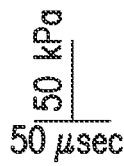

Single US pulses contained between 80 and 225 acoustic cycles per pulse (c/p) for pulse durations (PD) lasting 0.16-0.57 ms. Single US Pulses were repeated at pulse repetition frequencies (PRF) ranging from 1.2 to 3.0 kHz to produce spatial-peak temporal-average intensities ($I_{SPTA}$) of 21-163 mW/cm² for total stimulus duration ranging between 26 and 333 ms. Pulsed US waveforms had peak rarefactional pressures (pr) of 0.070-0.097 MPa, pulse intensity integrals (PII) of 0.017-0.095 mJ/cm², and spatial-peak pulse-average intensities ($I_{SPPA}$) of 0.075-0.229 W/cm². FIGS. 11A and 11B illustrate the strategy developed for stimulating intact brain circuits with trans-cranial pulsed US. The attenuation of US due to propagation through the hair, skin, skull, and dura of mice was <10% (FIG. 11C), and all intensity values reported were calculated from US pressure measurements acquired using a calibrated hydrophone positioned with a micromanipulator inside fresh ex vivo mouse heads at locations corresponding to the brain circuit being targeted.

Figure 12D:
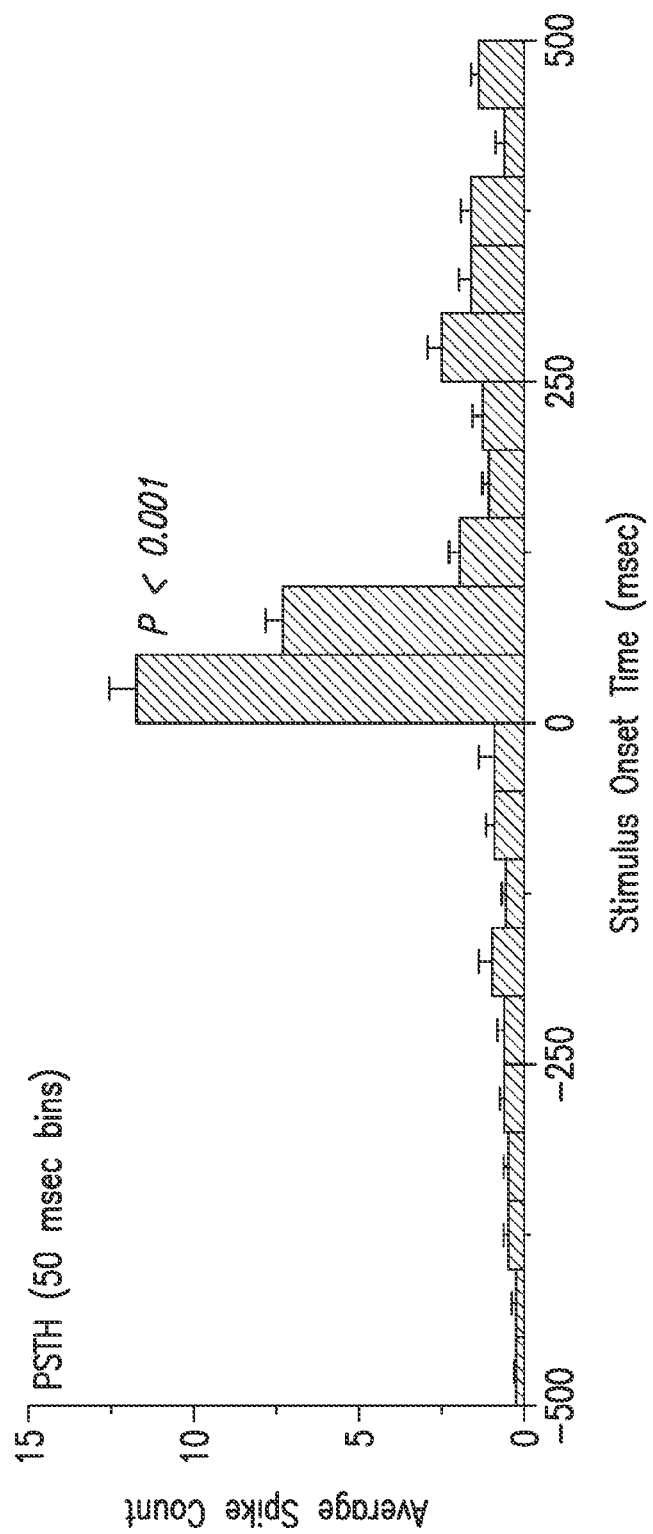

Example 10: Functional Stimulation of Intact Brain Circuits Using Pulsed Ultrasound The influence of pulsed US on intact motor cortex was studied because it enables electrophysiological and behavioral measures of brain activation. Local field potentials (LFP) and multiunit activity (MUA) were recorded in primary motor cortex (M1) while transmitting pulsed US (0.35 MHz, 80 c/p, 1.5 kHz PRF, 100 pulses) having an$I_{SPTA}$=36.20 mW/cm² through acoustic collimators (d=4.7 mm) to the recording locations in anesthetized mice (n=8; FIGS. 12A and 12B). Pulsed US triggered an LFP in M1 with a mean amplitude of −350.59±43.34 µV (FIG. 2B, 25 trials each). The LFP was associated with an increase in the frequency of cortical spikes (FIGS. 12C and 12D). This increase in spiking evoked by pulsed US was temporally precise and apparent within 50 ms of stimulus onset (FIG. 12D). A broad range of pulsed US waveforms were found were equally capable of stimulating intact brain circuits as discussed below. Application of TTX (100 µM) to M1 (n=4 mice) attenuated US-evoked increases in cortical activity, indicating that transcranial US stimulated neuronal activity mediated by action potentials (FIG. 12B). These data provided evidence that pulsed US can be used to directly stimulate neuronal activity and action potentials in intact brain circuits.

Fine-wire electromyograms (EMG) and videos of muscle contractions in response to US stimulation of motor cortex in skin and skull-intact were acquired in anesthetized mice. Using transcranial US to stimulate motor cortex, muscle contraction and movements were evoked in 92% of the mice tested. The muscle activity triggered by US stimulation of motor cortex produced EMG responses similar to those acquired during spontaneous muscle twitches (FIG. 13A).

When using transducers directly coupled to the skin of mice, bilateral stimulation with transcranial US produced the near-simultaneous activation of several muscle groups, indicated by tail, forepaw, and whisker movements. By using acoustic collimators having an output aperture of d=2.0, 3.0, or 4.7 mm and by making small (≈2 mm) adjustments to the positioning of transducers or collimators over motor cortex within a subject, the activity of isolated muscle groups was differentially evoked. Despite these intriguing observations, it was difficult to reliably generate fine maps of mouse motor cortex using US for brain stimulation. The likeliest explanation for this difficulty is that the topographical/spatial segregation of different motor areas represented on the mouse cortex are below the resolution limits of US.

Example 11: The Influence of US Brain Stimulation Parameters on Motor Circuit Response Properties When bilaterally targeted to motor cortex, pulsed US (0.50 MHz, 100 cycles per pulse, 1.5 kHz PRF, 80 pulses) having an $I_{SPTA}$=64.53 mW/cm² triggered tail twitches and EMG activity in the lumbosacrocaudalis dorsalis lateralis muscle with a mean response latency of 22.65±1.70 ms (n=26 mice). When unilaterally transmitted to targeted regions of motor cortex using a collimator (d=3 mm), pulsed US (0.35 MHz, 80 c/p, 2.5 kHz PRF, 150 pulses) having an $I_{SPTA}$=42.90 mW/cm² triggered an EMG response in the contralateral triceps brachii muscle with a mean response with latency of 20.88±1.46 ms (n=17 mice). With nearly identical response latencies (21.29±1.58 ms), activation of the ipsilateral triceps brachii was also observed in ~ 70% of these unilateral stimulation cases. Although consistent from trial to trial (FIG. 13B), the EMG response latencies produced by US brain stimulation were ~ 10 ms slower those obtained using optogenetic methods and intracranial electrodes to stimulate motor cortex (Ayling et al., 2009). Several reports show that TMS also produces response latencies slower than those obtained with intracranial electrodes (Barker, 1999). Discrepancies among the response latencies observed between electrical and US methods of brain stimulation are possibly due to differences in the time-varying energy profiles that these methods impact on brain circuits. The underlying core mechanisms of action responsible for mediating each brain-stimulation method are additional factors likely to influence the different response times.

Figures 13A, 13B:
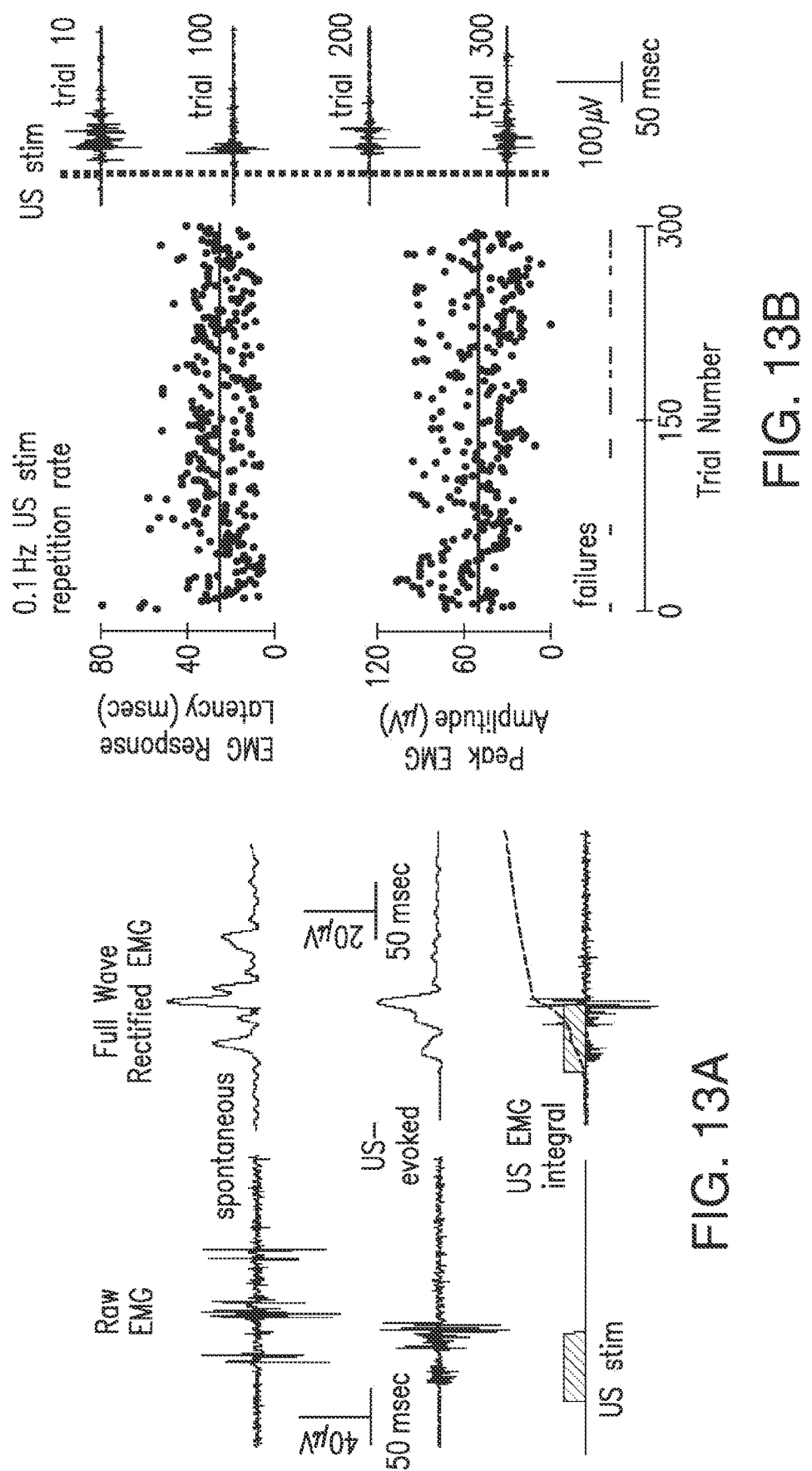

The baseline failure rate in obtaining US-evoked motor responses was <5% when multiple stimulus trials were repeated once every 4-10 s for time periods up to 50 min (FIG. 13B). As observed for response latencies in acute experiments, the peak amplitudes of EMG responses evoked by transcranial pulsed US were stable across trial number (FIG. 13B). In more chronic situations, repeated US stimulation experiments were performed within individual subjects (n=5 mice) on days 0, 7, and 14 using a trial repetition frequency of 0.1 Hz for 12-15 min each day. In these experiments, there were no differences in the peak amplitudes of the US-evoked EMG responses across days (day 0 mean peak EMG amplitude=40.26±0.99 µV, day 7=43.06±1.52 µV, day 14=42.50±1.42 µV; ANOVA F2 1303=1.47, p=0.23; FIG. 54A). These data demonstrate the ability of transcranial US to successfully stimulate brain circuit activity across multiple time periods spanning minutes (FIG. 13B) to weeks.

By examining EMG failure rates in eight mice, the success of achieving motor activation was affected when stimulus trials were repeated in more rapid succession was studied. The mean EMG failure probability significantly increased (p<0.001) as the rate of US stimulus delivery increased from 0.25 to 5 Hz (FIG. 13C). These data suggest that brain stimulation with US may not be useful at stimulation frequencies above 5 Hz.

Application of TTX to motor cortex blocked EMG activity, which indicates that pulsed US triggers cortical action potentials to drive peripheral muscle contractions (n=4 mice; FIG. 13D). The intensities of US stimuli studied were <500 mW/cm², where mechanical bioeffects have been well documented in the absence of thermal effects (Dalecki, 2004; Dinno et al., 1989; O'Brien, 2007; ter Haar, 2007). To confirm these observations in brain tissue, the temperature of motor cortex in response to US waveforms having different pulse duration (PD) times were monitored. Equations for estimating thermal absorption of US in biological tissues indicated that PD times are a critical factor for heat generation (O'Brien, 2007) and predict that 0.5 MHz US pulses exerting a $p_r$ of 0.097 MPa for a PD of 0.57 ms should produce a temperature increase of 2.8×10−6° C. in brain. All US stimulus waveforms used in this study had $p_r$ values <0.097 MPa and PD times <0.57 ms. None of the US waveforms used to stimulate cortex elicited a significant change in cortical temperature within our 0.01° C. resolution limits (FIG. 13E). US pulses with $p_r$ values of 0.1 MPa and PD times >50 ms were required to produce a nominal temperature change ($\Delta T$) of 0.02° C. (FIG. 13E).

Figure 14A:
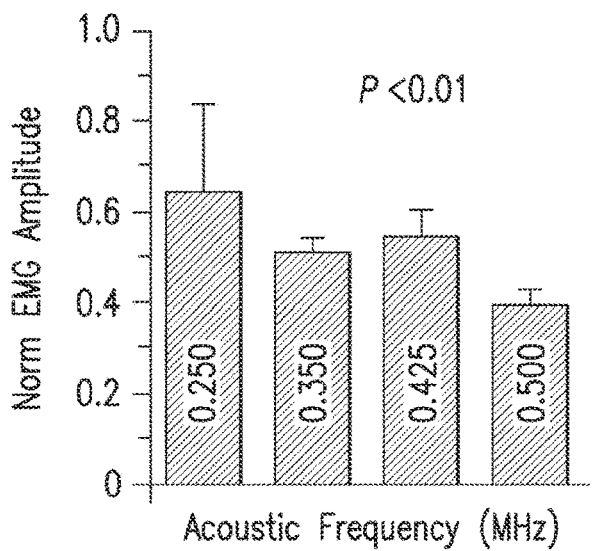
FIG. 14A-C shows interactions of the acoustic frequency and acoustic intensity of stimulus waveforms on descending corticospinal circuit activation. (A) Maximum-peak normalized (Norm) US-evoked EMG amplitude histograms are plotted for the four US frequencies used in the construction of stimulus waveforms. Data shown are mean±SEM. (B) Mean maximum-peak normalized US-evoked EMG amplitudes are plotted as a function of US intensities ($I_{SPTA}$) produced by 20 distinct stimulus wave-forms (see Table S1). (C) The interaction between US intensity ($I_{SPTA}$) and US frequency is plotted as a function of maximum-peak normalized EMG amplitudes (pseudocolor LUT).
Figure 14B:
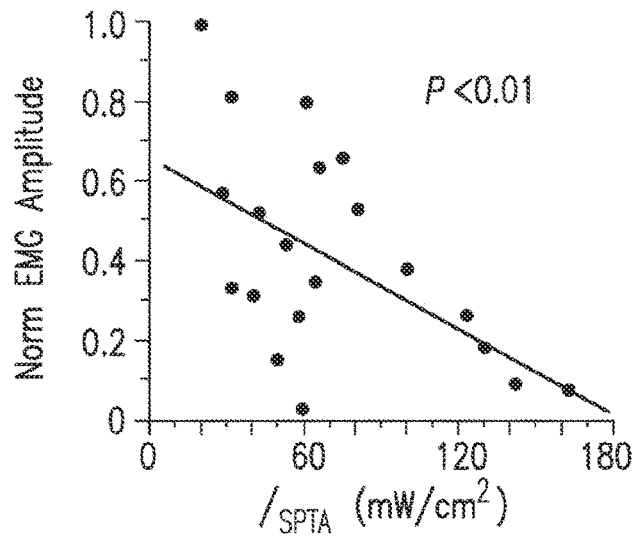
Figure 14C:
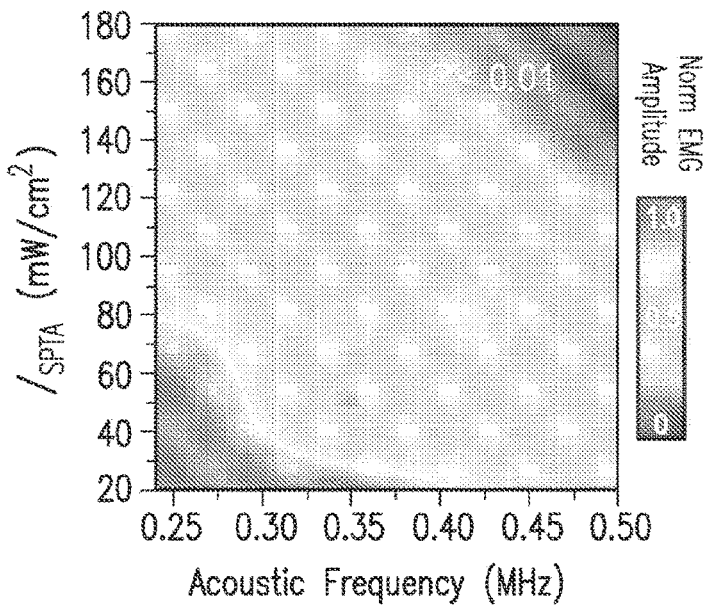

Acoustic frequencies and intensities across the ranges studied influenced US-evoked EMG responses from the triceps brachii of mice (n=20). Motor cortex was stimulated using 20 distinct pulsed US waveforms composed with different US frequencies (0.25, 0.35, 0.425, and 0.5 MHz) and having varied intensities. The sequence of which different waveforms were used were randomized in individual stimulus trials to avoid order effects. Relative comparisons of EMG amplitudes across animals can be influenced by many factors, including electrode placement, number of fibers recorded from, variation in noise levels, and differential fiber recruitment, which can be handled using normalization techniques to reduce intersubject variability. To examine US-evoked EMG responses having the same dynamic range across animals, the peak amplitude of individual EMG responses was normalized to the maximum-peak amplitude EMG obtained for an animal and forced its minimum-peak amplitude EMG response through zero. A two-way ANOVA revealed a significant main effect of US frequency on EMG amplitude, where lower frequencies produced more robust EMG responses (F3 1085=3.95, p<0.01; FIG. 14A). The two-way ANOVA also revealed a significant main effect of intensity ($I_{SPTA}$) on EMG amplitudes (F19, 1085=9.78, p<0.001; FIG. 4B), indicating that lower intensities triggered more robust EMG responses. The two-way ANOVA also revealed a significant frequency× intensity interaction (F3, 1085=7.25, p<0.01; FIG. 4C), indicating differential effects of US waveforms on neuronal activity as a function of frequency and intensity. The EMG response latencies were not affected by either frequency or intensity (data not shown).

Example 12: Spatial Distribution of Brain Circuit Activation with Transcranial Pulsed Ultrasound To characterize the spatial distribution of US-evoked activity, functional activity maps were constructed using antibodies against c-fos (n=4 mice). To facilitate data interpretation, intact brain tissue having a relatively planar surface and prominent subcortical structures was stimulated. The acoustic collimators (d=2 mm) were centered over the skull covering the right hemisphere from 1.2 mm to 3.2 mm of Bregma and 0.5 mm to 2.5 mm lateral of the midline using stereo-tactic coordinates (FIG. 15A; Franklin and Paxinos, 2007). The smallest-diameter collimator was used to characterize the minimal resolution of the brain-stimulation method since it is expected that larger collimators will produce larger areas of brain activation. Pulsed US (0.35 MHz, 50 c/p. 1.5 kHz PRF, 500 pulses) having an $I_{SPTA}$=36.20 mW/cm$^2$ was transmitted along a vertical axis parallel to the sagittal plane through underlying brain regions once every 2 s for 30 min. Following a 45 min recovery period, mice were sacrificed and their brains were harvested for histology.

Figure 15A:
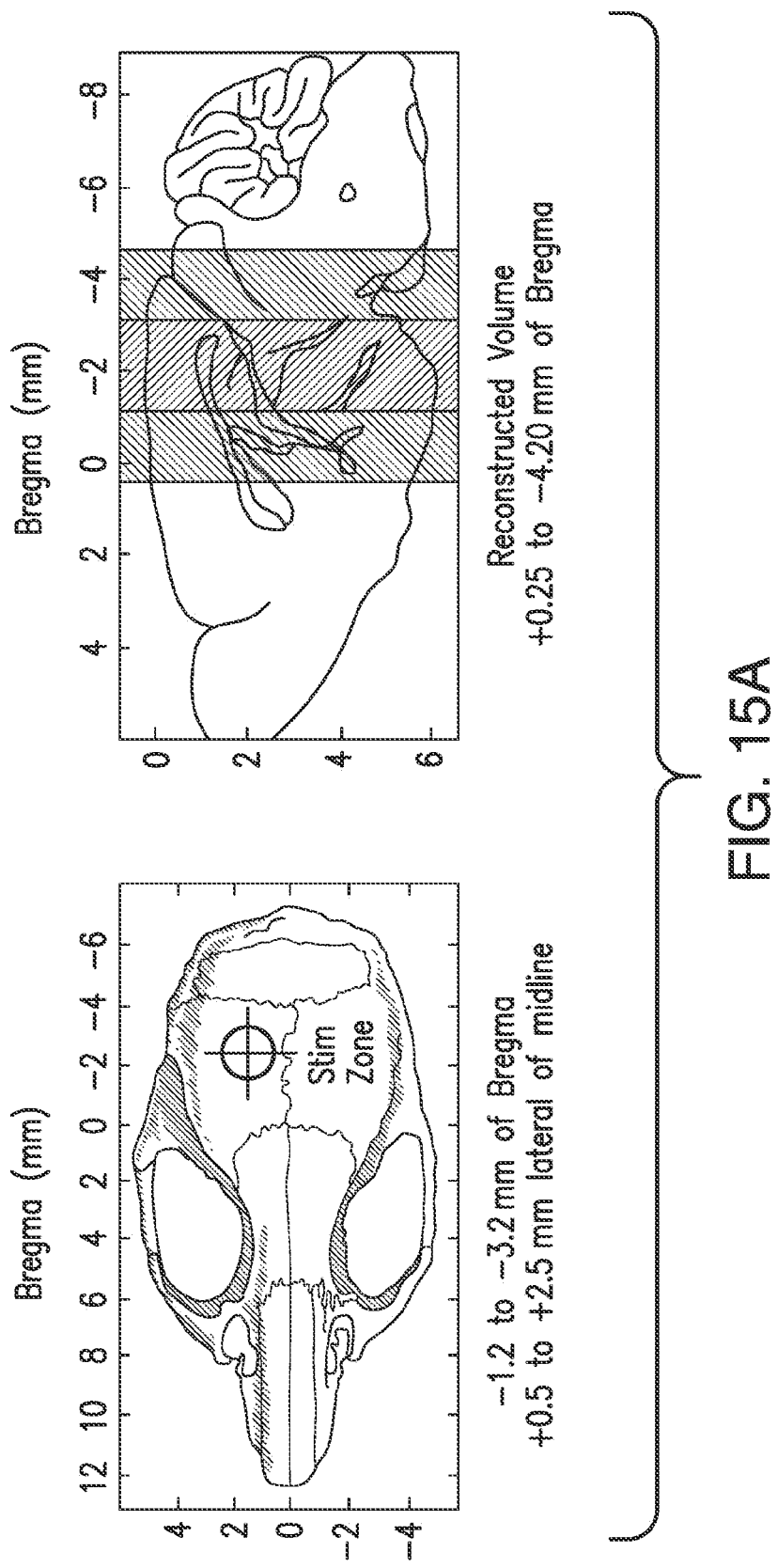
FIG. 15A-E shows spatial distribution of neuronal activation triggered by transcranial pulsed US. (A) Diagrams showing the anatomical locations where transcranial pulsed US was delivered through an acoustic collimator (green; d=2 mm) and the brain volume subsequently reconstructed (blue) to develop functional activity maps using antibodies against c-fos. (B) Light micrographs showing c-fos activity in a coronal brain section at different locations inside (i) and outside (ii and iii) the US transmission path. (C) A psuedocolored map of c-fos+ cell densities in 250×250 μm regions is shown for a reconstructed coronal section obtained from within the stimulus zone. Small regions inside (i) and outside (ii and iii) the US brain transmission path are highlighted and contain c-fos density data obtained from the corresponding images shown in (B). (D) Similar psuedocolored c-fos activity maps are shown for coronal brain sections rostral (left) and caudal (right) to the stimulated brain regions. (E) The line plots illustrate the mean c-fos+ cell densities observed along the rostral-caudal axis of reconstructed brain volumes for stimulated (black) and contralateral control hemispheres (gray). Regions of cortex within the stimulation zone are indicated in red. Data shown are mean±SEM.
Figures 15B, 15C:
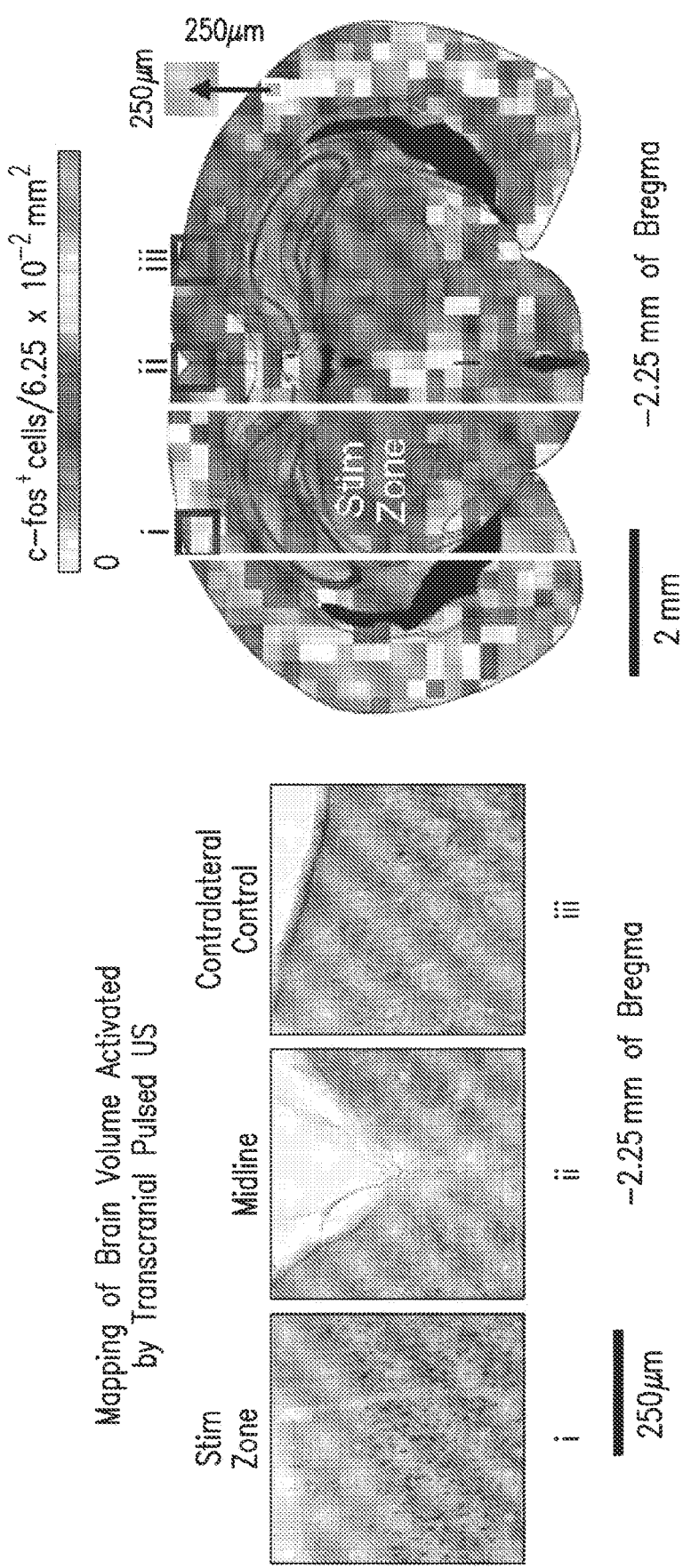
Figure 15D:
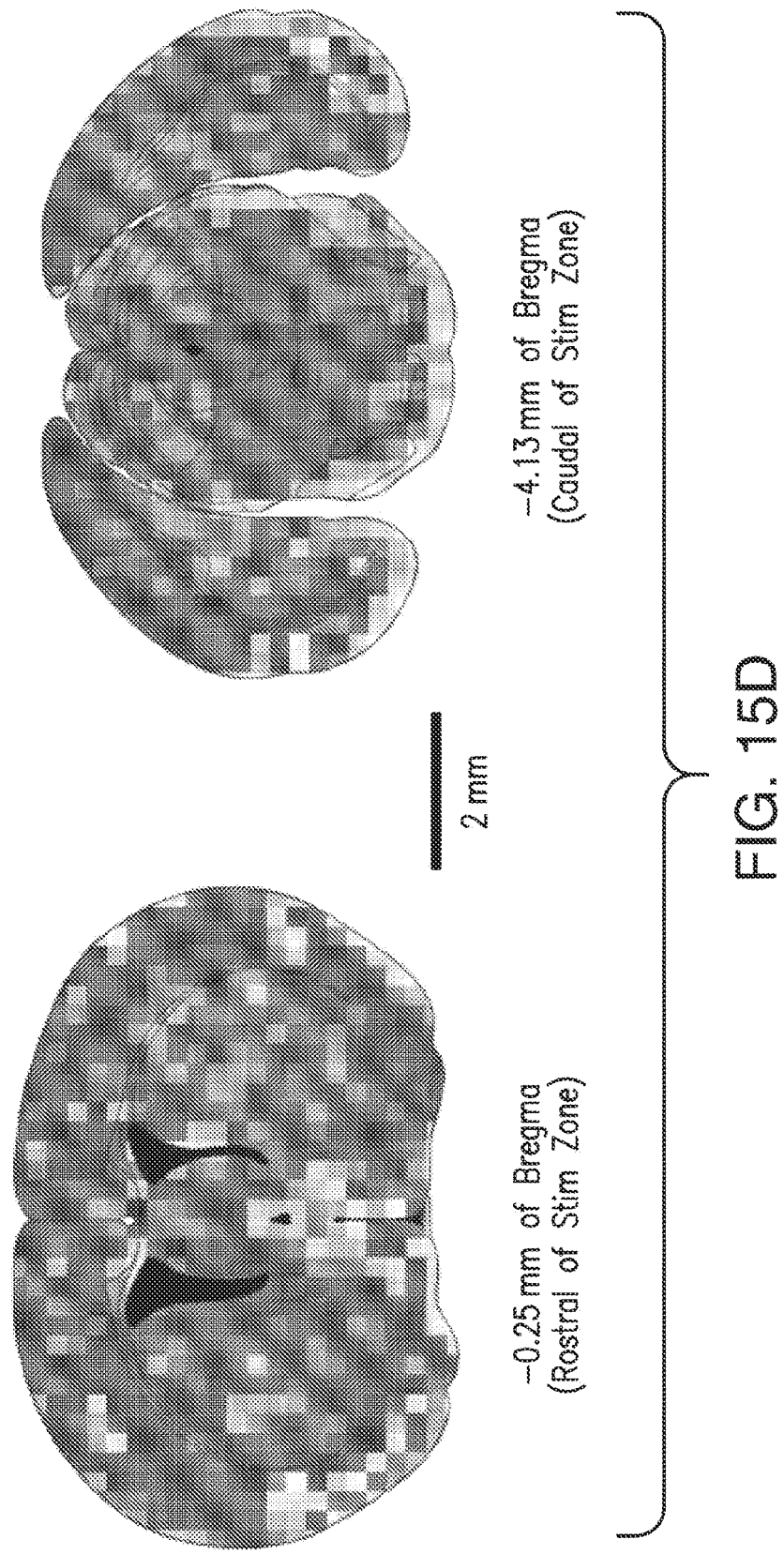
Figure 15E:
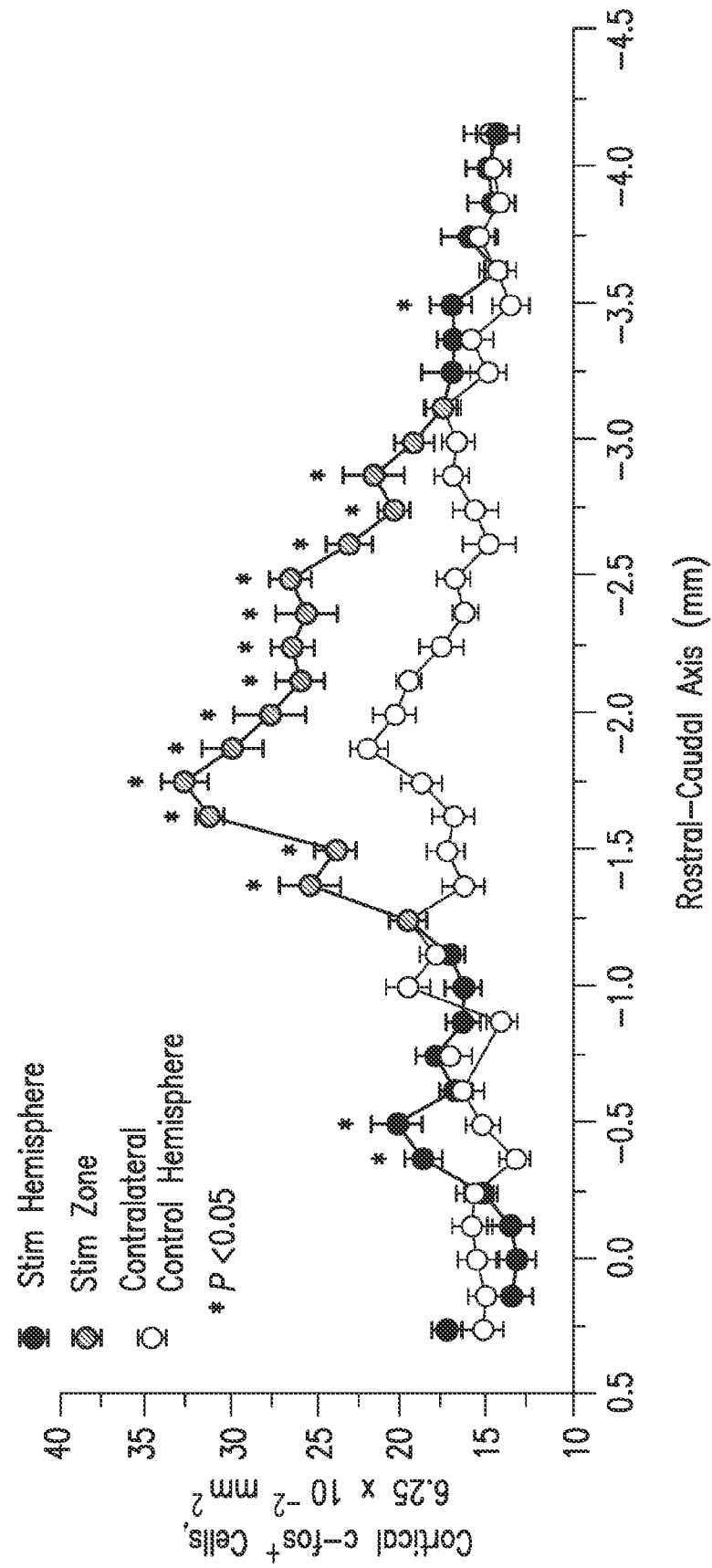

Coronal sections from brain regions spanning +0.25 mm to 4.20 mm of Bregma were prepared (FIG. 15A). Individual sections spaced every 125 μm were then immunolabeled using antibodies against c-fos and imaged using transmitted light microscopy. c-fos+ cell densities in 250×250 μm squares were quantified for entire coronal sections, corrected for tissue shrinkage, and developed brain activity maps by plotting c-fos+ cell densities in 250×250 μm pixels onto their corresponding anatomical locations using mouse brain atlas plates (Franklin and Paxinos, 2007). Representative raw data and functional activity maps coding c-fos+ cell density using a pseudocolor lookup table for visualization purposes are shown in FIGS. 15B-15D. The lateral resolution of pulsed US along the rostral-caudal brain axis was estimated by analyzing regions of dorsal cortex (0.25-1.0 mm deep; 0.75-1.50 mm lateral of the midline) for each coronal section (FIGS. 15A-15D). An ANOVA comparing the mean c-fos+ cell densities for each 250×250 μm square region collapsed across animals revealed that pulsed US produced a significant increase in the density of c-fos+ cells (ANOVA, F646=73.39, p<0.001; contralateral control hemisphere mean c-fos+ cell density=16.29±0.20 cells/6.25×10−2 mm2 compared to US stim=19.82±0.36 cells/6.25×10−2 mm2). Subsequent pairwise comparisons of stimulated versus contralateral control cortex revealed that US stimulation produced a significant increase in c-fos+ cell densities for a 1.5 mm region along the rostral-caudal axis (1.38 mm to −2.88 mm of Bregma) under the 2.0 mm diameter stimulation zone (FIG. 15E). Similar analyses along the medial-lateral axis of dorsal cortex revealed a significant increase (p<0.05) in c-fos+ cell densities for a 2.0 mm wide region of brain tissue under the stimulation zone. A smearing of elevated c-fos+ cell densities was observed lateral to the stimulation zone, which could be attributed to nonlinearities in the acoustic collimators the corticocortical lateral spread of activity, and/or slight lateral variations in the positioning of our collimators.

By examining the effects of pulsed US along the dorsal-ventral axis within the stimulation zone (0.5-2.5 mm medial to lateral; −1.2 to 3.2 mm of Bregma), the density of c-fos+ cells was found to be significantly higher (p<0.05) compared to contralateral controls in the superficial 1.0 mm of tissue. While there were trends of higher c-fos+ cell densities in some deeper nuclei of stimulated hemispheres, only one significant difference was observed in a deep-brain region. The elevated c-fos here may have been produced by standing waves or reflections, since higher c-fos+ cell densities were generally observed near the skull base. It was expected to observe elevated c-fos+ levels uniformly along the dorsal-ventral axis of stimulated regions due to the transmission/absorption properties of US in brain tissue. For >1.5 mm of the 2.0 mm diameter cortical area targeted with US in these mapping studies, regions deeper than ≈1 mm were ventral to dense white matter tracts (corpus callosum) in the brain. Interestingly, unmyelinated C-fibers have been shown to be more sensitive to US than myelinated Aδ fibers (Young and Henneman, 1961). Effectively blocking US-evoked activity in subcortical regions, it was thought that low-intensity US fields may have been absorbed/scattered by dense white matter tracts in these mapping studies as a function of the US transmission path implemented. It was possible to stimulate subcortical brain regions with transcranial US by employing different targeting approaches.

Example 13: Remote Stimulation of the Intact Mouse Hippocampus Using Transcranial Pulsed US To address the issue of subcortical stimulation of deep brain circuits, the intact mouse hippocampus was used, since pulsed US waveforms have been shown to elicit action potentials and synaptic transmission in hippocampal slices (Tyler et al., 2008). Extracellular recordings of US-evoked activity in the CA1 stratum pyramidale (s.p.) cell body layer of dorsal hippocampus (n=7 mice) were performed. Prompted by observations regarding the potential disruption of US fields by dense white matter tracts, a targeting approach bypassing the dense white matter of the corpus callosum was used when transmitting pulsed US to the hippocampus.

Figure 16A:
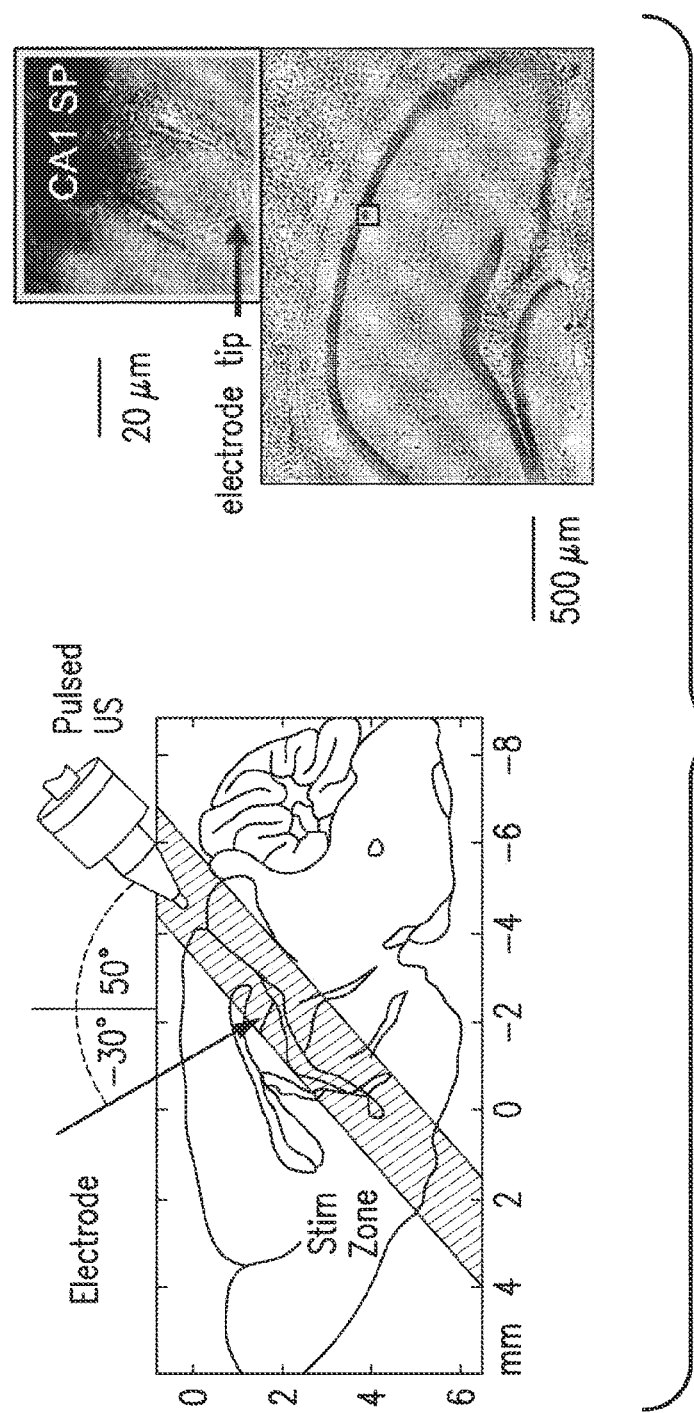
FIG. 16A-D shows FIG. 7. transcranial stimulation of the intact mouse hippocampus with pulsed ultrasound (A) Shown is an illustration of the geometrical configuration used for targeting the dorsolateral hippocampus with transcranial pulsed US while recording evoked electro-physiological responses in the dorsal hippocampus (left). A lesion illustrates the site of an electrophysiological recording location in the hippocampal CA1 s.p. region (right). (B) Raw (black) and average (cyan) hippocampal CA1 LFP recorded in response to 50 consecutive US stimulation trials (left). A pseudocolored spike-density plot illustrates the increase in CA1 s.p. spiking as a function of time in response to 50 consecutive pulsed US stimuli delivered at 0.1 Hz (right). (C) An individual recording trace of CA1 s.p. extracellular activity in response to a pulsed US waveform is shown in its wideband (top), gamma (middle), and SWP (bottom) frequency bands. An expanded 250 ms region of the SWP trace (red) illustrates SWP "ripples". (D) Confocal images illustrating BDNF (green) expression in the CA1 s.p. (top) and CA3 s.p. (bottom) regions of hippocampus from contralateral control (left) and stimulated hemispheres (right). Histograms (far right) illustrate the significant increase in the density of BDNF+ puncta triggered by transcranial US stimulation for the CA1 s.p. (top) and CA3 s.p. (bottom) regions of hippocampus. Data shown are mean±SEM.
Figure 16B:
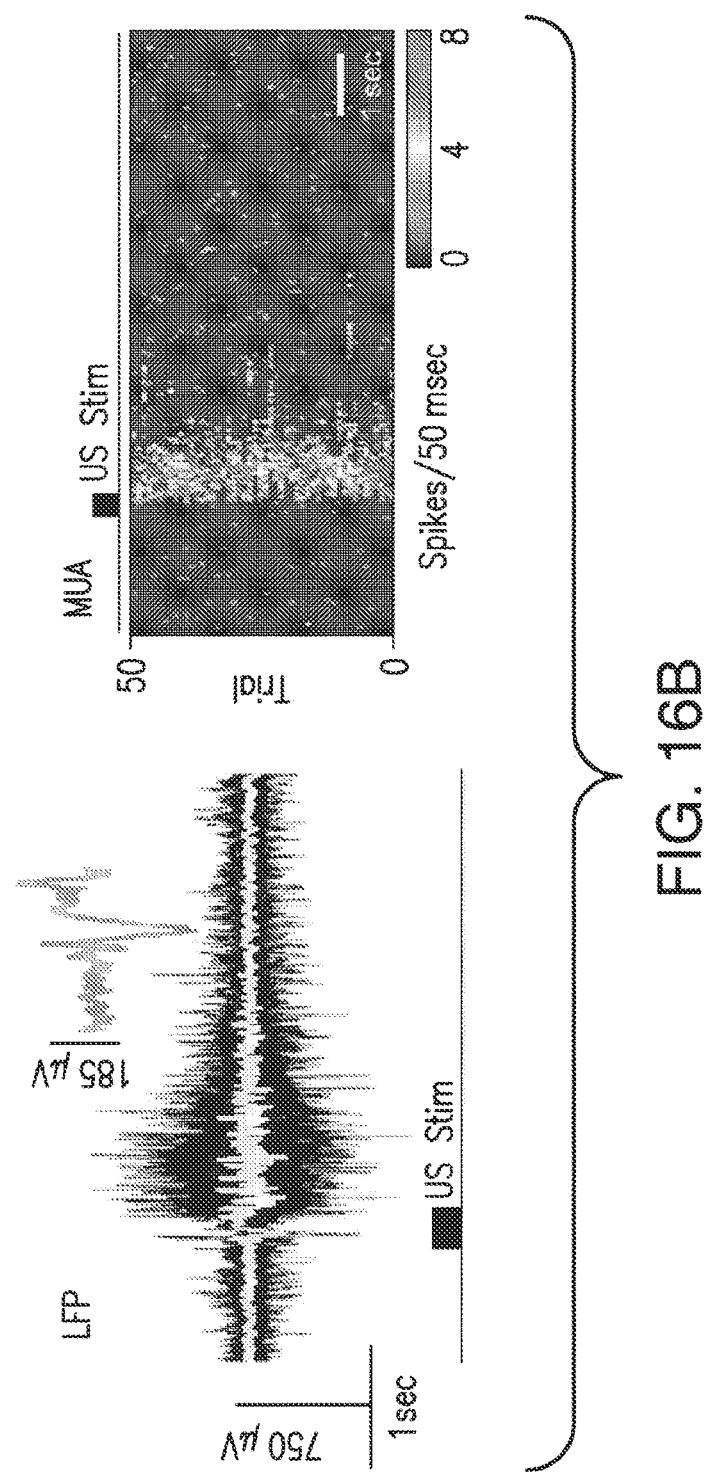

An angled line of US transmission through the brain was used by positioning acoustic collimators 50° from a vertical axis along the sagittal plane. The output aperture of collimators (d=2 mm) were unilaterally centered over 4.5 mm of Bregma and 1.5 mm lateral of the midline (FIG. 16A). A 30° approach angle was used to drive tungsten microelectrodes to the CA1 s.p. region of hippocampus through cranial windows (d=1.5 mm) centered approximately 1.0 mm of Bregma (FIG. 16A). Pulsed US (0.25 MHz, 40 cycles per pulse, 2.0 kHz PRF, 650 pulses) having an $I_{SPTA}$=84.32 mW/cm$^2$ reliably triggered an initial LFP with a mean amplitude of 168.94±0.04 μV (50 trials each) and a mean response latency of 123.24±4.44 ms following stimulus onset (FIG. 16B). This initial LFP was followed by a period of after-discharge activity lasting <3 s (FIG. 16B). These short-lived after-discharges did not appear to reflect abnormal circuit activity as observed during epileptogenesis (Bragin et al., 1997; McNamara, 1994; Racine, 1972). In fact, hippocampal after-discharges lasting more than 10 s are indicative of seizure activity (Racine, 1972).

Figure 16C:
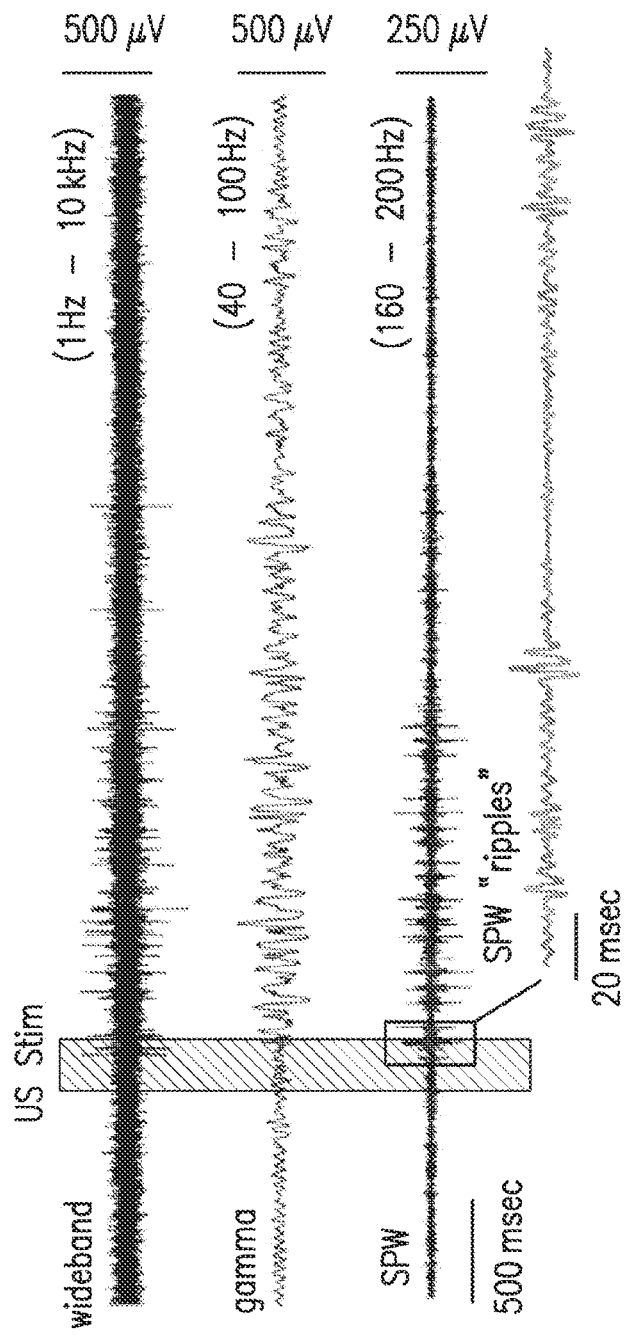

Pulsed US produced a significant (p<0.01) increase in spike frequency lasting 1.73±0.12 s (FIG. 7B). Natural activity patterns in the CA1 region of hippocampus exhibit gamma (40-100 Hz), sharp-wave (SPW) "ripple" (160-200 Hz), and other frequency-band oscillations reflecting specific behavioral states of an animal (Bragin et al., 1995; Buzsaki, 1989, 1996; Buzsaki et al., 1992). Sharp-wave ripples (≈20 ms oscillations at ≈200 Hz) in CA1 result from the synchronized bursting of small populations of CA1 pyramidal neurons (Buzsaki et al., 1992; Ylinen et al., 1995) and have recently been shown to underlie memory storage in behaving rodents (Girardeau et al., 2009; Nakashiba et al., 2009). On the other hand, the consequences of gamma oscillations in the CA1 region of the hippocampus are not as well understood but are believed to stem from the intrinsic oscillatory properties of inhibitory interneurons (Bragin et al., 1995; Buzsaki, 1996). By decomposing the frequency components of wideband (1-10,000 Hz) activity patterns evoked by pulsed US, it was found that all after-discharges contained both gamma oscillations and SWP ripple oscillations lasting <3 s (FIG. 16C). These data demonstrated that pulsed US stimulated intact mouse hippocampus while evoking synchronous activity patterns and network oscillations; hallmark features of intrinsic hippocampal circuitry.

Figure 16D:
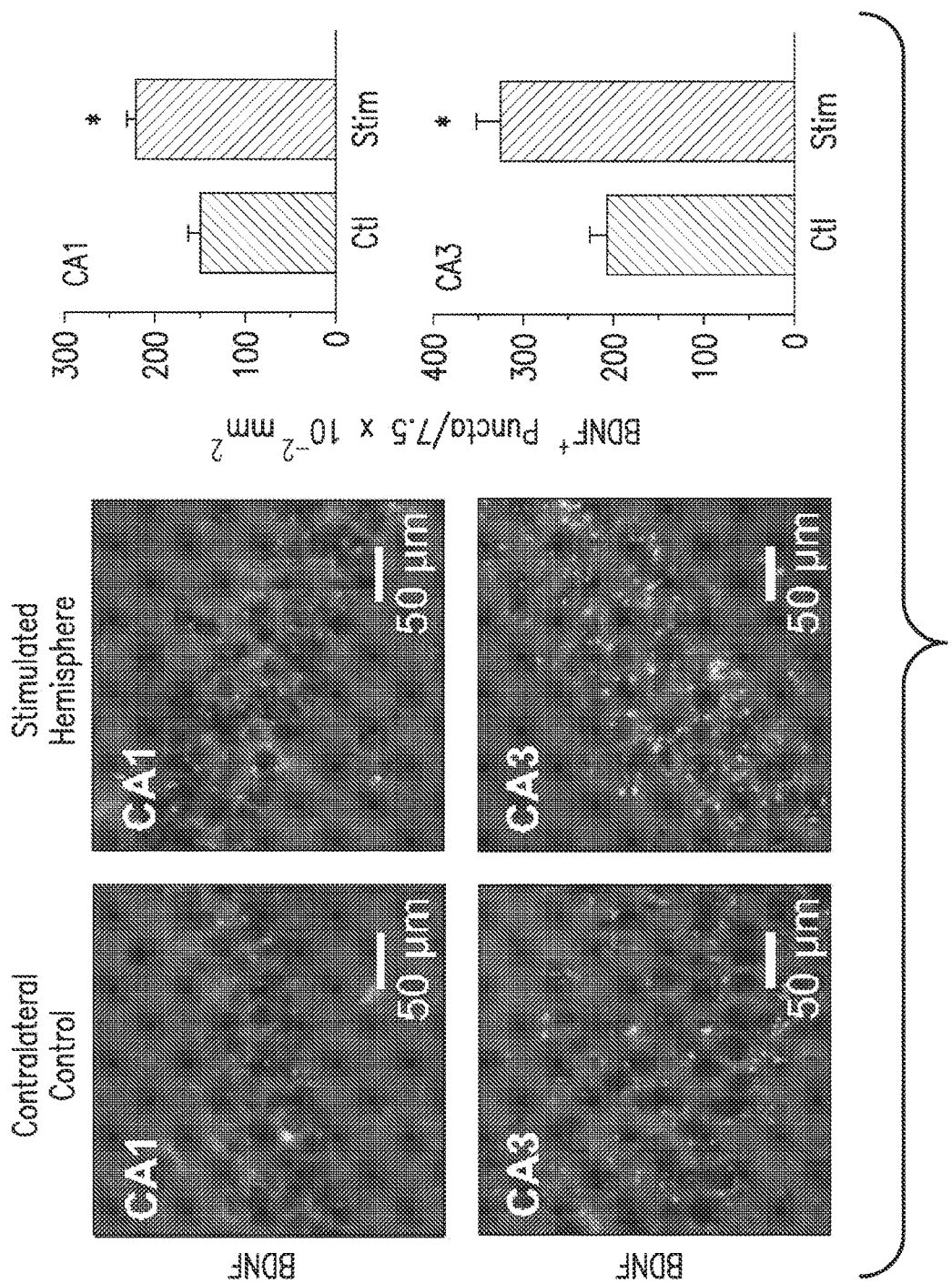

Brain-derived neurotrophic factor (BDNF) is one of the most potent neuromodulators of hippocampal plasticity, and its expression/secretion is known to be regulated by neuronal activity (Lessmann et al., 2003; Poo, 2001). BDNF protein expression levels in the hippocampus were examined following transcranial stimulation with pulsed US. Unilateral hippocampi of mice (n=7) were targeted and stimulated with pulsed US (0.35 MHz, 50 cycles per pulse, 1.5 KHz PRF, 500 pulses) having an $I_{SPTA}$=36.20 mW/cm$^2$ every 2 s for 30 min. Following a 45 min recovery period, mice were sacrificed and their brains removed, sectioned, and immunolabeled with antibodies against BDNF. Pulsed US induced a significant increase in the density of BDNF+ puncta in CA1 s.p. (contralateral control=149.64±11.49 BDNF+ puncta/7.5×10$^{-2}$ mm2 from 0.61 mm2 CA1 region/mouse versus US stim=221.50±8.75 BDNF+ puncta/7.5×10$^{-2}$ mm$^2$ from 0.61 mm2 CA1 region/mouse; t test, p<0.001; FIG. 16D). Similar significant increases were observed in the CA3 s.p. region (contralateral control=206.20±19.68 BDNF+ puncta/7.5×10$^{-2}$ mm$^2$ from 0.61 mm$^2$ CA3 region/mouse versus US stim=324.82±27.94 BDNF+ puncta/7.5× 10$^{-2}$ mm$^2$ from 0.61 mm$^2$ CA3 region/mouse; t test, p<0.005; FIG. 16D). These data demonstrated that pulsed US can be used to remotely stimulate neuronal activity in the intact mouse hippocampus. The increased synchronous activity and elevated BDNF expression patterns produced by pulsed US show that transcranial US can be used to promote endogenous brain plasticity.

Example 14: Modifying Cognitive Performance

Figure 17A:
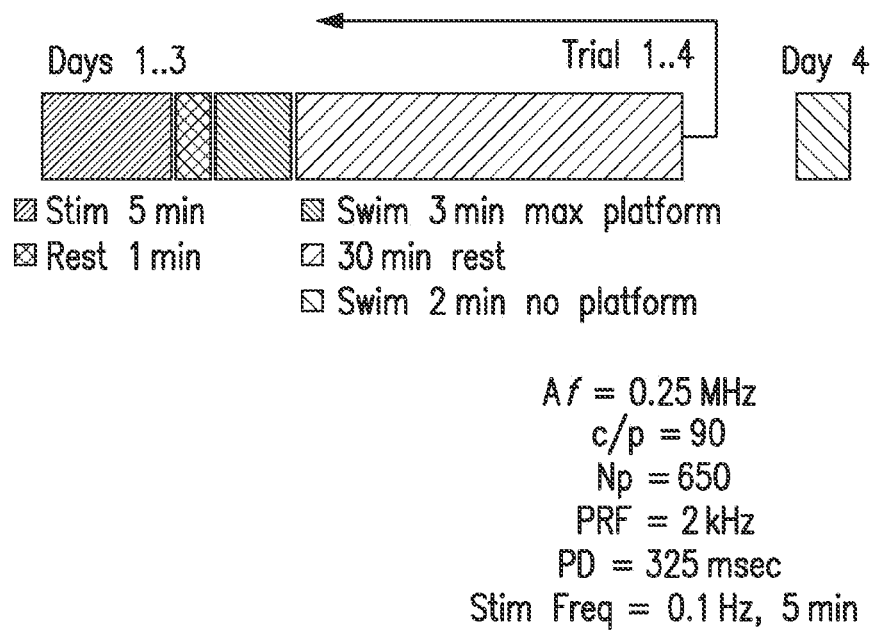
FIG. 17A-B shows the results of using ultrasound to modify cognitive performance. (A) Shows the stimulus strategy used stimulating the hippocampi of mice with transcranial pulsed ultrasound prior to their training (four trials per day for three consecutive days) on a spatial learning task the Morris Water Maze. (B) Task learning acquisition curves show a decreasing mean platform escape latency across days for both the sham treated and US stimulated mice (left). As can be seen by the line plot (left), mice stimulated with US (red) just prior to training learned the task slower compared to sham treated controls (black) as indicated by their slower acquisition rates or slower decreasing escape latency times. The data showing mean escape latencies for the treatment groups (US stimulated and sham control) are shown for the four individual trials across the three training days. The line plot (middle) shows an increase in the escape latency observed from trial 4 on day 1 to trial 1 on day 2 for US stimulated mice (red) compared to sham controls (black). These data illustrate that mice stimulated with US have more pronounced "forgetting" or disrupted memory consolidation processes compared to sham treated controls, which retain escape latencies across the ~22 hour delay between the end of trial 4 on day 1 and the beginning of trial 1 on day 2. On the day following three days of Morris Water Maze training, mice underwent a test in which the escape platform was removed from the maze. The time spent searching in the water maze quadrant where the escape platform had been located on training days was quantified and is shown in the histogram (right). The shorter times spent in the correct quadrant for US stimulated mice compared to sham controls indicates that US stimulation occurring at times near the acquisition of information (learning; prior to Morris Water Maze training in this case) can disrupt the memory or consolidation of that information.
Figure 17B:
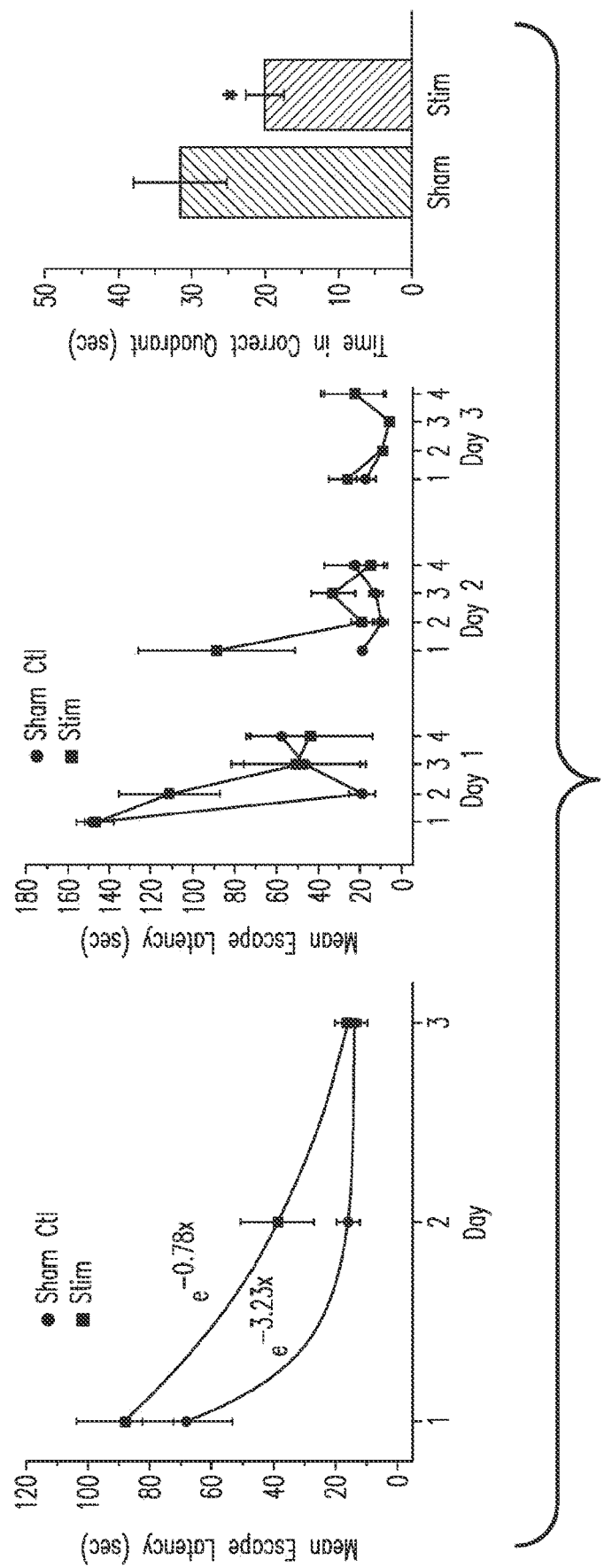
Figure 18A:
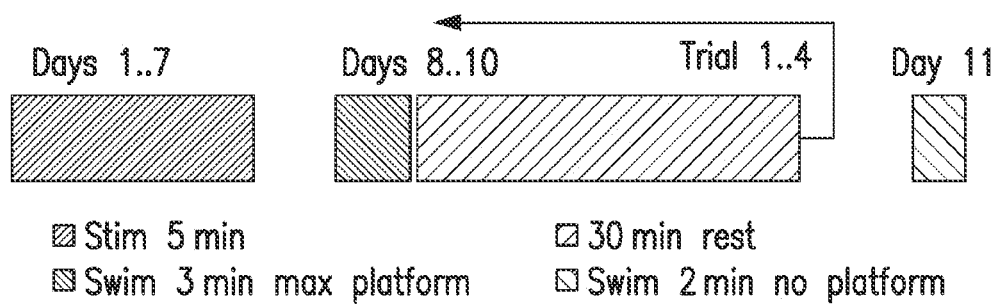
FIG. 18A-18B shows the results of using ultrasound to enhance cognitive processes. (A) A strategy is illustrated by which naive mice had their hippocampi stimulated with transcranial pulsed US for 5 minutes per day for 7 consecutive days prior to beginning training on a spatial cognition task the Morris Water Maze. As illustrated, mice were then trained on a Morris Water Maze task without receiving further US stimulation before being tested on the Morris Water Maze task. (B) The line plot (left) shows that chronic brain stimulation (7 days in this case) with transcranial pulsed US can enhance learning as indicated by the faster task acquisition rates or faster decreasing escape latency times on the Morris Water Maze for US stimulated mice (red) compared to sham treated controls (black). On the day following three days of Morris Water Maze training, mice underwent a test in which the escape platform was removed from the maze. The time spent searching in the water maze quadrant where the escape platform had been located on training days was quantified and is shown in the histogram (right). The longer times spent in the correct quadrant for US stimulated mice compared to sham controls indicates that chronic US stimulation not occurring at times near the acquisition of information (learning; prior to Morris Water Maze training in this case) can enhance the memory or consolidation of that information. Thus, depending on the stimulation paradigm transcranial pulsed ultrasound delivered through brain regulation devices can be used to either enhance or impair cognitive processes such as learning and memory.
Figure 18B:
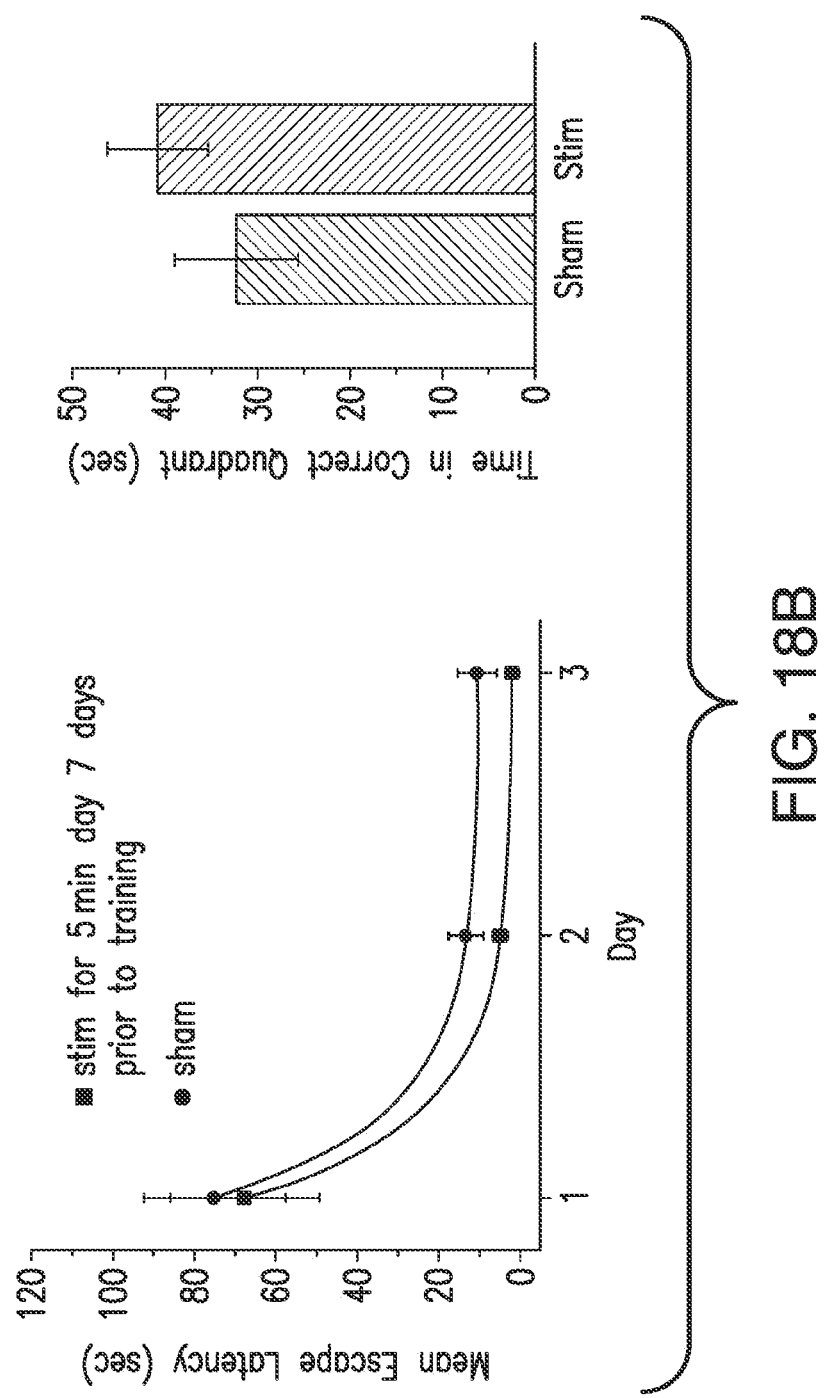

Referring to FIG. 17, a stimulus method for modifying cognitive performance was performed. Mice (n=4) were stimulated for five minutes with transcranial ultrasound using the pulse parameters shown in FIG. 17A, or sham treated the mice (n=3). Mice were allowed to rest for one minute then they were placed in a Morris Water Maze (MWM) with a hidden platform and allowed to swim in the MWM until they a) found the escape platform or b) three minutes had elapsed at which point they were moved to the platform. The mice then rested 30 minutes before undergoing the stimulation or sham procedure again for a total of 4 trials per day for three consecutive days. On day four, mice were not stimulated or sham treated and were placed in the MWM where the platform had been removed. The time the mice spent swimming in the correct quadrant was recorded. Longer times in the correct quadrant indicated a better memory of where the escape platform had been located. As shown in the plot on the far right of FIG. 17B, stimulated mice spent less time in the correct quadrant indicating that had not learned or remembered where the platform was as well as sham mice. The first two plots from left (17B) show stimulated mice take longer to find the escape platform across days (far left plot shows impaired learning). The slower task acquisition curve on the far left for stimulated animals shows it took the mice longer to learn the task compared to sham controls which had a faster acquisition curve. Upon closer examination of trial to trial data within days (middle plot), stimulated mice did not remember where the platform was from trial to trial or from day to day as well as control mice. The two figures at far left show stimulated mice took longer to locate the escape platform due to learning and memory impairments evoked by brain stimulation with ultrasound. More specifically, the data in FIG. 17B show that mice receiving hippocampal stimulation in the absence of task context just prior to the context-dependent spatial learning task could not perform as well as sham controls. The data indicated that pulsed ultrasonic stimulation of the hippocampus delivered close in time to a task requiring specific brain wave activity patterns to perform optimally was used to disrupt cognition by providing a masking pattern of brain wave activity. Such a strategy can enable the use of pulsed ultrasound to disrupt cognitive processes such as learning and memory. Brain regulation devices of various embodiments described herein can be used to deliver pulsed ultrasound to the intact hippocampus and associated brain regions in order to modify cognitive processes including but not limited to disrupting normal cognition. These data show that pulsed ultrasound can be delivered through brain regulation devices disclosed herein to enhance cognitive processes or improve learning and memory. An aspect of the invention comprises use of chronic repeated ultrasound stimulation to increase the strength of synapses such that learning and memory is improved. Methods of the present invention comprise use of brain regulation devices to deliver ultrasound targeted to the hippocampus and modify cognitive performance by impairing and or enhancing learning and memory, depending on the desired need to modify brain function and performance.

Example 15: Use of Ultrasound for Enhancing Cognitive Processes

Referring to FIG. 18A-18B, methods disclosed herein were used for enhancing cognitive processes. Transcranial ultrasound was used to noninvasively enhance cognitive processes, such as learning and memory. Pulsed ultrasound can stimulate the intact hippocampus by driving synchronous oscillations in the gamma and sharp-wave ripple bands, which are known to underlie hippocampal plasticity and learning and memory.

Transcranial ultrasound can upregulate BDNF signaling in the hippocampus. BDNF is one of the most potent modulators of brain plasticity. Very specific temporal patterns of brain activity are required to learn and remember. Disruption of such patterns with pulsed ultrasound occurred when the brain was stimulated with a brain regulation device using ultrasound at times very close to the training task. In order to enhance cognition, the intact hippocampus of mice (n=3) was stimulated with US for five minutes per day for 7 days prior to the mice undergoing training on the Morris Water Maze task. See FIG. 18A for ultrasound parameters. The mice were not stimulated with US immediately before training, instead mice were only stimulated on days 1-7 prior to training. On day 8, mice were trained on the MWM task. As shown in the left line plot of FIG. 18B, mice receiving stimulation learned the MWM task faster than sham controls (n=3). Further, stimulated mice remembered where the platform was better than sham controls as indicated by the time spent in the correct quadrant when the escape platform was removed on day 4 (histogram right).

Example 16: Noninvasive Ultrasound Neuromodulation for Status Epilepticus (SE)

Status epilepticus (SE) refractory to conventional antiepileptic drugs typically has a poor prognosis, but patients may recover well if seizures can be stopped. Nearly 40% of patient with SE will be refractory to first line of therapy.

Recent pioneering studies illustrate the ability of pulsed ultrasound in remotely modulating intact brain circuit activity (Tufail et al., 2010), herein incorporated in its entirety. Transcranial pulsed ultrasound (TPU) can also synchronize intact hippocampal oscillations in high-frequency and gamma bands without producing damage or rise in brain temperature (Tufail et al., 2010). Though not wishing to be bound by any particular theory, it is thought that epileptic seizures are attributed to runaway excitation of certain brain circuitries and since electrical and magnetic brain stimulation have been shown capable of terminating electrographic seizure activity (Andrews, 2003; Hamani et al., 2009), pulsed or continuous wave US stimulation can be used interfere with or stop abnormal activity associated with SE.

Figure 19C:
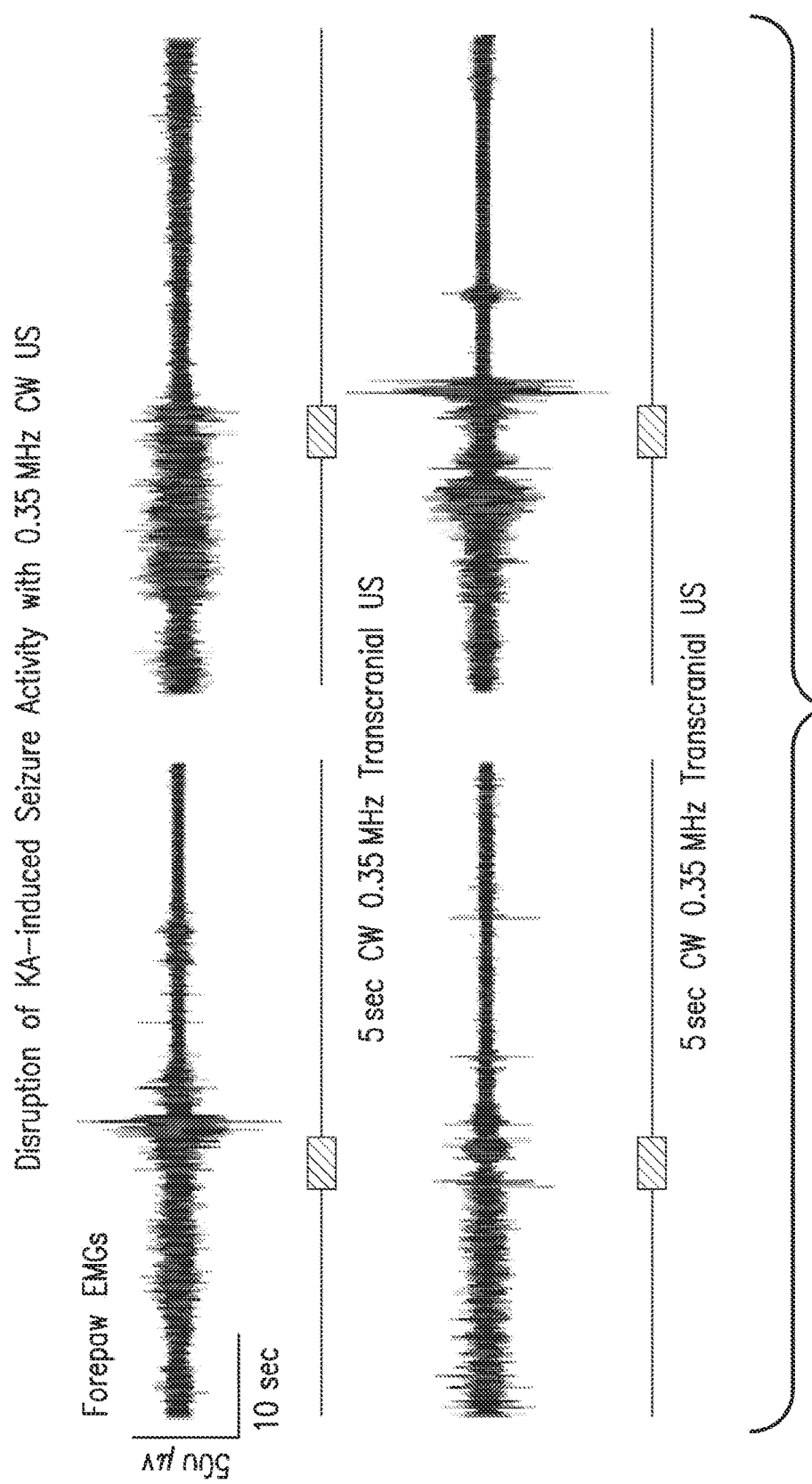

FIG. 19 illustrates that transcranial pulsed ultrasound can be used to modulate brain activity to study and or treat neurological diseases. (A) Shows EMG recordings in response to transcranial ultrasound stimuli delivered to the brain of normal mice in a continuous wave mode for 5 seconds. The brain activity pattern stimulated by continuous wave transcranial ultrasound is indicative of that observed during epileptic seizure activity. Such seizure activity patterns are known to occur for ten seconds or longer following the onset of a brain stimulus as shown by the EMG traces in response to transcranial stimulation of brain tissues with continuous wave ultrasound. Evoking such seizure activity patterns can be helpful in studying epilepsy by mapping diseased or prone circuits, as well as by using ultrasound to modulate abnormal brain activity patterns to screen for pharmacological compounds or genes useful for treating such dysfunctional brain activity. The data in panel (A) triggered with continuous wave ultrasound showed that transcranial ultrasound can influence brain activity depending on the ultrasound stimulus waveform used and depending on the desired outcome. (B) A mouse is shown at left immediately after being injected with kainic acid to produce a standard model of epilepsy. EMG activity before (top right) and after (bottom right) the onset of epileptic seizure activity is illustrated. The EMG traces on the bottom right show the presence of seizure activity as indicated by the increased persistent EMG activity compared to the pre-seizure trace on the top right. (C) EMG traces showing that brain stimulation achieved with transcranial ultrasound was used to terminate seizure activity in a mouse model of epilepsy. Four different examples (FIG. 19C) illustrate the delivery of transcranial ultrasound was capable of quickly attenuating pronounced seizure activity as indicated by the decreasing EMG amplitude soon after the delivery of a transcranial ultrasound stimulus waveform. Such an effect of focused and or unfocused ultrasound on diseased brain activity can be administered manually in response to seizures detected visually or by way of EEG or EMG activity.

In an embodiment of the present invention, methods and devices disclosed herein for the delivery of ultrasound to the brain can be controlled automatically to provide US to the brain in response to seizure activity detected by EEG, EMG, MEG, MRI, or other readout of brain activity. An advantage of using ultrasound to modulate abnormal brain activity such as SE is that it is rapid and noninvasive. As taught here to treat epileptic seizure activity, the rapid response times and fast ability to treat diseased brain circuits with either focused or unfocused ultrasound provide a life saving treatment or may lead to improved recovery outcomes due to its rapid intervention to prevent excitotoxicity or other metabolic dysfunction arising from injured brain. When provided for the treatment of epilepsy or other diseased or injury states such as those suffered by mild or severe traumatic brain injuries, ultrasound can provide a first line of treatment to dampen abnormal brain activity or to increase neuroprotective factor activity. Ultrasound for the treatment of diseased or injured brains can be delivered by emergency response personnel or in neurocritical care situations in the emergency room, operating room, a physician's office, a battlefield medical clinic, during transport to a medical facility, or at the scene of an accident. Here, the data on epilepsy are used as just one example of a disease where ultrasound can be rapidly applied to the head for modulating brain activity in a rapid response manner to provide benefit.

The invention claimed is:

1. An untethered, wearable brain regulation interface device for modulating brain activity of a user using ultrasound, the device comprising:
  a wearable structure configured to be placed adjacent to the head, on the head or to cover at least a portion of the head of the user;
  at least one ultrasonic transducer coupled to the wearable structure and configured to emit ultrasound energy, wherein the at least one ultrasonic transducer is configured to deliver the ultrasound energy to a target tissue site in the user's brain;
  a piezo actuator configured to change a shape and/or a position of the at least one ultrasonic transducer;
  a controller coupled to the at least one ultrasonic transducer and the piezo actuator, the controller configured to drive the at least one ultrasonic transducer to deliver transcranial pulsed ultrasound to stimulate one or more intact brain circuits with a predominantly non-thermal, mechanical mechanism of action, wherein the controller is further configured to adjust a focus of the transcranial pulsed ultrasound by causing the piezo actuator to adjust the shape and/or the position of the at least one ultrasonic transducer; and
  a battery configured to provide power to the at least one ultrasonic transducer, the piezo actuator, and the controller;
  wherein the at least one ultrasonic transducer, the piezo actuator, the battery, and the controller are integrated within the wearable structure; and
  wherein the device is fully self-contained, does not require connection to an external imaging system or a remote processor, and enables ambulatory use.

2. The device of claim 1, further comprising a biometric sensor system for detecting brain activity or physical signals, the biometric sensor system including one or more of electroencephalography (EEG), magnetoencephalography (MEG), functional near-infrared spectroscopy (fNIRS), or photoacoustic tomography (PAT), wherein data from the biometric sensor system is processed locally to dynamically adjust ultrasound waveform characteristics.

3. The device of claim 2, wherein the biometric sensor system is configured to detect specific neural oscillatory patterns to trigger or adjust ultrasound neuromodulation in real time without reliance on an external monitoring system.

4. The device of claim 1, wherein the controller is configured to activate the at least one ultrasonic transducer to modulate cognitive states of the user, such as alertness, focus, or relaxation, and is not directed at treating seizure activity.

5. The device of claim 1, wherein the at least one ultrasonic transducer is the configured to deliver ultrasound energy at a frequency range from 0.2 MHz to 0.55 MHz, thereby avoiding high-intensity focused ultrasound used for tissue ablation.

6. The device of claim 1, wherein the at least one ultrasonic transducer is configured to deliver a plurality of pulses with adjustable pulse durations up to 10 seconds, wherein each pulse with a pulse duration is variable and can range from 100 microseconds to 10,000 microseconds to optimize neuromodulatory effect.

7. The device of claim 1, wherein the wearable structure comprises an ergonomic, flexible, or modular headgear, including but not limited to a cap, a headband, a helmet, and a protective covering, specifically designed to securely house the at least one ultrasonic transducer.

8. The device of claim 1, wherein the at least one ultrasonic transducer is battery powered and the wearable structure comprises for thermal regulation of the at least one ultrasonic transducer.

9. The device of claim 1, wherein the device comprises a cooling system that also functions as an ultrasound coupling medium, optimizing transmission of ultrasound waves to the user's skull and underlying brain tissue.

10. The device of claim 1, further comprising at least one of:
   a motion sensor for context-aware activation; and
   one or more physiological sensors for measuring or detecting physiological indicators including one or more of:
      heart rate, blood pressure, blood oxygenation, and hormone levels.

11. The device of claim 1, further comprising at least one acoustic lens, wherein the at least one acoustic lens comprises an acoustic hyperlens or an acoustic metamaterial to enhance spatial precision of ultrasound delivery to the user's brain.

12. The device of claim 1, wherein the at least one ultrasonic transducer comprises a plurality of ultrasonic transducers arranged in an array to allow beamforming and precise targeting of brain regions through the user's skull.

13. The device of claim 12, wherein the array of the plurality of ultrasonic transducers is a conformal array integrated into the wearable structure, wherein each transducer of the plurality of ultrasonic transducers can be independently controlled to optimize neuromodulation effects across different brain regions.

14. The device of claim 1, further comprising one or more sensors, wherein the controller is configured to adjust the focus of the transcranial pulsed ultrasound in response to feedback received from the one or more sensors of the device.

15. The device of claim 1, wherein the controller is configured to cause the piezo actuator to provide a sweeping action of ultrasound waves to the user's brain.

* * * * *